US010795803B2

United States Patent
O'Dowd et al.

(10) Patent No.: US 10,795,803 B2
(45) Date of Patent: *Oct. 6, 2020

(54) SYSTEMS AND METHODS FOR SUMMARIZATION AND VISUALIZATION OF TRACE DATA

(71) Applicant: Green Hills Software LLC, Santa Barbara, CA (US)

(72) Inventors: Daniel D. O'Dowd, Montecito, CA (US); Nathan D. Field, Santa Barbara, CA (US); Evan D. Mullinix, Santa Barbara, CA (US); Gwen E. Tevis, Santa Barbara, CA (US); Nikola Valerjev, Goleta, CA (US); Kevin L. Kassing, Bethell, WA (US); Mallory M. Green, II, Goleta, CA (US); Gregory N. Eddington, Santa Barbara, CA (US); Tom R. Zavisca, Santa Barbara, CA (US)

(73) Assignee: GREEN HILLS SOFTWARE LLC, Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/719,054

(22) Filed: Dec. 18, 2019

(65) Prior Publication Data

US 2020/0167265 A1    May 28, 2020

Related U.S. Application Data

(63) Continuation of application No. 15/729,473, filed on Oct. 10, 2017, now Pat. No. 10,528,451.

(Continued)

(51) Int. Cl.
*G06F 11/36* (2006.01)
*G06F 11/30* (2006.01)
(Continued)

(52) U.S. Cl.
CPC ........ *G06F 11/3636* (2013.01); *G06F 11/302* (2013.01); *G06F 11/323* (2013.01);
(Continued)

(58) Field of Classification Search
CPC .......................... G06F 11/3636; G06F 16/904
(Continued)

(56) References Cited

U.S. PATENT DOCUMENTS 6,467,052 B1    10/2002  Kaier et al.
6,751,789 B1 *   6/2004  Berry .................. G06F 11/3466
                                                     714/35

(Continued)

FOREIGN PATENT DOCUMENTS

EP          1172729 A2    1/2002
JP       2010517128 A     5/2010
(Continued)

OTHER PUBLICATIONS

Lorenzoli, Davide, Leonardo Mariani, and Mauro Pezzè. "Automatic generation of software behavioral models." Proceedings of the 30th international conference on Software engineering. ACM, 2008.pp. 501-510 (Year: 2008).*

(Continued)

*Primary Examiner* — Satish Rampuria
(74) *Attorney, Agent, or Firm* — Barcelo, Harrison & Walker, LLP

(57) ABSTRACT

Systems and methods for visualizing and/or analyzing trace data collected during execution of a computer system are described. Algorithms and user interface elements are disclosed for providing user interfaces, data summarization technologies, and/or underlying file structures to facilitate such visualization and/or analysis. Trace data history summarization algorithms are also disclosed. Various combinations of the disclosed systems and methods may be (Continued)

employed, depending on the particular requirements of each implementation.

3 Claims, 65 Drawing Sheets

Related U.S. Application Data

(60) Provisional application No. 62/406,518, filed on Oct. 11, 2016.

(51) Int. Cl.
  *G06F 11/32* (2006.01)
  *G06F 16/904* (2019.01)
  *G06F 16/34* (2019.01)

(52) U.S. Cl.
  CPC ........ *G06F 11/3664* (2013.01); *G06F 16/345* (2019.01); *G06F 16/904* (2019.01)

(58) Field of Classification Search
  USPC ................................. 717/124–135
  See application file for complete search history.

(56) References Cited

U.S. PATENT DOCUMENTS

| | | | |
|---|---|---|---|
| 6,988,263 B1 | 1/2006 | Hussain et al. | |
| 7,546,220 B1* | 6/2009 | Patlashenko | G06F 11/3419 702/182 |
| 2002/0198984 A1 | 12/2002 | Goldstein et al. | |
| 2004/0216097 A1* | 10/2004 | Sun | G06F 12/0891 717/154 |
| 2008/0080778 A1* | 4/2008 | Cheng | H04N 19/176 382/232 |
| 2009/0113400 A1* | 4/2009 | Pelleg | G06F 11/3466 717/130 |
| 2010/0100774 A1* | 4/2010 | Ding | G06F 11/3636 714/45 |
| 2015/0278069 A1* | 10/2015 | Arora | G06F 11/3466 717/130 |

FOREIGN PATENT DOCUMENTS

| | | |
|---|---|---|
| JP | 2003208333 A | 6/2012 |
| JP | 2012248118 A | 12/2012 |

OTHER PUBLICATIONS

Shang, Weiyi, et al. "Assisting developers of big data analytics applications when deploying on hadoop clouds.";2013 35th International Conference on Software Engineering (ICSE). IEEE, 2013. pp. 402-411 (Year: 2013).*

Kuhn, Adrian, and Orla Greevy. "Exploiting the analogy between traces and signal processing.";2006 22nd IEEE International Conference on Software Maintenance. IEEE, 2006.pp. 1-10 (Year: 2006).*

Malony, Allen D., David H. Hammerslag, and David J. Jablonowski. "Traceview: A trace visualization tool." IEEE software 8.5 (1991 ): pp. 19-28. (Year: 1991).*

Srivastava, Amitabh, and Alan Eustace. "ATOM: A system for building customized program analysis tools." Proceedings of the ACM SIGPLAN 1994 conference on Programming language design and implementation. 1994.pp. 196-205 (Year: 1994).*

Reiss, Steven P., and Manos Renieris. "Generating Java trace data." Proceedings of the ACM 2000 conference on Java Grande. 2000.pp. 71-77 (Year: 2000).*

Japanese Patent Abstract (in English) of Japanese Patent App. Pub. No. JP-2003-208333 (A), Pub. Date Jul. 25, 2003, downloaded Jul. 11, 2020, from https://worldwide.espacenet.com.

Japanese Patent Abstract (in English) of Japanese Patent App. Pub. No. JP-2010-517128 (A), Pub. Date May 20, 2010, downloaded Jul. 11, 2020, from https://worldwide.espacenet.com.

Japanese Patent Abstract (in English) of Japanese Patent App. Pub. No. JP-2012-248118 (A), Pub. Date Dec. 13, 2012, downloaded Jul. 11, 2020, from https://worldwide.espacenet.com.

European Patent Abstract (in English) of European Patent App. Pub. No. EP-1172729 (A2), Pub. Date Jan. 16, 2002, downloaded Jul. 11, 2020, from https://worldwide.espacenet.com.

Office Action (in Japanese) for Japanese Patent Application No. 2019-518075, dated Jul. 1, 2020.

English Translation of Office Action, for Japanese Patent Application No. 2019-518075, dated Jul. 1, 2020.

Search Report, for European Patent Application No. 17860549.9, dated Jun. 2, 2020.

Anonymous: "Hash Function", Sep. 15, 2016, XP055696833, downloaded May 19, 2020, from https://wikipedia.org, pp. 1-13.

* cited by examiner 2400     2410     2420     2430     2440

2500     2510

```
1   # This is a simplified version of the summarization engine written in Python.
2   # The data to be summarized is included programmatically at the end of the file,
3   # but could easily be modified to be read in from a file.
4   #
5   # This implementation summarizes a single stream of numeric values and outputs
6   # the summaries to stdout.
7   #
8   # This script was tested with Python version 2.7.8
9
10
11  # Tunable parameters
12  SCALE_FACTOR         = 10      # Bucket size multiplier between summary levels
13  SUMMARY_THRESHOLD    = 10000   # Number of points within a window to summarize
14  WINDOW_BUCKET_COUNT  = 10      # Number of buckets in a window
15
16  # This is the main entry point for summarization. Values should be submitted
17  # in reverse chronological order.
18  def Summarize(timestamp, value):
19      # Write the value to the raw data stream
20      WriteToStream(0, (timestamp, value))
21      # Submit the value for summarization, where it will be accounted for in
22      # a summary or reference at each summary level.
23      AddToResolution(1, SummaryBucket(1, timestamp, ValueToSignature(value)))
24
25  # Finalize should be called after the last call to Summarize. It will flush
26  # everything out of the windows at each resolution so that the summary levels
27  # are complete all the way back to the earliest time.
28  def Finalize():
29      for r in xrange(1, len(levels)):
30          info = levels[r]
31          if not info.buckets.empty():
32              AddToResolution(r+1, info.buckets.head().clone())
33              ShiftOut(r)
34
35  # We keep one ResolutionInfo for each level to track the summary buckets in
36  # the window at that level.
37  class ResolutionInfo:
38      def __init__(self, n):
39          self.bucketSize = SCALE_FACTOR ** n
40          self.windowSize = self.bucketSize * WINDOW_BUCKET_COUNT
41          self.windowCount = 0
42          self.buckets = FIFO()
43          self.refBucket = None
44          self.referencing = False
45
46  # This is an array of ResolutionInfo objects, which will be built up as
47  # more levels need to be created.
48  levels = [None]
49
```

FIG. 37A

```
50      # A summary bucket tracks the summarization of values that fall within a
51      # bucket's time range at a given summary level.
52      class SummaryBucket:
53          def __init__(self, count, timestamp, signature):
54              self.count = count
55              self.timestamp = timestamp
56              self.signature = signature
57          def clone(self):
58              return SummaryBucket(self.count, self.timestamp, self.signature)
59          def __str__(self): return '(%s,%s)' % (self.timestamp, self.count)
60
61      # When a raw point is being summarized, or a bucket is completed at a summary
62      # level, it needs to be merged into the next higher resolution, either to be
63      # combined into an existing bucket or to start a new bucket.
64      def AddToResolution(resolution, bucket):
65          # Initialize the resolution info if this is the first access.
66          if resolution >= len(levels):
67              levels.append(ResolutionInfo(resolution))
68          info = levels[resolution]
69
70          # Align the timestamp to the start of the bucket at this resolution, as
71          # we do not need to track the time extents of points within the bucket.
72          bucket.timestamp -= bucket.timestamp % info.bucketSize
73
74          # Handle the case where there are no points, or the case where the
75          # input bucket falls within the current bucket.
76          if info.buckets.empty():
77              info.buckets.put(bucket)
78              info.refBucket = bucket
79              info.windowCount = bucket.count
80              return
81          elif CombineBuckets(info, bucket):
82              info.windowCount += bucket.count
83              return
84
85          # If we reached this point, there is a bucket that is known to be complete
86          # at this level, which needs to be submitted to the next level.
87          AddToResolution(resolution+1, info.buckets.head().clone())
88
89          # Shift buckets out of the window so that the window size will remain
90          # within WINDOW_BUCKET_COUNT * bucketSize.
91          ShiftOut(resolution, bucket.timestamp)
92
93          # Initialize a bucket at this level from the input bucket.
94          info.buckets.put(bucket)
95          info.windowCount += bucket.count
96
```

FIG. 37B

```
 97     # If the window contains sufficiently few points, move refBucket so that
 98     # everything currently in the window will be part of a reference.
 99     if info.windowCount < SUMMARY_THRESHOLD or not info.refBucket:
100         info.refBucket = bucket
101
102     # This function handles shifting buckets out of the window as the window's
103     # left edge moves back in time. The buckets will either be written as summaries
104     # or be part of a reference.
105     def ShiftOut(resolution, timestamp = None):
106         info = levels[resolution]
107         finalizing = (timestamp is None)
108
109         # If finalizing, shift every bucket out of the window. Else, keep shifting
110         # buckets out until the window size constraint is met.
111         while not info.buckets.empty() and (finalizing or \
112                 info.buckets.tail().timestamp - timestamp > info.windowSize):
113             # Effectively move refBucket before everything in the window if the
114             # point count drops below the threshold.
115             if info.windowCount < SUMMARY_THRESHOLD:
116                 info.refBucket = None
117
118             bucket = info.buckets.get()
119             info.windowCount -= bucket.count
120             if bucket != info.refBucket:
121                 # The reference boundary extends earlier than this bucket, so
122                 # this is definitely part of a reference, possibly one for which
123                 # the end time has already been written.
124                 if not info.referencing:
125                     WriteToStream(resolution, (bucket.timestamp, 'Reference'))
126                     info.referencing = True
127             else:
128                 # This bucket will be written as a summary.
129                 WriteToStream(resolution, (bucket.timestamp, bucket.signature))
130                 info.referencing = False
131                 # Move refBucket so it continues to point within the window.
132                 info.refBucket = info.buckets.tail()
133
134     # Handle the common case where the input bucket falls within the current
135     # bucket at this resolution.
136     def CombineBuckets(info, bucket):
137         current = info.buckets.head()
138         # This comparison works because we already aligned bucket's timestamp.
139         if current.timestamp != bucket.timestamp:
140             return False
141         current.signature = CombineSignatures(current.signature, bucket.signature)
142         current.count += bucket.count
143         return True
144
```

FIG. 37C

```
145   # These functions depend on the signal type and are considered black boxes
146   # by the summarizer. These implementations are for tracking value min/max.
147   def CombineSignatures(x, y):
148       return (min(x[0], y[0]), max(x[1], y[1]))
149   def ValueToSignature(value):
150       return (value, value)
151
152   # The summarizer does not care about the data is stored, just that there are
153   # separate streams for each resolution. In practice this would write to B+
154   # trees.
155   def WriteToStream(level, data):
156       if level > 0:
157           print level, data
158
159   # Simple FIFO data structure
160   class FIFO:
161       def __init__(self): self.q = []
162       def empty(self): return len(self.q) == 0
163       def head(self): return self.q[-1] if self.q else None
164       def tail(self): return self.q[0] if self.q else None
165       def put(self, v): self.q.append(v)
166       def get(self): return self.q.pop(0)
167
168   # These are sample inputs which are passed into the summary engine.
169   for x in xrange(1000): Summarize(300, 0)
170   for x in xrange(1000): Summarize(290, 1)
171   for x in xrange(9000): Summarize(280, 2)
172   for x in xrange(1000): Summarize(270, 3)
173   for x in xrange(1000): Summarize(100, 4)
174   # Flush all data out of each summary level, specifically the buckets which are
175   # still within the window and haven't been written out yet.
176   Finalize()
```

Scale Factor = 2

Window Size = 2

Summary Threshold = 3

FILE OUTPUT

| | | | | |
|---|---|---|---|---|
| Level 3 Summary<br>Bucket Size = 8s | Sum:<br>8s – 1s<br>1-150 ~ 4000 | | | |
| Level 2 Summary<br>Bucket Size = 4s | Sum:<br>8s – 5s<br>1-150 | Sum:<br>4s – 1s<br>10-100 ~ 4010 | | |
| Level 1 Summary<br>Bucket Size = 2s | Sum:<br>8s – 7s<br>1-76 | Sum:<br>6s – 5s<br>99-150 | Sum:<br>4s – 3s<br>12-52 | Ref. 4020<br>2s – 1s<br>~ 4030 |
| Trace Events | 8s 7s 6s 5s 4s 3s 2s 1s<br>1  76 150 99 12 52 100 10 ~ 4040 | | | |

FIG. 40

Scale Factor = 10

Window Size = 1000

Summary Threshold = 10,000

Finest Representable Time: 1 nanosecond

- 1 trace event / sec for 1 billion seconds
- 1 million trace events separated by 1 ns, starting @ t = 1,000,000,000 s

SYSTEMS AND METHODS FOR SUMMARIZATION AND VISUALIZATION OF TRACE DATA

CROSS-REFERENCE TO RELATED APPLICATIONS

This application is a continuation of, and claims the benefit of and priority to, U.S. patent application Ser. No. 15/729,473, entitled "Systems and Methods for Summarization and Visualization of Trace Data," filed on 10 Oct. 2017, now U.S. Published Pat. App. No. 2018-0129589 A1, published on 10 May 2018, which claims priority under 35 U.S.C. § 119 to U.S. Provisional Patent Application No. 62/406,518, filed on 11 Oct. 2016, entitled "Systems and Methods for Summarization and Visualization of Trace Data." The entirety of each of the foregoing patent applications is incorporated by reference herein for all purposes.

BACKGROUND

1. Field of the Disclosure

This disclosure relates generally to systems and methods for visualizing and/or analyzing trace or log data collected during execution of one or more computer systems, and more particularly to providing user interfaces, data summarization technologies, and/or underlying file structures to facilitate such visualization and/or analysis.

2. General Background

A number of debugging solutions known in the art offer various analysis tools that enable hardware, firmware, and software developers to find and fix bugs and/or errors, as well as to optimize and/or test their code. One class of these analysis tools looks at log data which can be generated from a wide variety of sources. Generally this log data is generated while executing instructions on one or more processors. The log data can be generated by the processor itself (e.g., processor trace), by the operating system, by instrumentation log points added by software developers, instrumentation added by a compiler, instrumentation added by an automated system (such as a code generator) or by any other mechanism in the computer system. Other sources of log data, such as logic analyzers, collections of systems, and logs from validation scripts, test infrastructure, physical sensors or other sources, may be external to the system. The data generated by any combination of these different sources will be referred to as "trace data" (and/or as a "stream of trace events") throughout this document. A single element of the trace data will be referred to as a "trace event", or simply an "event." A "stream" of trace events, as that term is used here, refers to a sequence of multiple trace events, which may be sorted by time (either forwards or backwards) or other unit of execution. A stream of trace events may be broken down or assigned into substreams, where a subset of trace events is collected into and comprises a substream. Thus, a substream may also be considered as a stream of trace events. Trace events can represent a wide variety of types of data. Generally speaking they have time stamps, though other representations of units of execution are possible, such as, without limitation number of cycles executed, number of cache misses, distance traveled etc. Trace events also generally contain an element of data. Without limitation, examples of the type of data they represent includes an integer or floating point value, a string, indication that a specific function was entered or exited ("function entry/exit information"), address value, thread status (running, blocked etc), memory allocated/freed on a heap, value at an address, power utilization, voltage, distance traveled, time elapsed and so on.

As used herein, the term "computer system" is defined to include one or more processing devices (such as a central processing unit, CPU) for processing data and instructions that is coupled with one or more data storage devices for exchanging data and instructions with the processing unit, including, but not limited to, RAM, ROM, internal SRAM, on-chip RAM, on-chip flash, CD-ROM, hard disks, and the like. Examples of computer systems include everything from an engine controller to a laptop or desktop computer, to a super-computer. The data storage devices can be dedicated, i.e., coupled directly with the processing unit, or remote, i.e., coupled with the processing unit over a computer network. It should be appreciated that remote data storage devices coupled to a processing unit over a computer network can be capable of sending program instructions to the processing unit for execution. In addition, the processing device can be coupled with one or more additional processing devices, either through the same physical structure (e.g., a parallel processor), or over a computer network (e.g., a distributed processor). The use of such remotely coupled data storage devices and processors will be familiar to those of skill in the computer science arts. The term "computer network" as used herein is defined to include a set of communications channels interconnecting a set of computer systems that can communicate with each other. The communications channels can include transmission media such as, but not limited to, twisted pair wires, coaxial cable, optical fibers, satellite links, or digital microwave radio. The computer systems can be distributed over large, or "wide," areas (e.g., over tens, hundreds, or thousands of miles, WAN), or local area networks (e.g., over several feet to hundreds of feet, LAN). Furthermore, various local-area and wide-area networks can be combined to form aggregate networks of computer systems. One example of such a confederation of computer networks is the "Internet".

As used herein, the term "target" is synonymous with "computer system". The term target is used to indicate that the computer system which generates the trace events may be different from the computer system which is used to analyze the trace events. Note that the same computer system can both generate and analyze trace events.

As used herein, the term "thread" is used to refer to any computing unit which executes instructions. A thread will normally have method of storing state (such as registers) that are primarily for its own use. It may or may not share additional state storage space with other threads (such as RAM in its address space). For instance, this may refer to a thread executing inside a process when run in an operating system. This definition also includes running instructions on a processor without an operating system. In that case the "thread" is the processor executing instructions, and there is no context switching. Different operating systems and environments may use different terms to refer to the concept covered by the term thread. Other common terms of the same basic principle include, without limitation, hardware thread, light-weight process, user thread, green thread, kernel thread, task, process, and fiber.

A need exists for improved trace data visualization and/or analysis tools that better enable software developers to understand the often complex interactions in software that can result in bugs, performance problems, and testing difficulties. A need also exists for systems and methods for presenting the relevant trace data information to users in easy-to-understand displays and interfaces, so as to enable software developers to navigate quickly through potentially large collections of trace data.

Understanding how complex and/or large software projects work and how their various components interact with each other and with their operating environment is a difficult task. This is in part because any line of code can potentially have an impact on any other part of the system. In such an environment, there is typically no one person who is able to understand every line of a program more than a few hundred thousand lines long.

As a practical matter, a complex and/or large software program may behave significantly differently from how the developers of the program believe it to work. Often, a small number of developers understand how most of the system works at a high level, and a large number of developers understand the relatively small part of the system that they work on frequently.

This frustrating, but often unavoidable, aspect of software system development can result in unexpected and difficult-to-debug failures, poor system performance, and/or poor developer productivity.

It is therefore desirable to provide methods and systems that facilitate developers' understanding and analysis of the behavior of such large/complex programs, and that enable developers to visualize aspects of such programs' operation.

When a typical large software program operates, billions of trace events may occur every second. Moreover, some interesting behaviors may take an extremely long time (whether measured in seconds, days, or even years) to manifest or reveal themselves.

The challenge in this environment is providing a tool that can potentially handle displaying trillions of trace events that are generated from systems with arbitrary numbers of processors and that may cover days to years of execution time. The display must not overwhelm the user, yet it must provide both a useful high-level view of the whole system and a low-level view allowing inspection of the individual events that may be occurring every few picoseconds. All of these capabilities must be available to developers using common desktop computers and realized within seconds of such developers' requests. Such a tool enables software developers to be vastly more efficient, in particular in debugging, performance tuning, understanding, and testing their systems.

Various systems, methods, and techniques are known to skilled artisans for visualizing and analyzing how a computer program is performing.

For example, the PATHANALYZER™ (a tool that is commercially available from Green Hills Software, Inc.) uses color patterns to provide a view of a software application's call stack over time, and it assists developers in identifying where an application diverts from an expected execution path. PATHANALYZER™ allows the user to magnify or zoom in on a selected area of its display (where the width of the selected area represents a particular time period of the data). It additionally allows the user to move or pan left and right on a magnified display to show earlier and later data that may be outside of the current display's selected time period. However, the call stack views that are available from this tool pertain to all threads in the system, and the tool does not separate threads into distinct displays. It is therefore difficult for developers who are using it to keep track of the subset of threads that are of most interest to them. PATHANALYZER™, moreover, does not provide a visualization for a single thread switching between different processors in the system.

In addition, the visualization capabilities of the PATHANALYZER™ tool typically degrade when it is dealing with large ranges of time and large numbers of threads. For example, the system load is not represented, and the areas where more than one call occurs within a single pixel-unit of execution are shaded gray. As a result, it is difficult for developers to analyze large ranges of time. The rendering performance of this tool is also limited by its need to perform large numbers of seeks through analyzed data stored on a computer-readable medium (such as a hard disk drive). This makes the tool impractical for viewing data sets larger than about one gigabyte. Finally, there are limited capabilities for helping the user to inspect the collected data, or restrict what is displayed to only the data that is relevant to the task at hand.

Other tools known to skilled artisans for program debugging/visualization include so-called "flame graphs." Flame graphs may provide call stack views that appear similar to the views of the PATHANALYZER™ tool described above; however, in flame graphs, each path through the call stack of a program is summed in time, and only the total time for a path is displayed. As a result, there is no good way to see outliers or interactions between threads in terms of unusually long or short execution times for function calls. In addition, flame graphs operate on vastly smaller data sets because most information is removed during their analysis. Moreover, flame graphs provide relatively inferior visualization methods. For example, they do not provide adequate zooming/panning views, and there is no integration with (1) events at the operating system (OS) level, (2) events generated internally by the computer system, (3) interactions between threads, or (4) events generated outside of the computer system.

Accordingly, it is desirable to address the limitations in the art. Specifically, as described herein, aspects of the present invention address problems arising in the realm of computer technology by application of computerized data summarization, manipulation, and visualization technologies.

BRIEF DESCRIPTION OF THE DRAWINGS

By way of example, reference will now be made to the accompanying drawings, which are not to scale.

FIGS. 37A through 37D depict an embodiment of the summarization engine according to aspects of the present invention, written in the Python language.

FIGS. 38A through 38C depict an exemplary raw input data stream and the corresponding file output of data summarization processing according to certain embodiments of the present invention.

FIG. 40 depicts exemplary file output according to certain embodiments of the present invention, corresponding to the output of the summarization process on the received raw data stream depicted in FIG. 39.

FIGS. 47 and 48 depict interfaces for searching trace data according to certain embodiments of the present invention.

Figure 51:
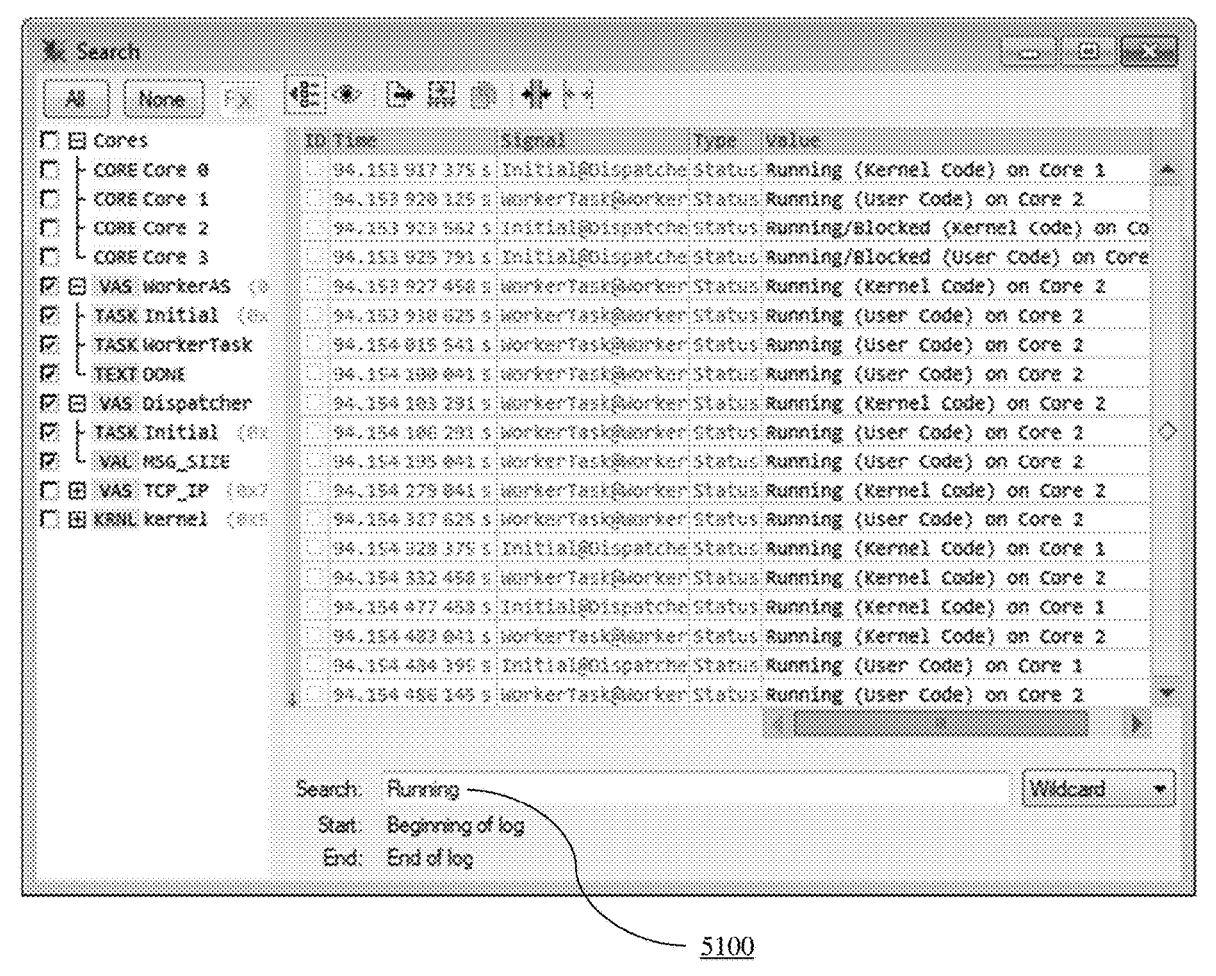

FIGS. 51 and 52 depict interfaces for searching trace data according to certain embodiments of the present invention.

DETAILED DESCRIPTION

Figure 1:
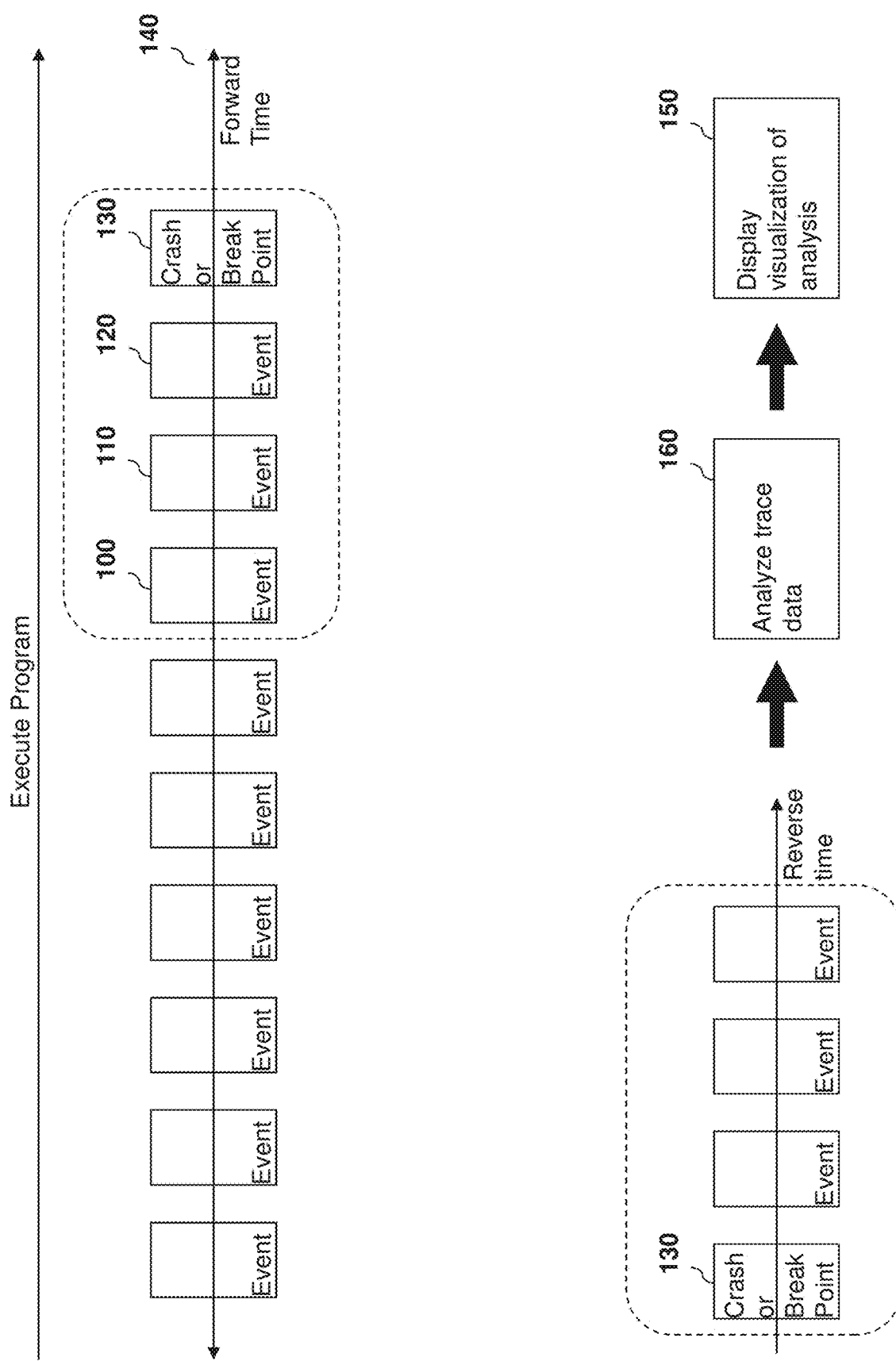
FIG. 1 is an exemplary high-level diagram depicting aspects of certain embodiments of the present invention.

Those of ordinary skill in the art will realize that the following description of the present invention is illustrative only and not in any way limiting. Other embodiments of the invention will readily suggest themselves to such skilled persons upon their having the benefit of this disclosure. Reference will now be made in detail to specific implementations of the present invention, as illustrated in the accompanying drawings. The same reference numbers will be used throughout the drawings and the following description to refer to the same or like parts.

In certain embodiments, aspects of the present invention provide methods and systems to help developers analyze visually, debug, and understand the execution of a computer program (1) of arbitrary software complexity and size, (2) with arbitrarily long periods of execution time, and/or (3) with arbitrarily large traces of program execution.

Debugging/Visualization Environment

In certain embodiments, systems and methods according to aspects of the present invention provide a visual, time-based overview of trace data collected during execution of a computer system to assist in determining (1) how program execution resulted in a specific scenario or state, (2) how and where time is being spent on execution of various processes comprising the program under test, and/or (3) whether the program under test is executing unexpectedly.

To answer the first question (essentially, "How did I get here?") in certain embodiments, systems and methods according to aspects of the present invention display a timeline of traced events that have occurred in the recent past, including, without limitation, function calls, context switches, system calls, interrupts, and custom-logged events. To provide the answer to this question as quickly as possible, all trace data is summarized in reverse order from the end of the log, and the visualization tool displays partial trace data even as more data is being analyzed.

To answer the second question (essentially, "Where is time being spent?"), methods and systems are provided according to aspects of the present invention to determine which threads are running, when the threads are running and for how long, when and how threads interact, and which function calls take the most time, among other methods and systems that may be provided depending on the requirements of each particular implementation.

To answer the third question (essentially, "Is my program doing anything unexpected?"), methods and systems are provided according to aspects of the present invention to help a user discover whether there are any outliers among calls to a particular function, whether a thread has completed its work within a deadline, and whether a thread that handles an event is getting scheduled as soon as it should be, among other methods and systems that may be provided depending on the requirements of each particular implementation.

A variety of methods and systems have been developed according to aspects of the present invention that address the typical problems inherent in visualization systems for large/complex programs. Without limitation, as described in more detail throughout this document, these methods and systems facilitate implementation of the following features:

1. Visualization of interactions and the relationship between different threads;
2. Hiding of unimportant information/focusing on important information;
3. Displaying large volumes of data in ways that allow the user to quickly identify areas of interest for closer inspection;
4. Rapid movement through arbitrarily large data sets, and assistance with focusing in on the most relevant information;
5. Handling time scales from picoseconds to decades in the same data set;
6. Efficient storage of analyzed data for events that occur at arbitrary time intervals;
7. Rapidly displaying data sets with trillions of events at an arbitrary zoom scale;
8. Support for users to employ the tool even while the tool continues to inspect and process the log data; and
9. Displaying the most relevant information first so that the user can begin their analysis without having to wait for the tool to inspect all log data.

FIG. 1 is an exemplary high-level diagram, depicting aspects of certain embodiments of the present invention, where the user wishes to know how a system reached a specific state ("How did I get here?"). As shown in FIG. 1, execution of one or more exemplary programs on one or more computer systems progresses in a forward direction (see arrow 140). As the program executes, events occur (e.g., events 100, 110, 120, and 130), and trace data regarding relevant events is collected and stored. In the debugging/analysis phase (i.e., in the bottom portion of FIG. 1), the events are processed in reverse order in certain embodiments, starting with the crash or breakpoint (130). As the events are analyzed and summarized (160) as detailed elsewhere in this document, they are displayed (150) as described in detail herein.

History User Interface Description

Figure 2:
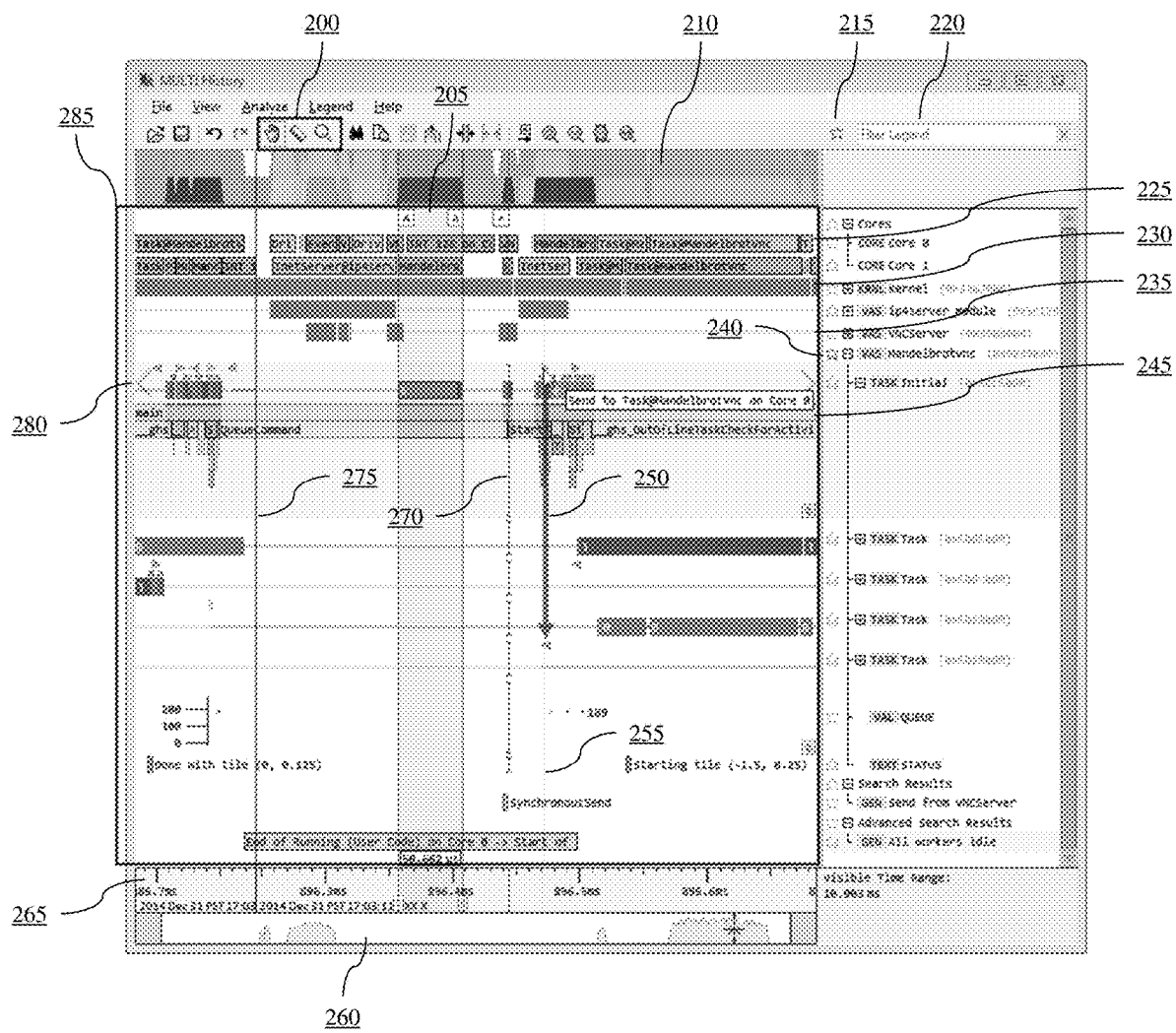
FIG. 2 depicts a user interface that implements aspects of trace data visualization according to certain embodiments of the present invention.

FIG. 2 depicts a user interface, designated as the "History window," that implements aspects of trace data visualization according to certain embodiments of the present invention. Buttons (200) are used in a click-and-drag mode (which, depending on the button selected, may allow a user to pan, select a time range, or zoom when the user clicks and drags in the graph pane (285)). A bookmarked selection is indicated by region 205, as described elsewhere. Region 210 comprises an activity graph, which is described in more detail below. Item 215 is a star button, and is related to star 240, both of which are described in more detail elsewhere. Filter 220 comprises a filter legend. The graph pane (285) further comprises a guide (255), a TIMEMACHINE® cursor (270), a thread interaction arrow (250), navigation arrows (e.g., 280), and one or more hidden debug time indicators (275). The primary data, called display signals, run horizontally across the graph pane. FIG. 2 includes display signals representing processors (225), processes (230 and 235), and call stack graphs (245). Below the graph pane (285), the History window comprises a time axis indicator (265) and a thumbnail pane (260). All of these are described in more detail in this document, in the context of exemplary embodiments.

Figure 3:
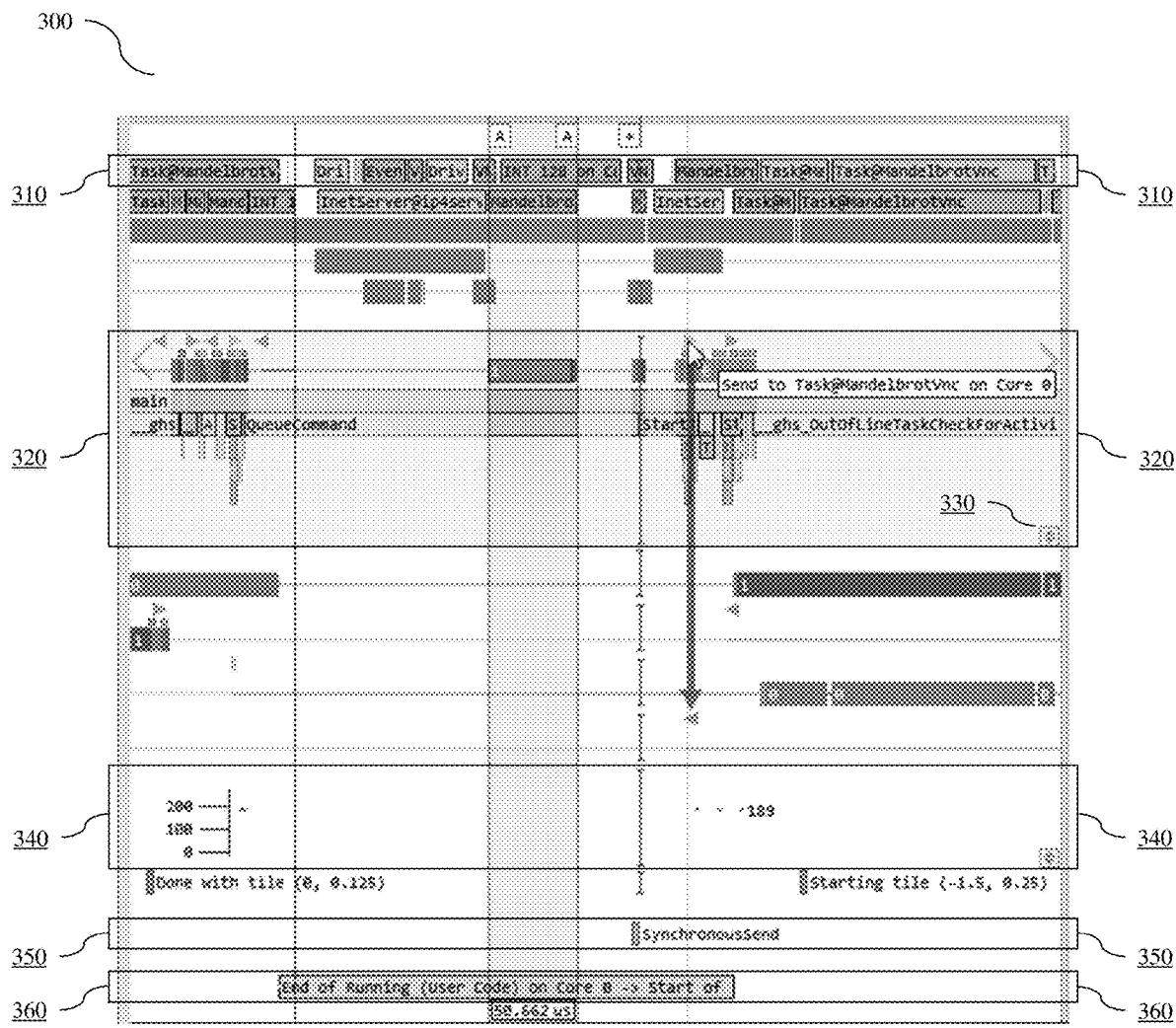
FIG. 3 depicts user interface details relating to trace data visualization according to certain embodiments of the present invention.

FIG. 3 depicts user interface details relating to trace data visualization according to certain embodiments of the present invention. FIG. 3 provides a different view of the graph pane (285) of FIG. 2, now designated as 300. The graph pane (285/300) provides an overall picture of what is happening in a user's system in certain embodiments. It contains one or more display signals (e.g., signals 310, 320, 340, 350, and 360). Signals represent streams of time-stamped trace events having arbitrary size. The display signal data on the right side of the graph pane is more recent; the data on the left is less recent. In certain embodiments, the time-stamped nature of the trace events is advantageously used to display the various signals that are depicted in the graph pane (285/300), or other relevant displays, in a time-synchronized manner, regardless of the display zoom level selected by the user.

Figure 4:
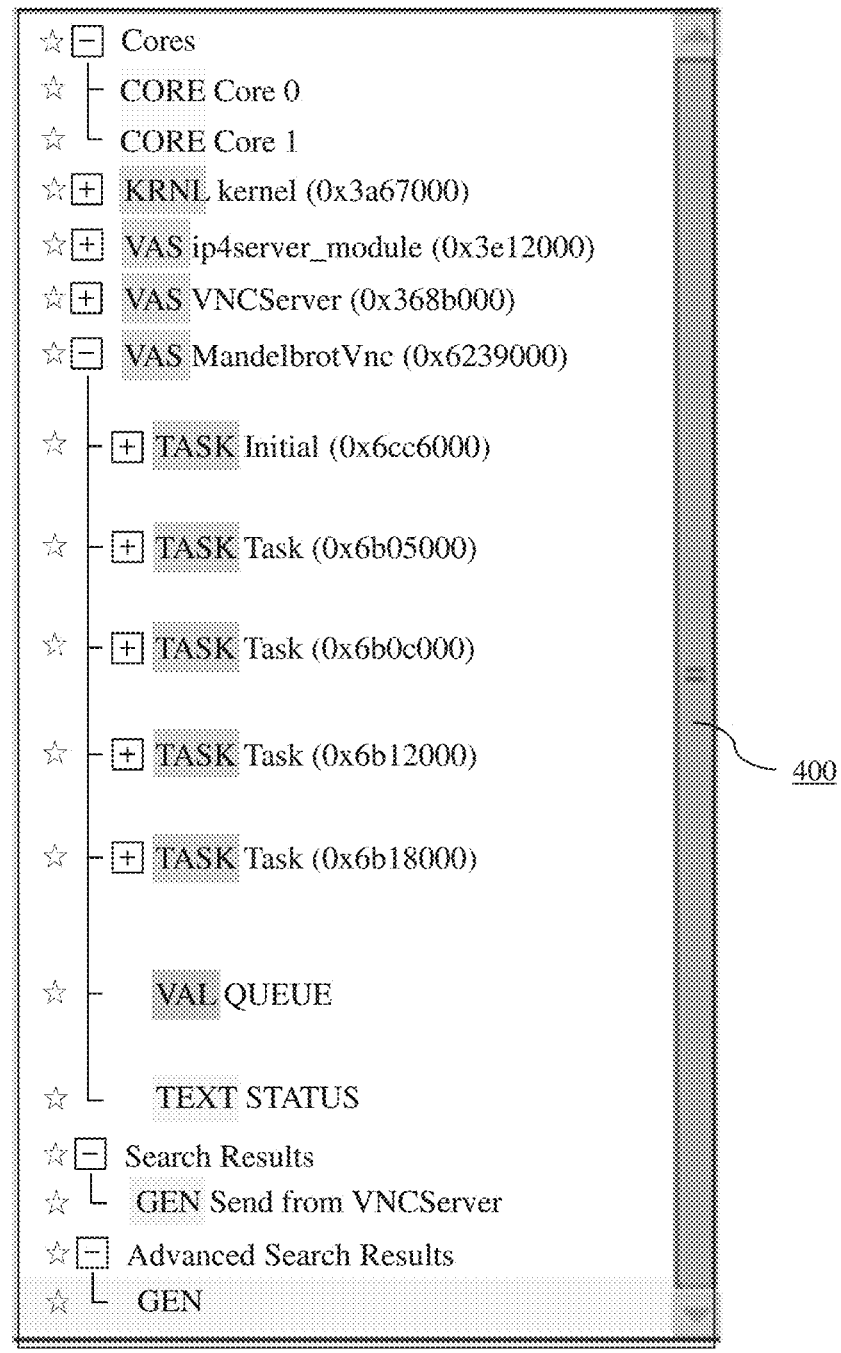
FIG. 4 depicts a legend display relating to trace data visualization according to certain embodiments of the present invention.

The legend lists display signals that are shown in the graph pane in certain embodiments (see, for example, the legend display in FIG. 4), and it provides a vertical scroll bar (400) for the graph pane. Display signals are ordered hierarchically where applicable. For example, a thread is grouped under the process that contains it. In certain embodiments, a plus sign (+) next to the name of a thread display signal indicates that additional information related to that thread, such as a call stack graph, is available for display. Clicking the plus sign displays the data.

Figure 5:
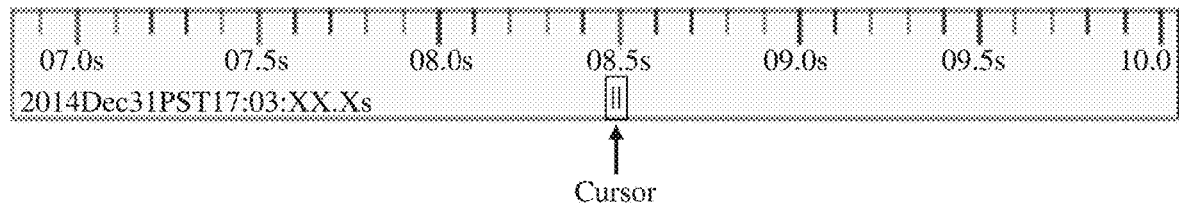
FIGS. 5 and 6 depict exemplary displays relating to trace data visualization according to certain embodiments of the present invention, showing the time axes used for measuring the lengths of events being displayed.
Figure 6:

In certain embodiments, the time axis (see, for example, FIG. 5) helps users determine when particular events occurred. It displays system time or local time for the time-stamped and time-synchronized log or trace data currently displayed in the graph pane. The value displayed in the bottom-left corner of the time axis provides a base start time. A user can estimate the time at any point along the axis by substituting an incremental value for the Xs (if any) in the base start time. For example, given the base start time of 17:03:XX.Xs in FIG. 5, the estimated time of the cursor is 2014 Dec. 31 Pacific Standard Time, 17 hours, 3 minutes, and 8.5 seconds. If the TIMEMACHINE® Debugger is processing a run control operation in certain embodiments, animated green and white arrows (or other suitably colored visual indicators) appear in the time axis to indicate that the operation is in progress (see, for example, FIG. 6). In certain embodiments the time axis may show information for other units. For instance without limitation, instead of a time axis there could be a memory allocated axis, or a cache misses axis, or a distance traveled axis, or a power used axis. Further information on units other than time is described in more detail below. Generally this document describes embodiments that use time as the axis (or unit of execution) to which events are correlated. However, skilled artisans will readily understand how to apply the same principle to other units of execution.

Figure 7:
FIG. 7 depicts an exemplary display relating to trace data visualization according to certain embodiments of the present invention, showing a thumbnail pane displaying the system load for summarized data.

In certain embodiments, the thumbnail pane shows a progress bar while trace data is being summarized. The progress bar appears in the thumbnail pane, both providing an estimate for how long the summarizing process will take to finish, and indicating the relative amount of traced time that has been analyzed compared to what is yet to be analyzed (see, for example, FIG. 7).

Seeing how Events in Different Display Signals Relate to Each Other

Figure 8:
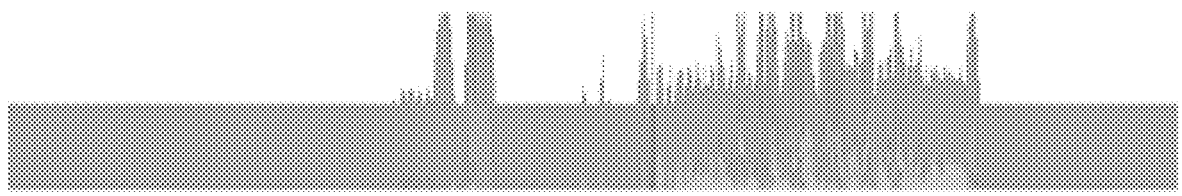
FIGS. 8 and 9 depict activity graph interface displays relating to trace data visualization according to certain embodiments of the present invention.
Figure 9:
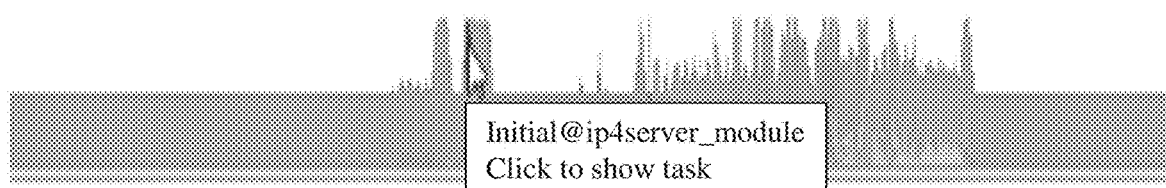

In certain embodiments, the activity graph stacks all thread display signal graphs on top of one another (see, for example, the activity graph shown in FIG. 8). Each color in the activity graph represents a different thread so that the user can see the contribution of each thread to the system load. The color assigned to a thread in the activity graph is the same as that used for the thread when the graph pane display is zoomed in on a processor display signal. Gray coloring indicates the collective processor utilization of all threads whose individual processor utilization is not large enough to warrant showing a distinct colored section. In certain embodiments, this occurs when the representation of a thread's execution requires less than one pixel's worth of vertical space (note this is not a pixel-unit of execution, as we are referring to the value axis, not the unit of execution time axis). Certain embodiments may blend the colors of the underlying threads which each represent less than a pixel instead of showing a gray region. In certain embodiments, a user may hover over a colored region (not a gray region) to view a tooltip with the associated thread and process name, and they may click the colored region to view the associated thread in the graph pane (see, for example, FIG. 9). In certain embodiments, the activity graph is time-correlated with the data in the graph pane, though it is not part of the graph pane.

Figure 10:
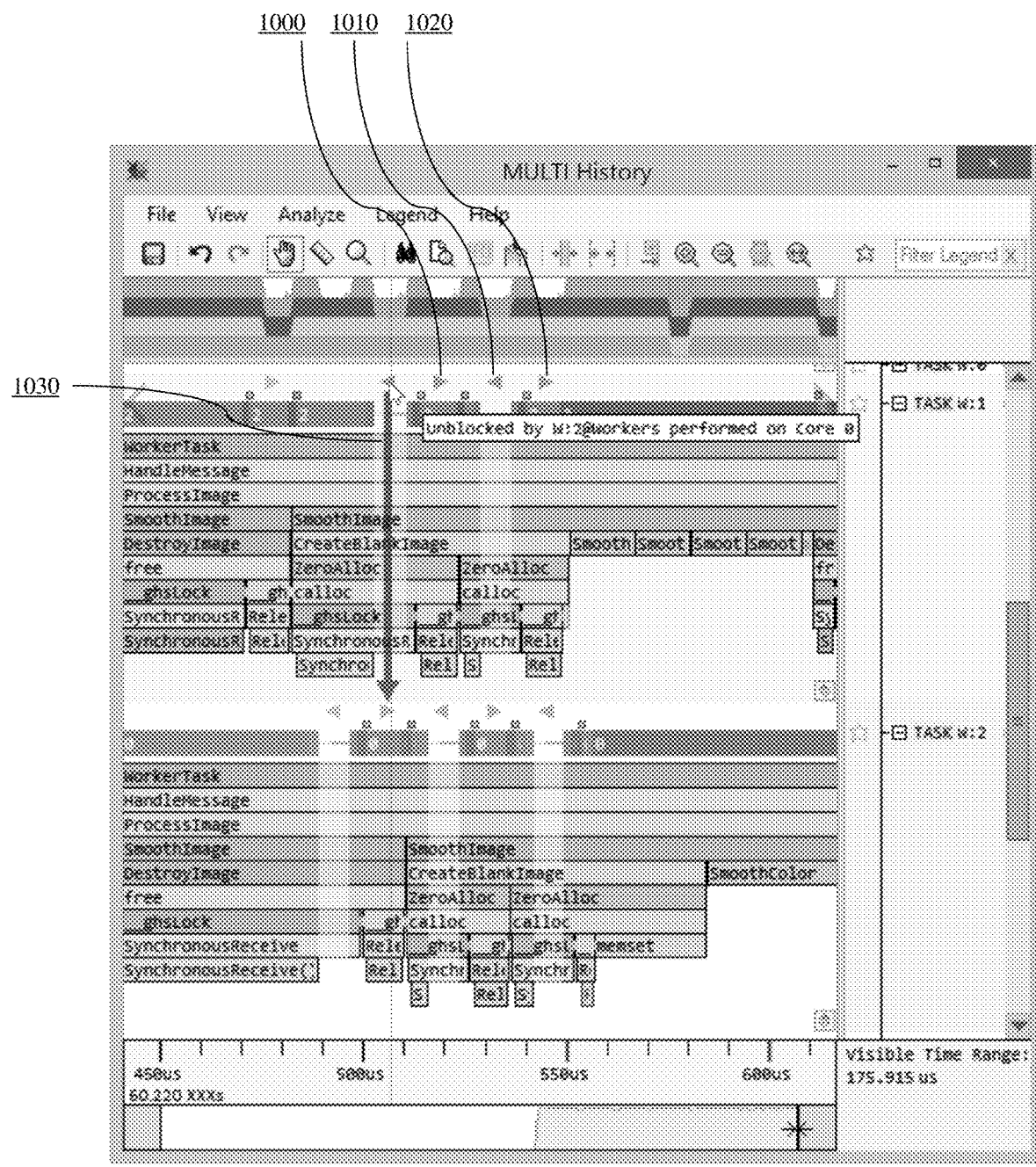
FIG. 10 depicts a user interface display relating to trace data visualization according to certain embodiments of the present invention, showing two call stack graph displays stacked on top of each other.

FIG. 10 depicts a thread display signal user interface (depicting two call stack graphs stacked on top of each other) relating to trace data visualization according to certain embodiments of the present invention. As shown in FIG. 10, in certain embodiments, multiple call stack graphs may be shown simultaneously, with full time synchronization across the horizontal (time) axis, regardless of zoom level. This feature is advantageous in certain embodiments, such as symmetric multiprocessor system (SMP) debugging environments, in which multiple processors execute threads or functions simultaneously.

When the graph pane display is zoomed in, in certain embodiments thread display signals show detailed thread status data including, without limitation, system calls (1105 in FIG. 11), thread interactions (1100 in the same figure), and context switches. Often, the most important piece of information about a thread is its execution status. To delineate this, a thick or thin status line is used. When a thread is not executing, a thin line is displayed in the thread display signal (e.g., regions 1130 and 1125 in FIG. 11). In certain embodiments, the coloring of the thin line indicates the reason why the thread is not currently executing. For example, in certain embodiments, yellow means that the thread is blocked (e.g., region 1130 in FIG. 11), and green means it is ready to run (e.g., region 1125 in the same figure). When a thread is executing, a thick bar is displayed (e.g., regions 1140 and 1115 in FIG. 11). In certain embodiments on a multiprocessor system, the number of the processor that the thread was executing on appears in this bar and determines the color used for the bar. Different colors allow users to pick out points in time when the thread transitioned between processors. Many transitions may indicate context switching overhead, potential inefficiencies in the use of the cache, etc.

In certain embodiments, the color of the running state can be altered to indicate the type of code executing. For example, in FIG. 11, the ranges represented by 1140 and 1115 are thick, indicating that the thread is executing. However, at 1145 and 1120, the color is darker, which, in certain embodiments, indicates that the thread is executing user code. At 1135 and 1110, the color is lighter, indicating that the kernel is executing code on behalf of the thread. In an SMP system, the time spent in the kernel waiting for a lock may be indicated by another color.

To facilitate visualization of interactions and relations between different threads, embodiments of the present invention provide visualizations of the call stack of threads in "call stack graphs". These call stack graphs show the function flow of a program in terms of time (or in certain embodiments other representations of the unit of execution). The user interface shows a plurality of call stack graphs separated such that each thread is associated with its own call stack graph. In certain embodiments, thread communication icons in the call stack graphs visually indicate where one thread interacts with another. This facilitates rapid navigation to other threads as needed. Examples of such thread interactions include, without limitation, direct communication between threads (such as when one thread sends data to another) and indirect communication (such as when one thread releases a semaphore or mutex that another thread is blocked on, thereby waking up the blocked thread). For example, in FIG. 10, arrows 1000, 1010, and 1020 point out three communication points between threads. In certain embodiments, additional indicators reveal which threads are communicating. This is demonstrated by the arrow (1030 in FIG. 10) that appears when the user positions the mouse over a communication indicator icon.

Thread activity graphs, described above, enable a user to see which threads were executing at approximately the same time as a point of interest, and to quickly navigate to any such threads. Certain embodiments allow clicking on the representation of a thread in the activity graph to show the thread in the graph pane.

Figure 12:
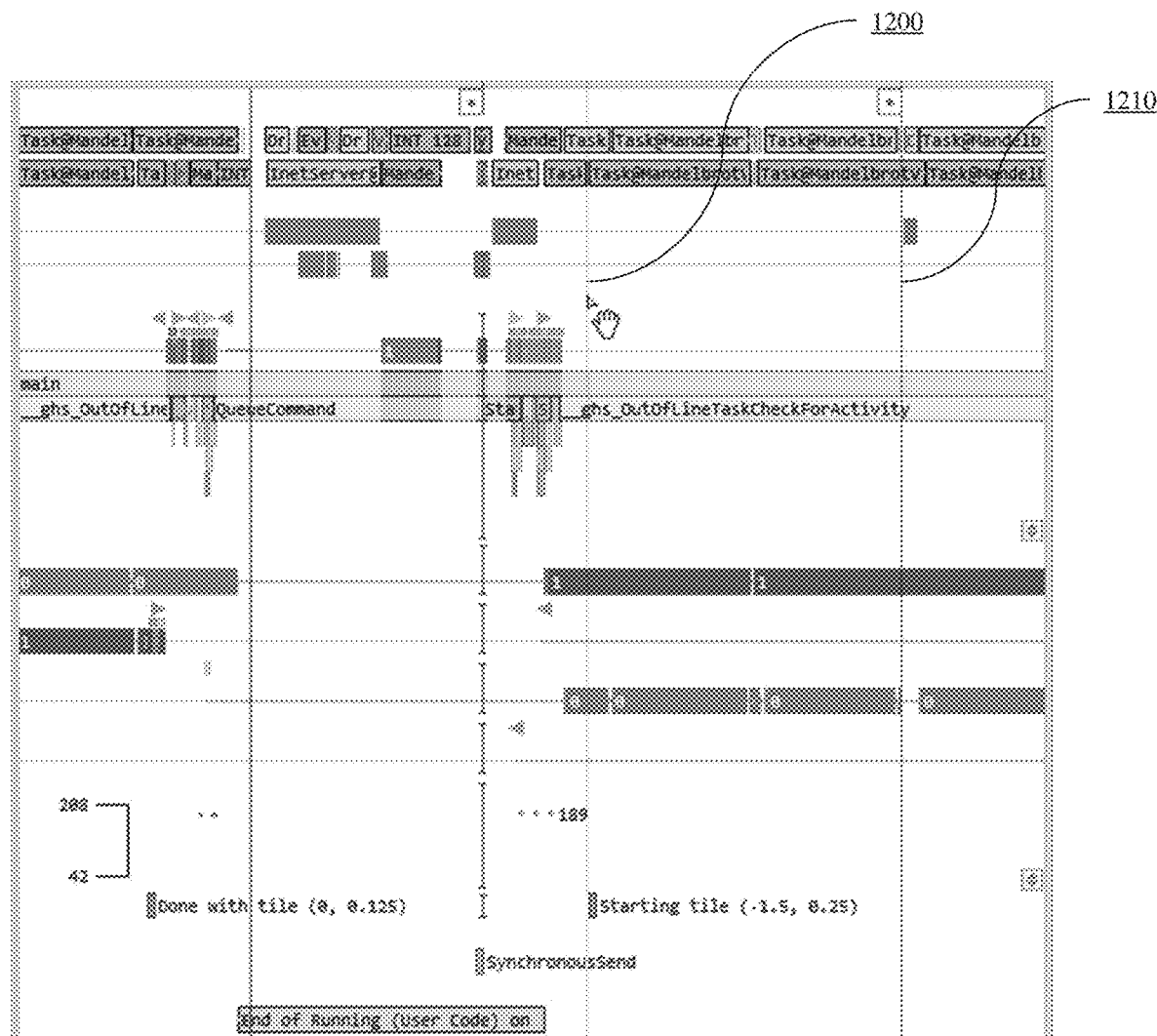
FIG. 12 depicts a user interface display relating to trace data visualization according to certain embodiments of the present invention, showing guide and cursor details.
Figure 13:
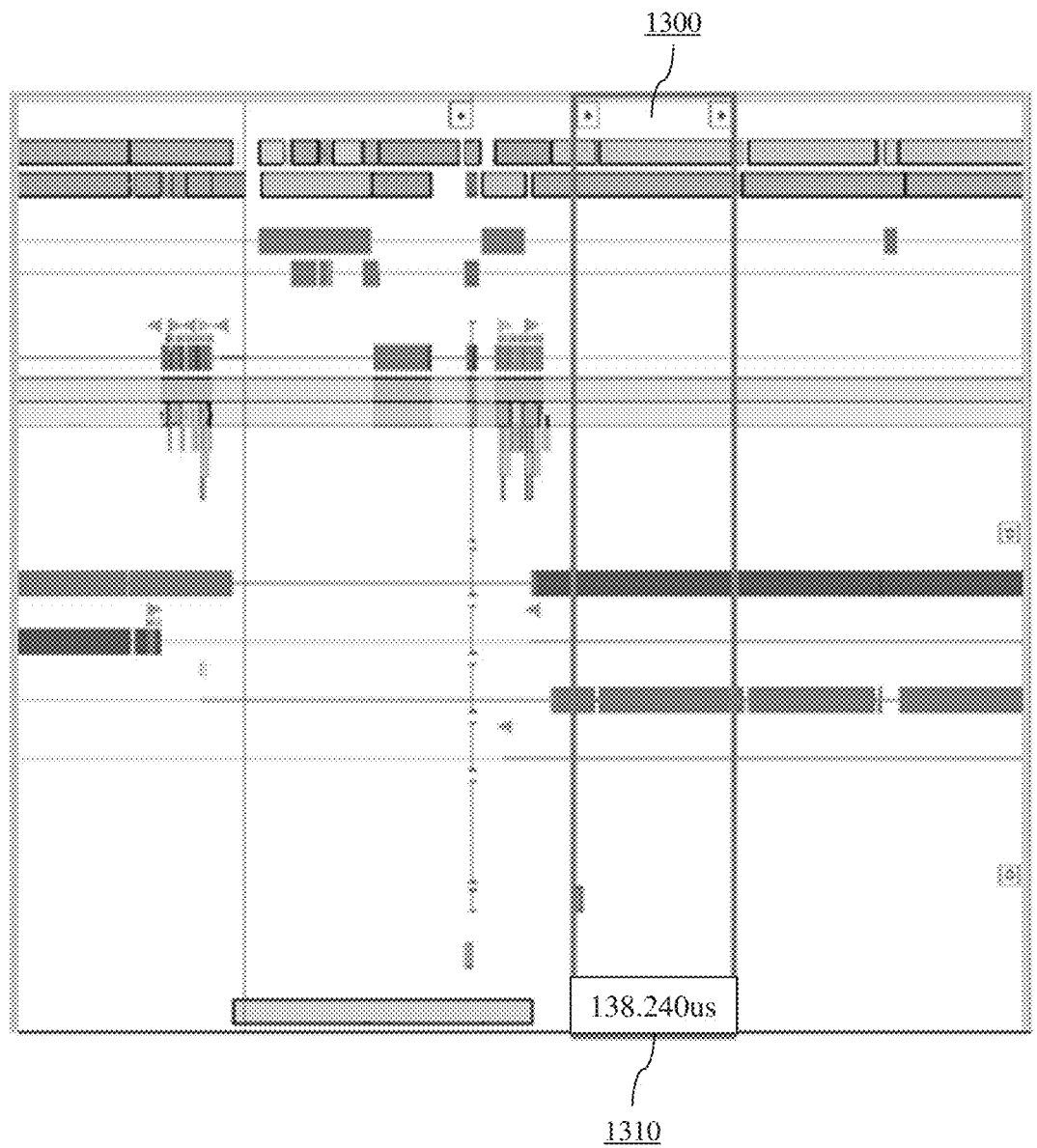
FIG. 13 depicts a user interface display relating to trace data visualization according to certain embodiments of the present invention, showing selection details.

In certain embodiments, as shown in FIG. 12, the guide (1200) helps a user to estimate the time of an event, more easily determine whether two events occurred simultaneously, and determine the chronological ordering of two near events. This can be useful when data entries are separated by a lot of vertical space in the graph pane. In certain embodiments, the guide (1200) follows the mouse. In certain embodiments, the cursor (1210) is like the guide (1200), except that its position is static until a user single-clicks in a new location. In certain embodiments, the cursor and the selection are mutually exclusive. In certain embodiments, the selection (for example, region 1300 shown in FIG. 13) shows what time range certain actions are limited to. Making a selection is also a good way to measure the time between two events; the duration of the selection (1310) is displayed at the bottom of the graph pane.

Figure 14:
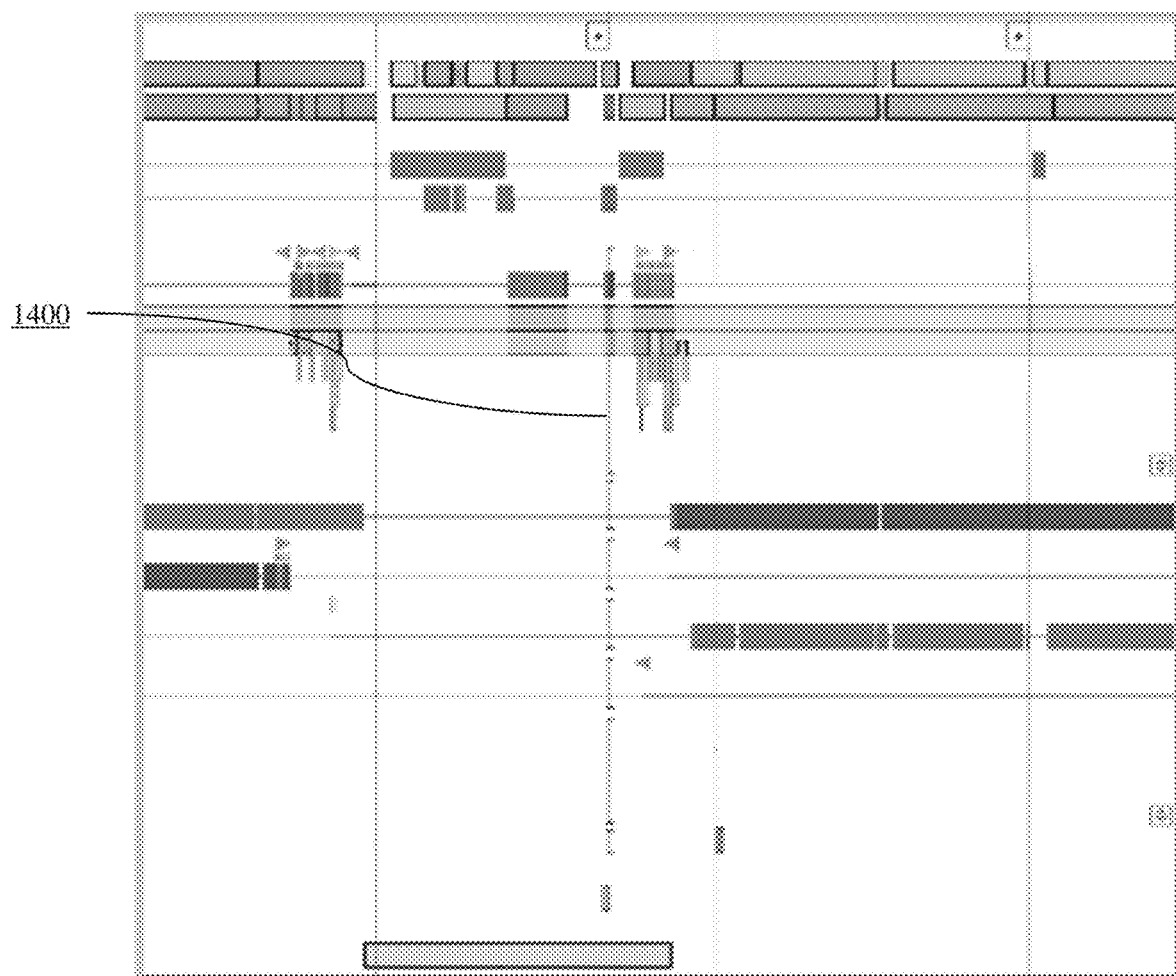
FIG. 14 depicts a user interface display relating to trace data visualization according to certain embodiments of the present invention, showing TIMEMACHINE® cursor details.

The TIMEMACHINE® cursor in certain embodiments (see, for example, item 1400 in FIG. 14) pinpoints a user's location in the TIMEMACHINE® Debugger (if applicable). It is green if the TIMEMACHINE® Debugger is running, and blue if it is halted. The TIMEMACHINE® cursor appears only in processor display signals and display signals belonging to processes that have been configured for TIMEMACHINE® debugging. In multiprocessor systems, certain embodiments of a TIMEMACHINE® implementation may need to represent different times or processors. As a result, the TIMEMACHINE® cursor might not mark a uniform instant in time across all processors and threads.

Reducing the Volume of Information Presented

Developers using debugging/visualization tools often encounter several classes of unimportant information that may interfere with their ability to focus on and understand the use case at hand. According to aspects of the present invention, systems, methods, and techniques for reducing this information may be applied, not only to the main display of information, but also to the variety of search and analysis capabilities that the tool provides in certain embodiments.

Figure 15:
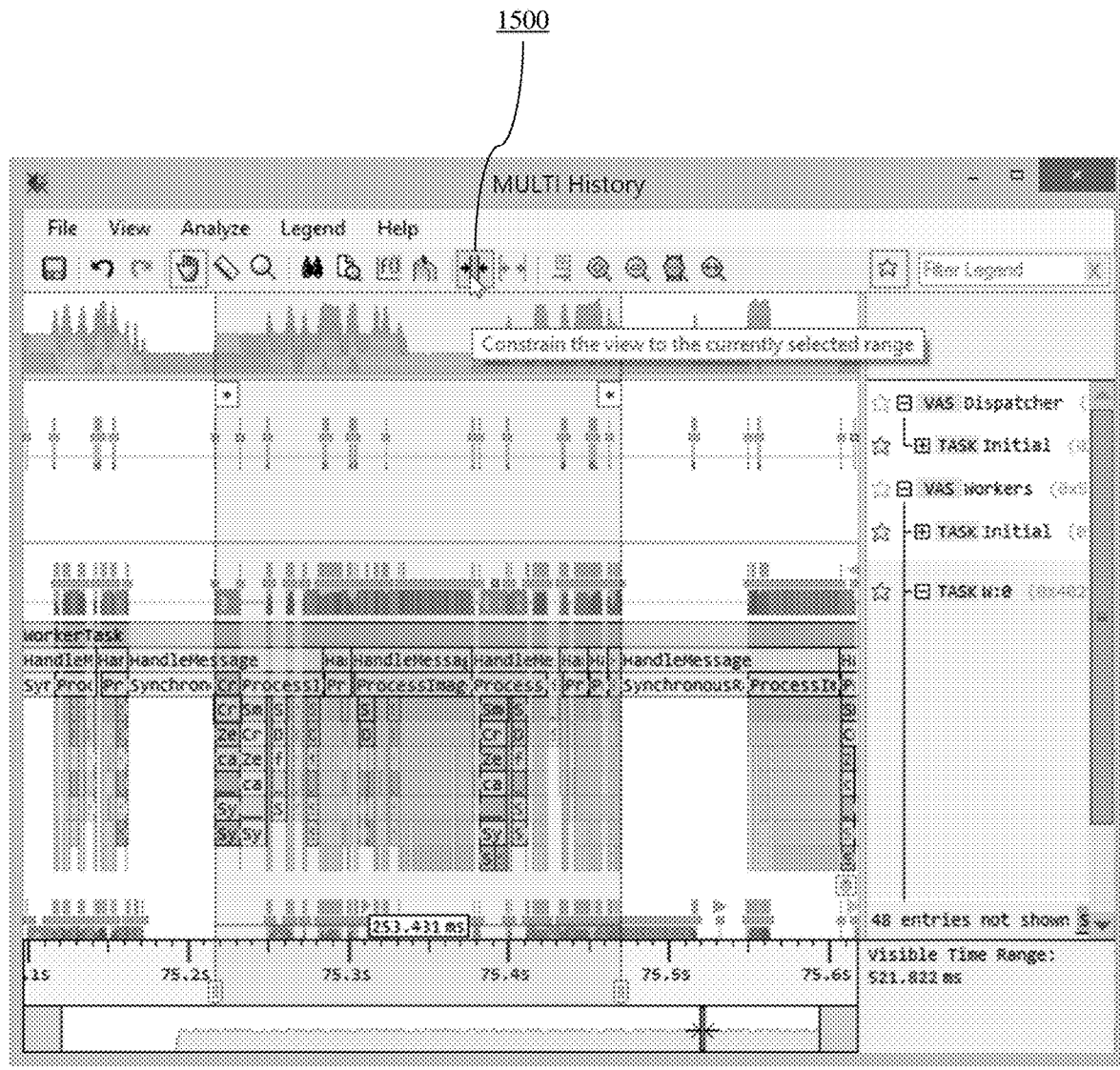
FIGS. 15 and 16 depict user interface displays relating to constraining the visualization of trace data to a specified time range according to certain embodiments of the present invention.
Figure 16:
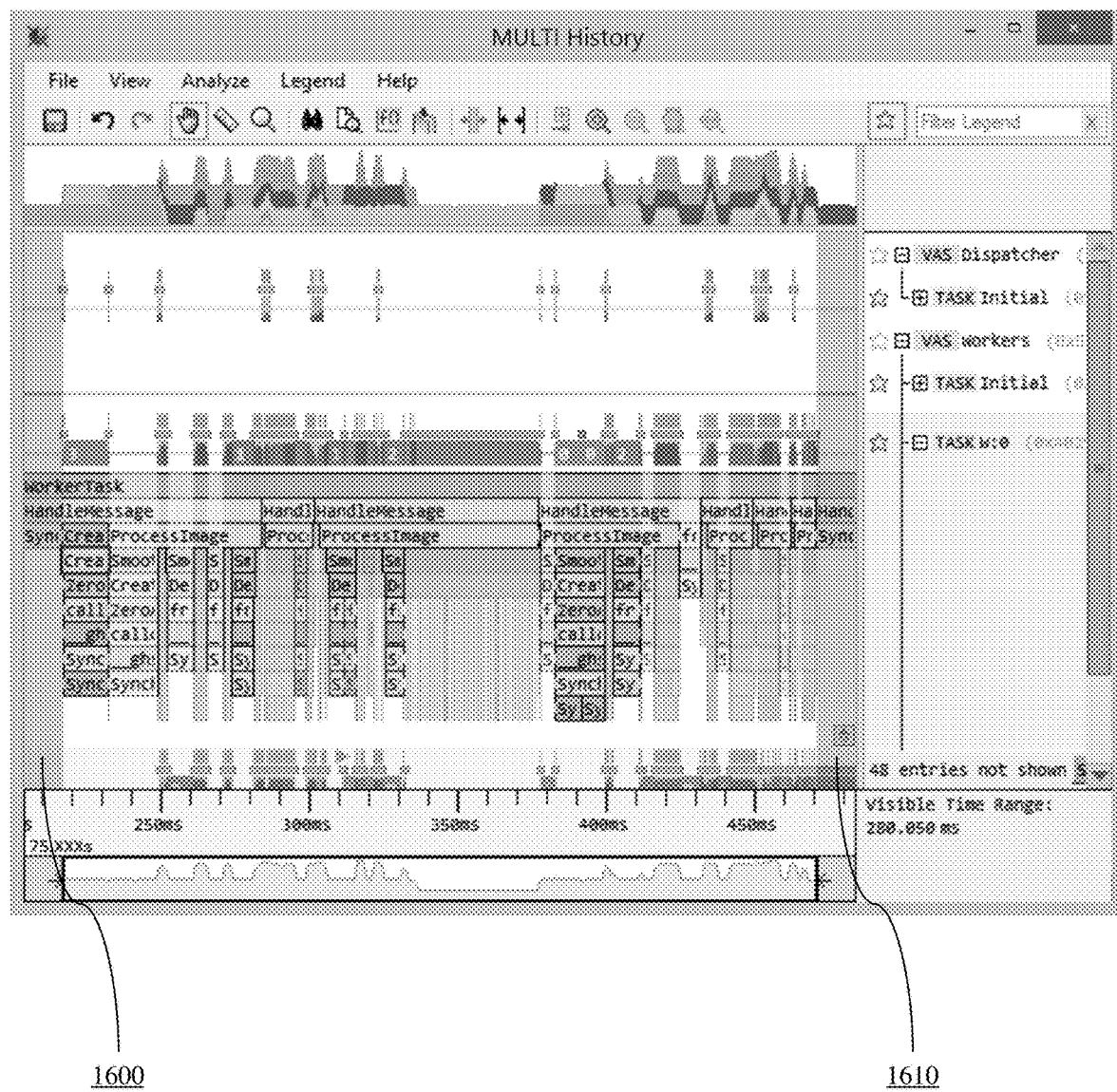

Unimportant information may include ranges of time containing execution information that is not interesting to the user. According to aspects of the present invention, a user can specify a range of interesting time, and exclude from the display and search results everything outside of that range. For example, see FIG. 15, where the button labeled 1500 is about to be clicked to constrain the view to the selected range of time, and FIG. 16, where 1600 and 1610 are dimmed to indicate that there is additional data on either side of the constrained view that is not being included in the display.

Figure 17:
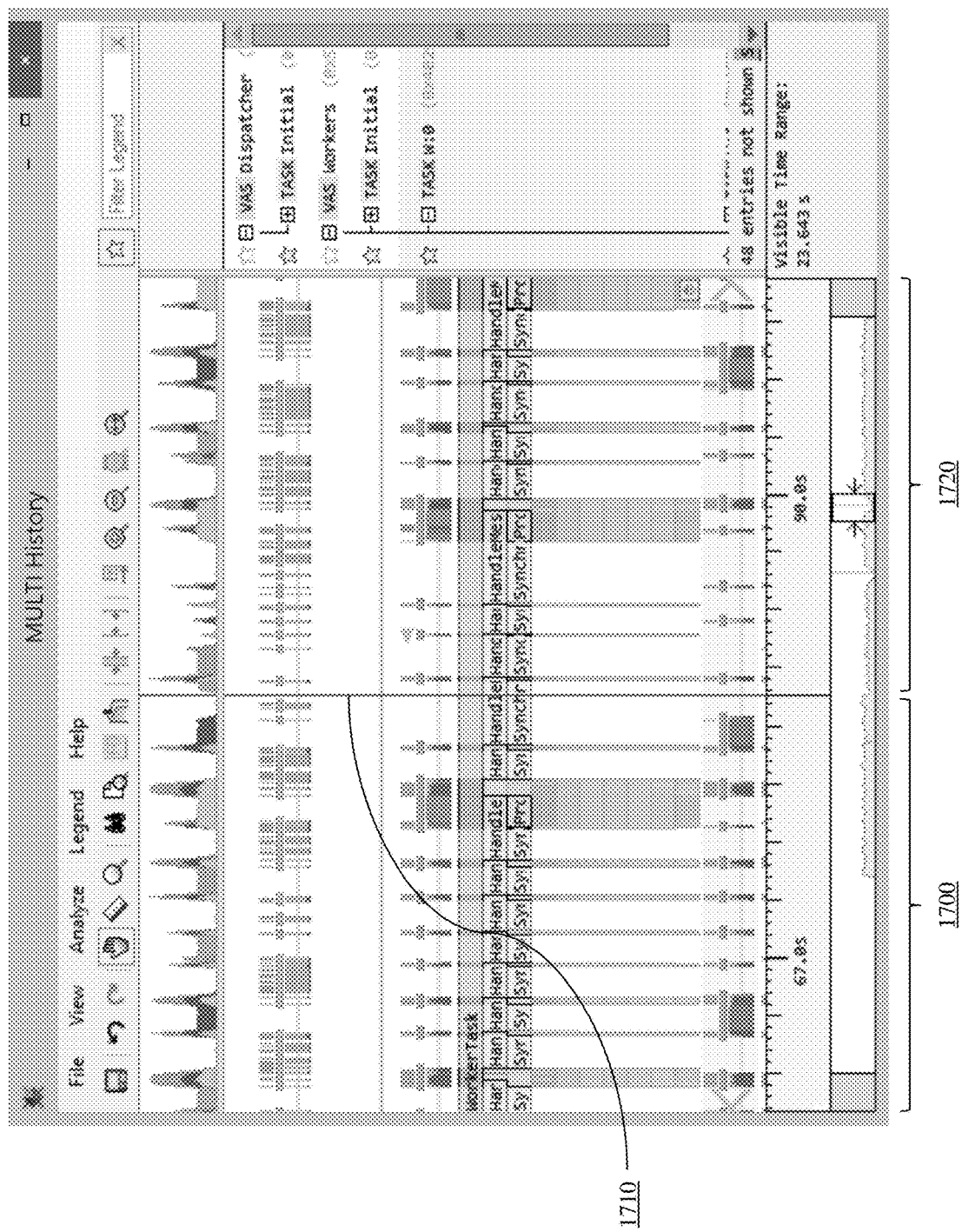
FIGS. 17 and 18 depict user interface displays hiding or showing periods of time when a target was not executing code according to certain embodiments of the present invention.

Unimportant information may also include ranges of time when the program being analyzed was not executing because it was stopped for debugging purposes. According to aspects of the present invention in certain embodiments, a cut-time mode causes the tool to collapse the ranges of time when the program was halted, where those time ranges would otherwise be visible on the screen. The time ranges are replaced by a thin line to indicate that unimportant time has been removed from the display. This results in a display of execution history that looks as it would have if the program had not been halted by the debugger. A similar approach is taken in certain embodiments to exclude other types of time, such as all time when a set of threads was not executing. For example, see FIG. 17, where a red line indicates that time has been cut at 1710. Note that this approach can also be applied to excluding time that a selected subset of threads is running or not.

Figure 18:
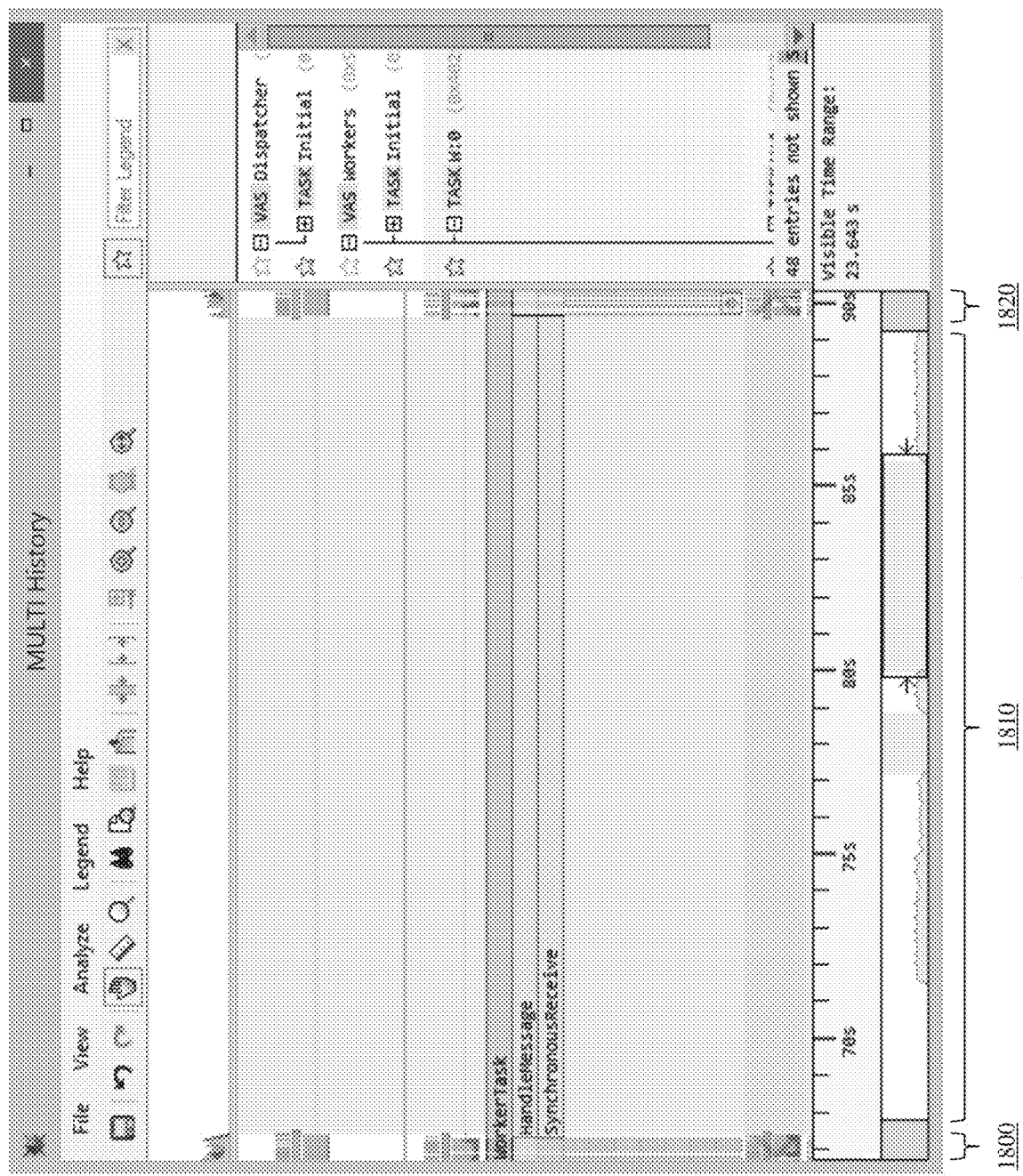

FIG. 18 shows what the same view looks like when cut time is disabled. The same range of time is displayed: in FIG. 18, 1800 labels the range of time that FIG. 17 labels 1700, and 1820 labels the range of time that FIG. 17 labels 1720. However, the range of time that is hidden (i.e., cut) from FIG. 17 (1710) is shown in FIG. 18 as a shaded pink region (1810).

Unimportant information may also include function execution information for threads that are not relevant to the problem at hand. To address this issue in certain embodiments, each thread is assigned its own area to display its execution information.

Unimportant information may also include the ranges of time where deep levels of the call stack, which, when displayed in a call stack graph, fill up the screen, thus preventing other potentially useful information from being displayed. In certain embodiments, the user can resize the height of a thread's call stack graph by double-clicking the resizer box that appears in the bottom-right corner of the thread display signal (see, for example, button 330 in FIG. 3). The user may then double-click the resizer box (330) again to expand the thread's call stack graph back to its full height. To manually resize a thread's call stack graph, the user may click and drag the resizer box (330), moving up to condense and down to expand. In such embodiments, to continue to show useful information even when parts of the call stack graph are reduced in size, the following steps are applied until the call stack graph fits within the requested size: (1) call stack depths in which nothing is happening in the currently displayed time range are removed; (2) call stack depths that span the entire screen are collapsed, since they are assumed to be uninteresting (a tooltip over the condensed region shows a list of the collapsed functions); (3) call stack depths that contain only summarized information (more than one call or return per pixel-unit of execution) are collapsed; and/or (4) remaining call stack depths are ranked and eliminated according to how closely their function sizes conform to a best function size. Specifically, for each remaining call stack depth, the function whose size is closest to a set size is used as that depth's best-sized function. (The set size can be the average number of characters found in the program's function names or a fixed number of characters, or it can be based on some other metric, depending on the requirements of the implementation.) The call stack depths are then ranked based on how closely their best function conforms to the overall best, and the depths are eliminated from worst to best.

Unimportant information may also include display signals that are not of interest to a user. In certain embodiments, this issue is addressed by providing the user with the ability to collapse such display signals into a single line, or to hide them in the legend of displayed signals.

Figure 19:
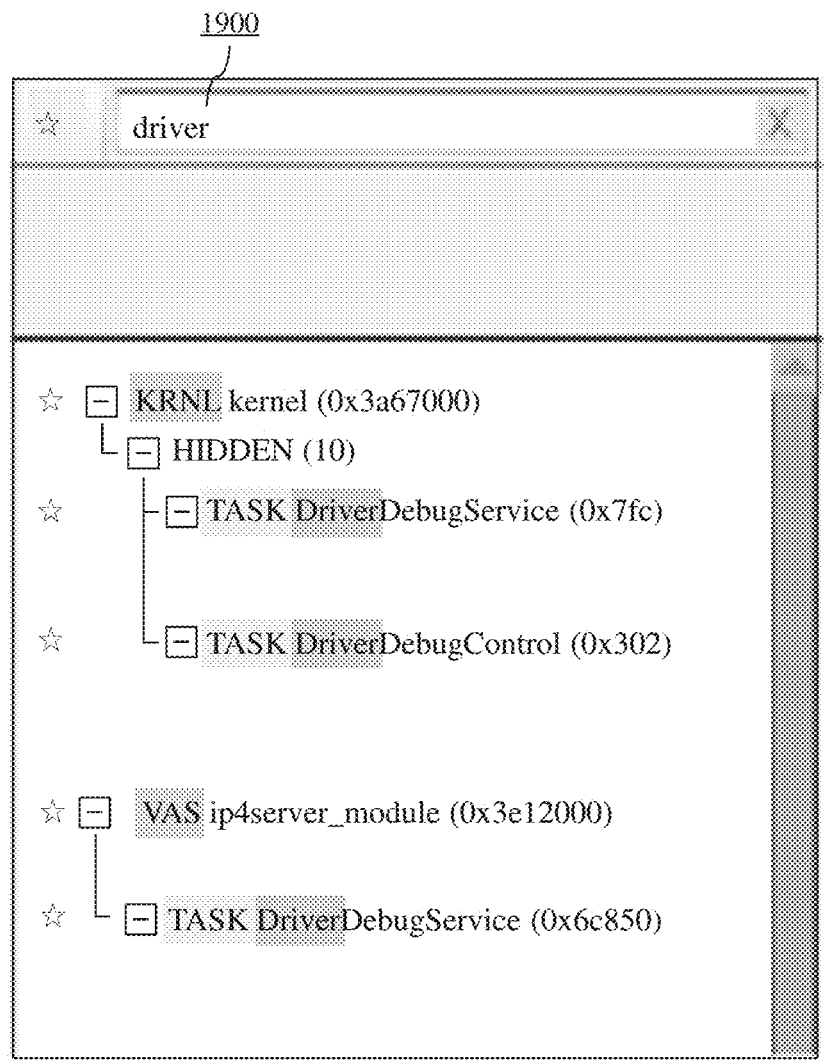
FIGS. 19 through 21 depict legend displays relating to trace data visualization according to certain embodiments of the present invention.

In certain embodiments, the filter restricts legend entries to those display signals whose names contain the string specified by a user. See, for example, FIG. 19, specifying "driver" at 1900. Parents and children are also displayed for context in certain embodiments. Specifically, in certain embodiments, the legend shows the hierarchical structure of the various threads and display signals that the main window is displaying. For example, a process can contain multiple threads. Therefore, the process is considered to be the parent of those threads. Similarly, a thread may have multiple display signals within it (e.g., a variable value may be tracked on a per-thread basis), and those display signals are considered to be the children of the thread, which itself may be a child of a process. When an entry is filtered out of the legend in certain embodiments, the corresponding display signal in the graph pane is filtered out as well. Filtering out the display signals that a user is not interested in allows the user to make the most of screen/display real estate. It can also help a user find a particular display signal.

Thus, the legend can be filtered by display signal name in certain embodiments. This allows the user to focus on the few display signals that are relevant to them in a particular usage situation.

Figure 20:
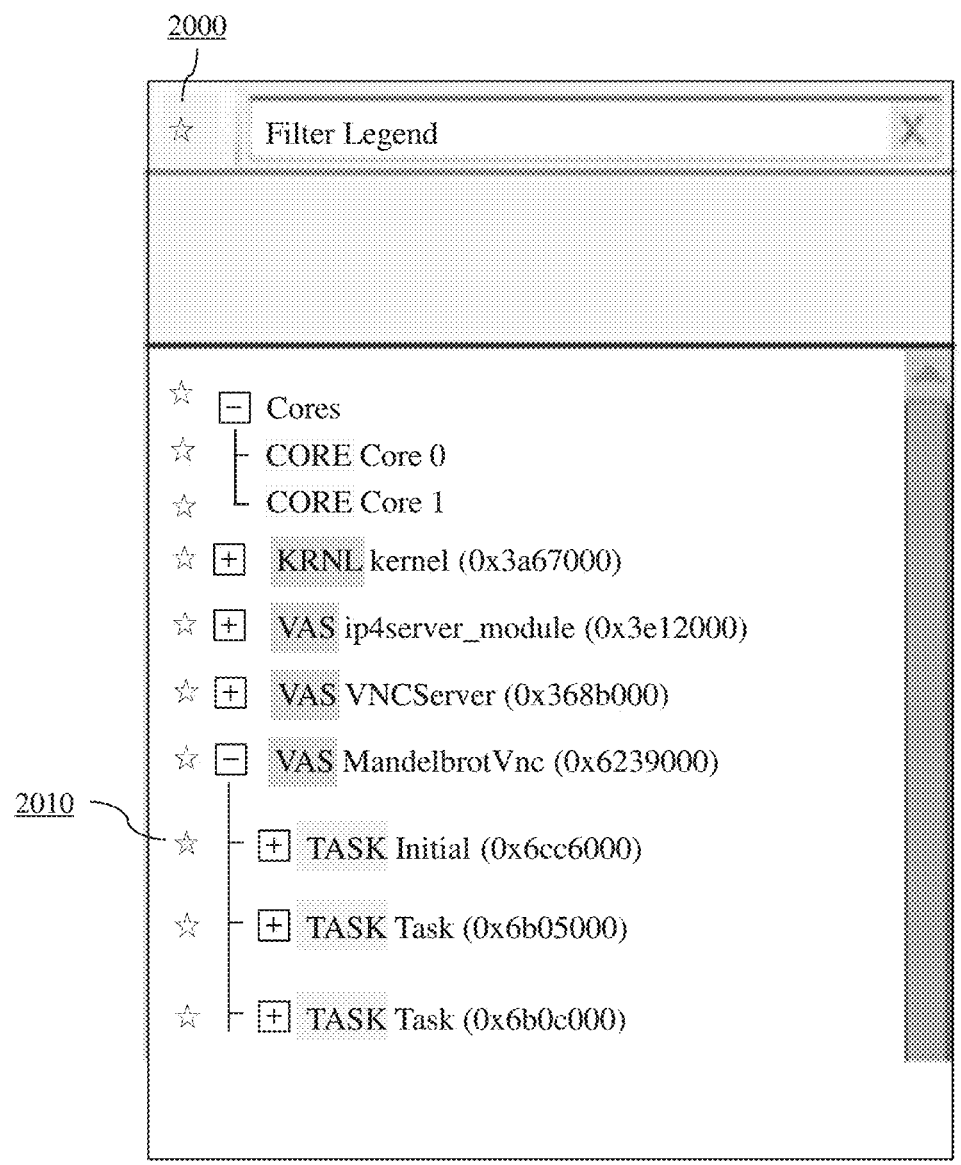
Figure 21:
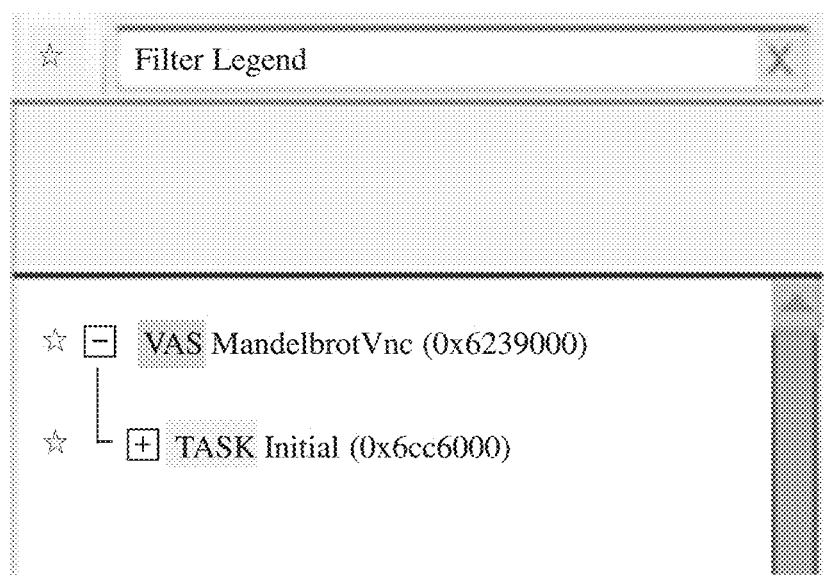

In certain embodiments, stars allow a user to flag display signals of interest in the legend. For example, in FIG. 20, the thread "Initial" is starred (2010). When the star button (2000) is clicked, it toggles the exclusive display of starred display signals (and their parents and children) in the legend and graph pane, here resulting in FIG. 21. Like the filter, this feature allows a user to make the most of screen real estate.

Thus, display signals in which the user is explicitly interested may be marked (i.e., starred) in certain embodiments, and then only those display signals may be shown. In certain embodiments, when a user expresses an interest in data from another display signal that is not currently shown (such as by clicking on a thread transfer icon), that display signal is automatically marked and included in the legend.

In certain embodiments, a heuristic method is implemented to select the display signals that appear to contain the most relevant information. In certain exemplary embodiments of this type, for example, if a time range is selected, then (1) display signals in which no events occurred during the selected time range are excluded/removed from the display; (2) threads that executed for a small fraction of the total time are maintained in the legend, but are not starred; and (3) the remaining threads and events are starred. Additional heuristics, such as using search results to include or exclude display signals, may be applied. Combinations of the above techniques may be used, depending on the particular requirements of each implementation.

If a time range is not selected in certain embodiments, the same algorithm described above is executed, but across all time. In addition, the last threads to execute on any processor are automatically included, on the assumption that one or more of these threads likely triggered an event that the user is interested in exploring in more detail.

Displaying Large Volumes of Data in a Human-Understandable Fashion

According to aspects of the present invention, methods, systems, and techniques are provided to facilitate the display of large volumes of data in ways that allow users to quickly identify areas of interest for closer inspection. Humans are not able to easily analyze large amounts (potentially terabytes) of raw trace information, yet given the highly detailed nature of programs, it is often important to see very detailed information about a program. It is not possible for a human to search linearly through all the information, so hinting at points of interest where a user can focus their attention is critically important. To help solve this problem, certain embodiments provide users with an array of features that cut down on the amount of data in the time, space, and display signal domains, as outlined above and throughout this document.

Figure 22:
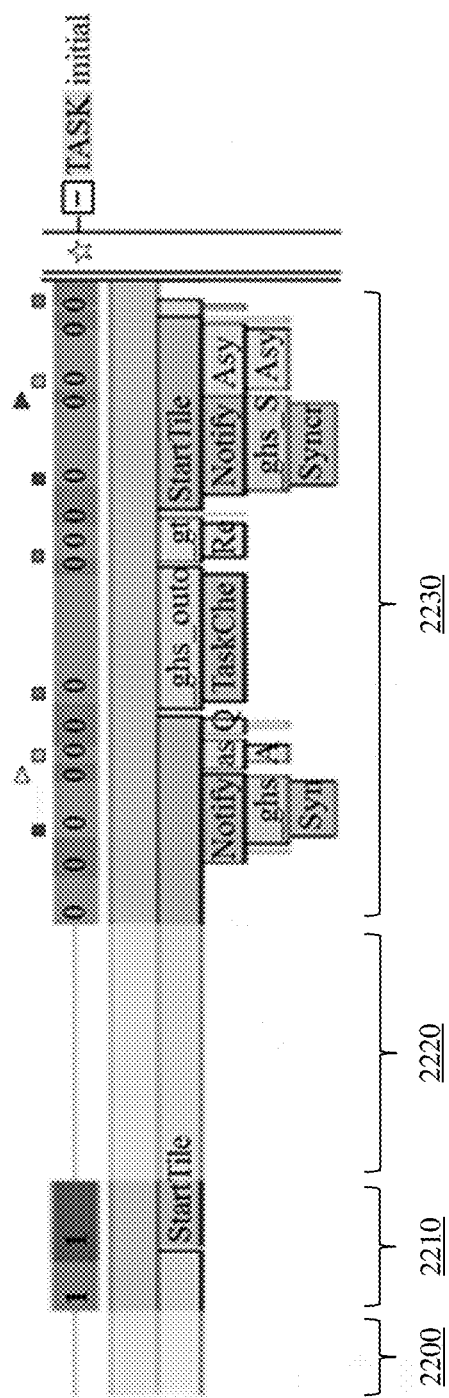
FIG. 22 depicts a thread display signal user interface relating to trace data visualization according to certain embodiments of the present invention, showing a call stack graph.

In certain embodiments, call stack data is shown in the graph pane in a call stack graph (see, for example, FIG. 22). Call stack graphs such as those depicted in FIG. 22 show a call stack over time so that a user can analyze the execution path of a program. In addition to displaying the relationship between all functions, the call stack graph in certain embodiments keeps track of the number of times each function is called and the execution time of every function called. The call stack graph may be utilized as a tool for debugging, performance analysis, or system understanding, depending on the requirements of each implementation.

In certain embodiments, the graphical call stack graph, such as that depicted in FIG. 22, allows users to search for anomalies in a program's execution path. A function's represented width on the display screen indicates the relative time it spent executing. As a result, expensive functions tend to stand out from inexpensive functions. The call stack graph also makes the distribution of work clear in certain embodiments by showing the amount of work involved for each function. Once a user sees which functions are outliers or are otherwise unexpected, they can examine them more closely to determine what should be done. A user might find functions calling functions that they should not call, or they might find the converse—functions not making calls that they should be making. The call stack graph (FIG. 22) may also be used in certain embodiments as a tool for determining how unfamiliar code works—especially for seeing how different components within and across thread boundaries interact.

When a thread is executing in certain embodiments, the colors in the call stack graph are saturated, as shown in regions 2210 and 2230 of FIG. 22. When a thread is not executing, in contrast, the colors in the call stack graph are desaturated, as shown in regions 2200 and 2220 of the same figure. This helps users quickly identify regions where specific functions are not executing instructions on a processor, without requiring users to inspect thread status information.

Functions are colored in certain embodiments based on the specific instance called. Thus, if the same function appears twice in the visible time range, it has the same color each time. There are fewer distinguishable colors available than there are number of functions in a large program; nevertheless, this approach almost always draws the eye to likely cases of the same function being executed. This is particularly useful for seeing where the same function, or the same sequence of functions, was executed many times, or for picking out a deviation in an otherwise regular pattern of function execution.

In certain embodiments, the data is grouped and layered so that high-level information is shown. A number of methods for doing so are detailed elsewhere in this document; examples include: (1) collapsed processes may show a summary displaying when any thread within them was executing, and when any event occurred; (2) collapsed threads may show when they were executing (or not executing), and they may display high-level system and communication events; and/or (3) other logged events may be grouped into hierarchies, which, when collapsed, may group all the information present in the hierarchy. Users can explore or expand high-level information to obtain more specific information.

In certain embodiments, when multiple trace events occur within the time span covered by a single pixel-unit of execution, the rendering engine uses different methods to display the different types of trace events (which include numbers, strings, call stack information, function entry/exit information, etc.). The objective is to display a visually useful representation of multiple events. A number of examples follow.

Figure 11:
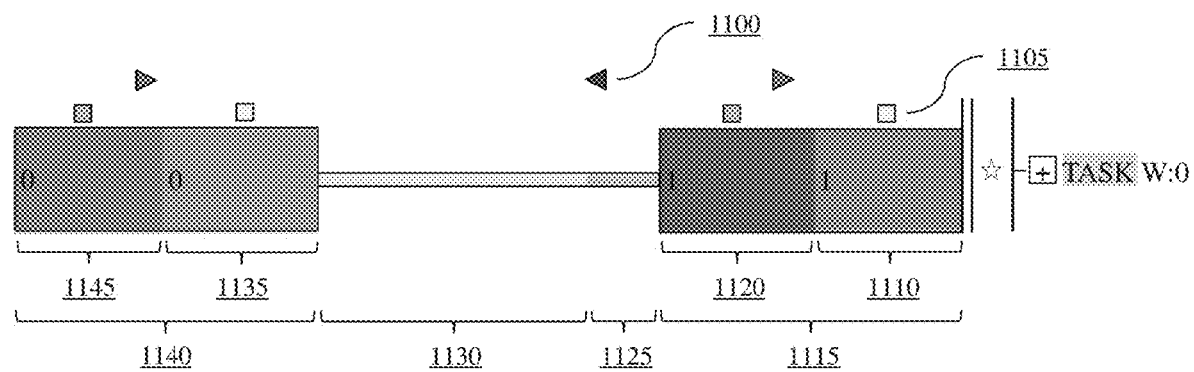
FIG. 11 depicts a user interface display relating to trace data visualization of thread execution according to certain embodiments of the present invention.
Figure 23A:
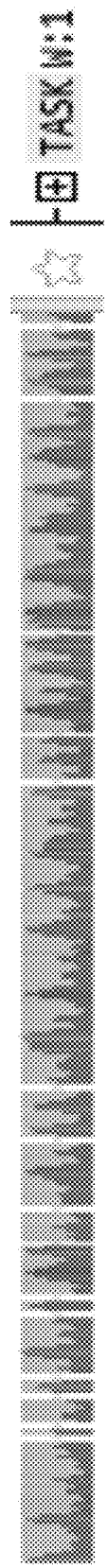
FIGS. 23A-23C depict additional task display signal user interfaces relating to trace data visualization according to certain embodiments of the present invention.

In certain embodiments, when the display is zoomed in far enough, a thick colored bar shows when a thread was running, and a thin bar shows when it was not running (FIG. 11). However, when the display is zoomed further out, such that a thread was both running and not running in a given pixel-unit of execution, the display shows a variable height bar indicating the percentage of run time for the range of time covered by that pixel-unit of execution (FIG. 23A). The color of the bar is a blend of the colors of each of the processors the thread ran on in that pixel's worth of time. This makes it easy to see high-level trends such as whether a thread was executing primarily on a single processor or was switching between processors.

Figure 23B:
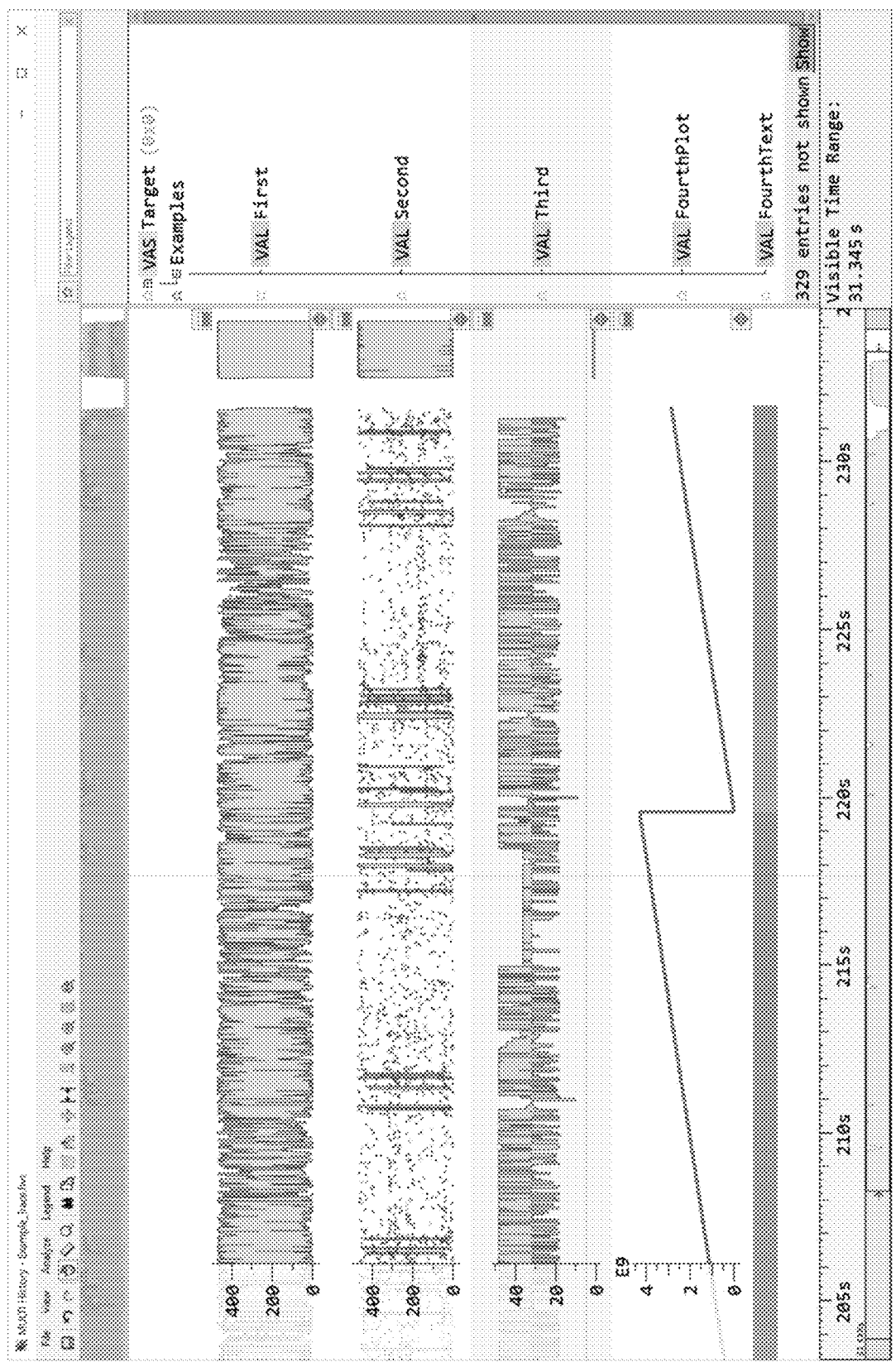

In certain embodiments, trace events that are numeric values are displayed in a plot. When an event does not appear in close proximity to another, its value is plotted as a point and printed as a string. (The string appears in the plot alongside the corresponding point.) When an event does appear in close proximity to another, such that the value string would overlap the plot point if it were printed, the value is not printed. When two or more events appear within the range of time covered by a pixel-unit of execution, in certain embodiments the minimum and maximum values for that range of time are displayed to show the range of values contained within that period of time. For example, a vertical bar may be displayed, having one color within the range between the minimum and maximum values contained within the range of time covered by a pixel-unit of execution, and a second color outside that range. An implementation of this example is depicted in FIG. 23B. In certain embodiments, this display is augmented to show the mean, median, mode, standard deviation, or other statistical information about the values within the time range covered by the pixel-unit of execution.

In certain embodiments, trace events that are numeric values can also be displayed as text (instead of appearing in a data plot). When the display is zoomed out, and the display spans a large time range such that the text is no longer readable, perhaps because the multiple trace events occur very closely to each other or multiple trace events occur within a single pixel-unit of execution on the display, an alternative way to display the values such that the user may still infer the values and their relationship to other values is desirable. Each value is assigned a color based on the current minimum and maximum values for the entire time range or for the isolated time range (if any). The color of the plotted value is determined based on a mapping that spans from said minimum to said maximum values. This mapping is set such that there is a smooth color gradation between the minimum and maximum values. This means that a gradually increasing value appears as a smoothly changing color band when it is viewed at a high level.

Figure 23C:
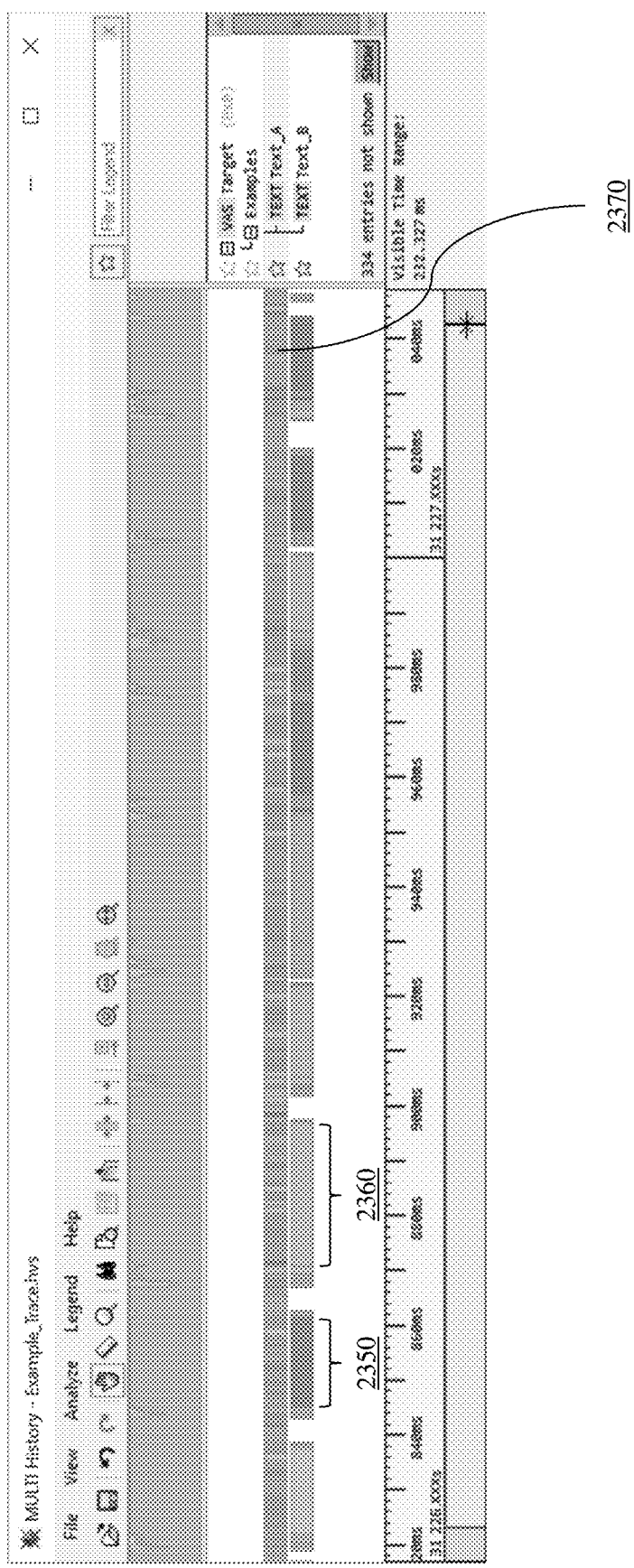

In certain embodiments, trace events that are strings can also be displayed. Each trace event is assigned a color. In certain embodiments, the color is based on the string's content. This means that each instance of the same string is displayed in the same color. Blocks of color may indicate successive instances of the same string. For example, in FIG. 23C, the part of the display signal that is colored pink (2350) represents a particular string that is likely to be occurring frequently and without interruption during the indicated time range. Similarly, the part of the display signal that is colored green (2360) represents a different string that is likely to be occurring frequently and without interruption during the indicated time range. In certain embodiments, when more than one trace event occurs within a given display signal, in a given pixel-unit of execution, the color of the pixels included in the pixel-unit of execution is a blend of the colors of all the underlying trace events. When many pixel-units of execution in close proximity show summarized, color-blended data, it becomes relatively easy for the user to see high-level patterns such as frequently repeating sequences of strings, deviations from repeating sequences of strings, and changes from one repetitive sequence of strings to another. Conversely, no pattern may be apparent, as in display signal 2370 in FIG. 23C. This may mean that strings are not occurring in a regular sequence.

In certain embodiments, when more than one function call occurs within a given call stack level, in a given pixel-unit of execution, the color of the pixels included in the pixel-unit of execution is a blend of the colors of all the underlying functions. When many pixel-units of execution in close proximity show summarized, color-blended data, it becomes relatively easy to see high-level patterns such as frequently repeating sequences of calls; deviations from repeating sequences of calls; changes from one repetitive sequence of calls to another; and similar sequences of calls that are repeated, potentially at the same or at different call stack levels.

In certain embodiments, the height of a call stack rendered in a portion of the call stack graph can be used to quickly identify areas where events of interest occurred. This visualization method is useful both for identifying periodic behavior and for identifying outliers, where a sequence of calls is deeper or shallower than its peers.

Figure 24:
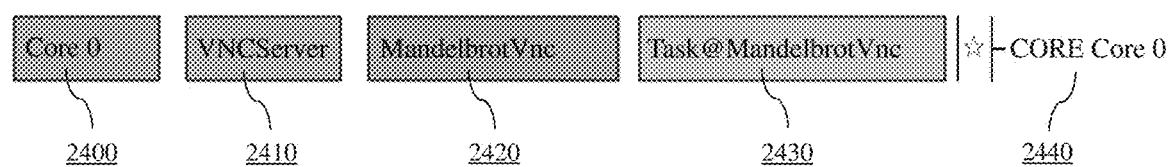
FIG. 24 depicts a zoomed-in processor display signal user interface relating to trace data visualization according to certain embodiments of the present invention.
Figure 25:
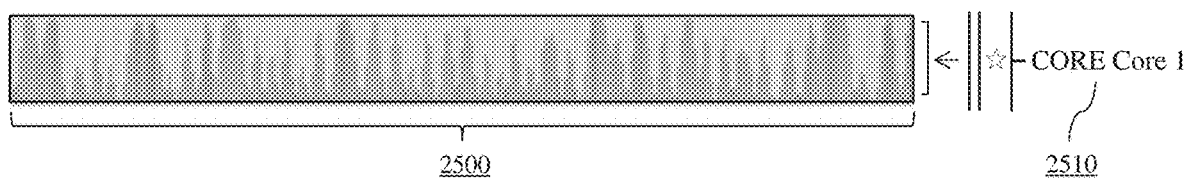
FIG. 25 depicts a zoomed-out processor display signal user interface relating to trace data visualization according to certain embodiments of the present invention.

When a graph pane display is zoomed in, in certain embodiments, processor display signals (e.g., 310 in FIG. 3) depict what thread or interrupt was executing on a particular processor at any given point in time. A more detailed and zoomed-in example is shown in FIG. 24, which comprises display signal label 2440 and differently colored threads 2400, 2410, 2420, and 2430. In certain embodiments, the same color is used for a thread or interrupt each time it appears, but because there are typically a limited number of easily distinguishable colors available for display, a color may be used for more than one thread or interrupt. When the graph pane display is zoomed out in certain embodiments, each processor display signal displays a graph that shows processor load data in summary. An example is shown in FIG. 25, which comprises display signal label 2510 and processor load data display 2500. As shown in FIG. 25, even when the display is zoomed out so that it is not possible to see individual threads running, it is still possible to see high-level patterns within the trace data. This is because the height of the graph within the processor display signal represents the processor load, and the colors used give an indication of which threads ran during the visible time range.

Figure 26:
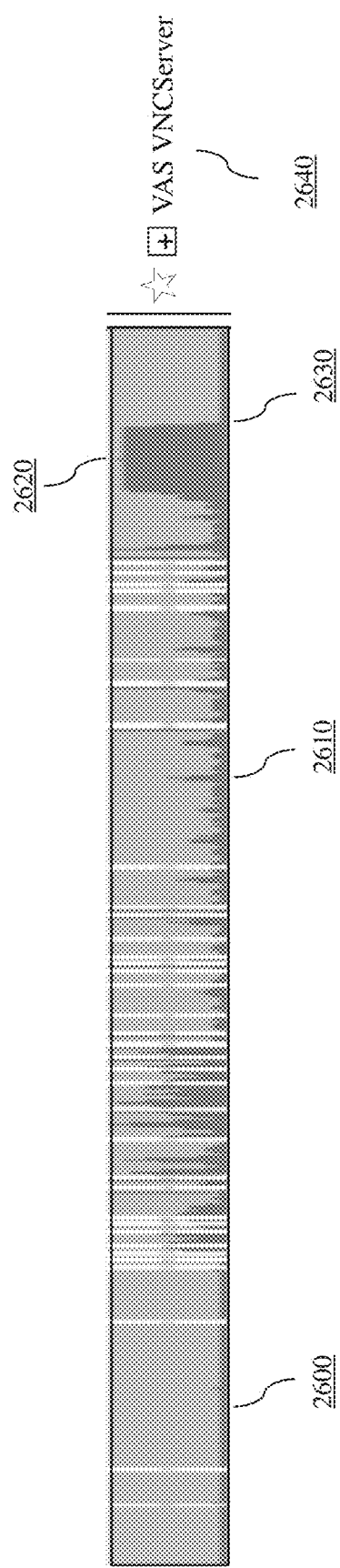
FIG. 26 depicts a process composite status display signal relating to trace data visualization according to certain embodiments of the present invention.

In certain embodiments, thread display signals are grouped in the legend under their containing process. The common interface convention of using a +/− tree for grouped elements allows users to contract the containing process. This results in a more compact representation in the legend. When this is done in certain embodiments, the process display signal depicts a composite status display signal, which shows when any thread within the process was executing. It does so by coloring a percentage of the pixels included in a pixel-unit of execution according to the percentage of time that any thread was executing within the time range covered by that pixel-unit of execution. FIG. 26 shows an example composite status display signal for a process named VNCServer (2640) that has been collapsed. Around label 2600, there is a small amount of thread execution. Around 2610, the threads within the process become more active, sometimes executing as much as 50% of the time. At around 2620, threads within the process execute nearly 100% of the time, before becoming mostly inactive again at around 2630.

Figure 27:
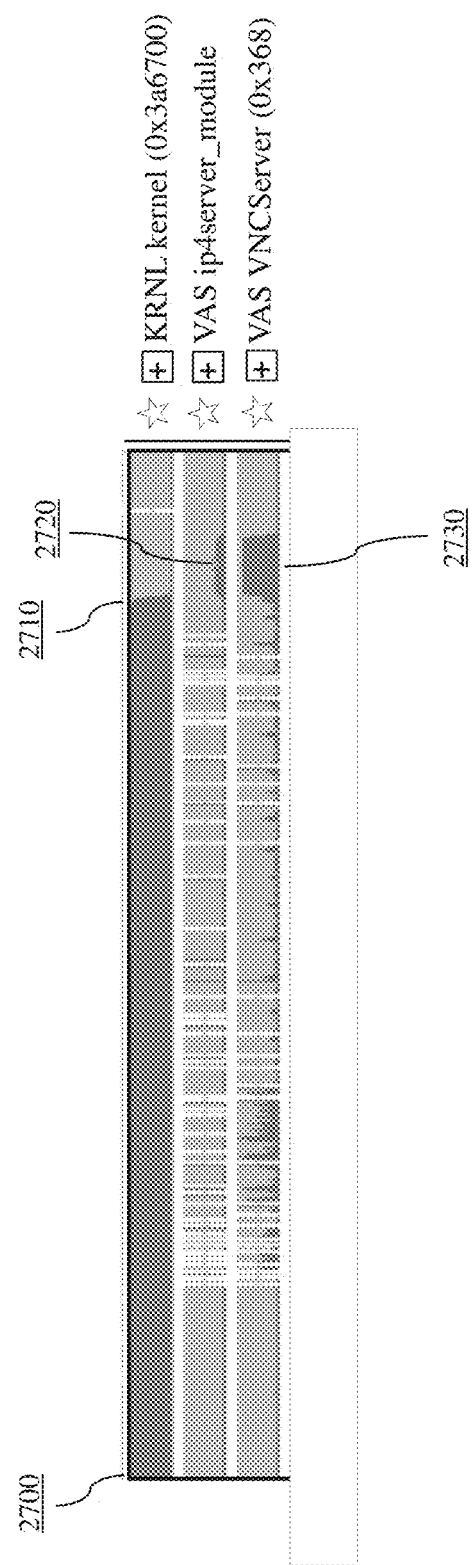
FIG. 27 depicts the relative activity of three status display signals relating to trace data visualization according to certain embodiments of the present invention.

When all display signals are contracted in certain embodiments, composite status display signals show which processes were active at any given time. This makes it easy to see their relative activity level as a function of time. FIG. 27 shows three processes that have been contracted. The first—kernel—includes at least one thread that executed nearly 100% of the time, from 2700 through 2710, before it stopped running. When kernel activity dropped, ip4server_module began running more than it had in the past (2720), as did VNCServer (2730). VNCServer, in particular, ran approximately 100% of the time. This change in execution behavior could indicate a point of interest. A user could zoom in on this point, examining and expanding the relevant processes to determine which threads were executing.

Figure 28:
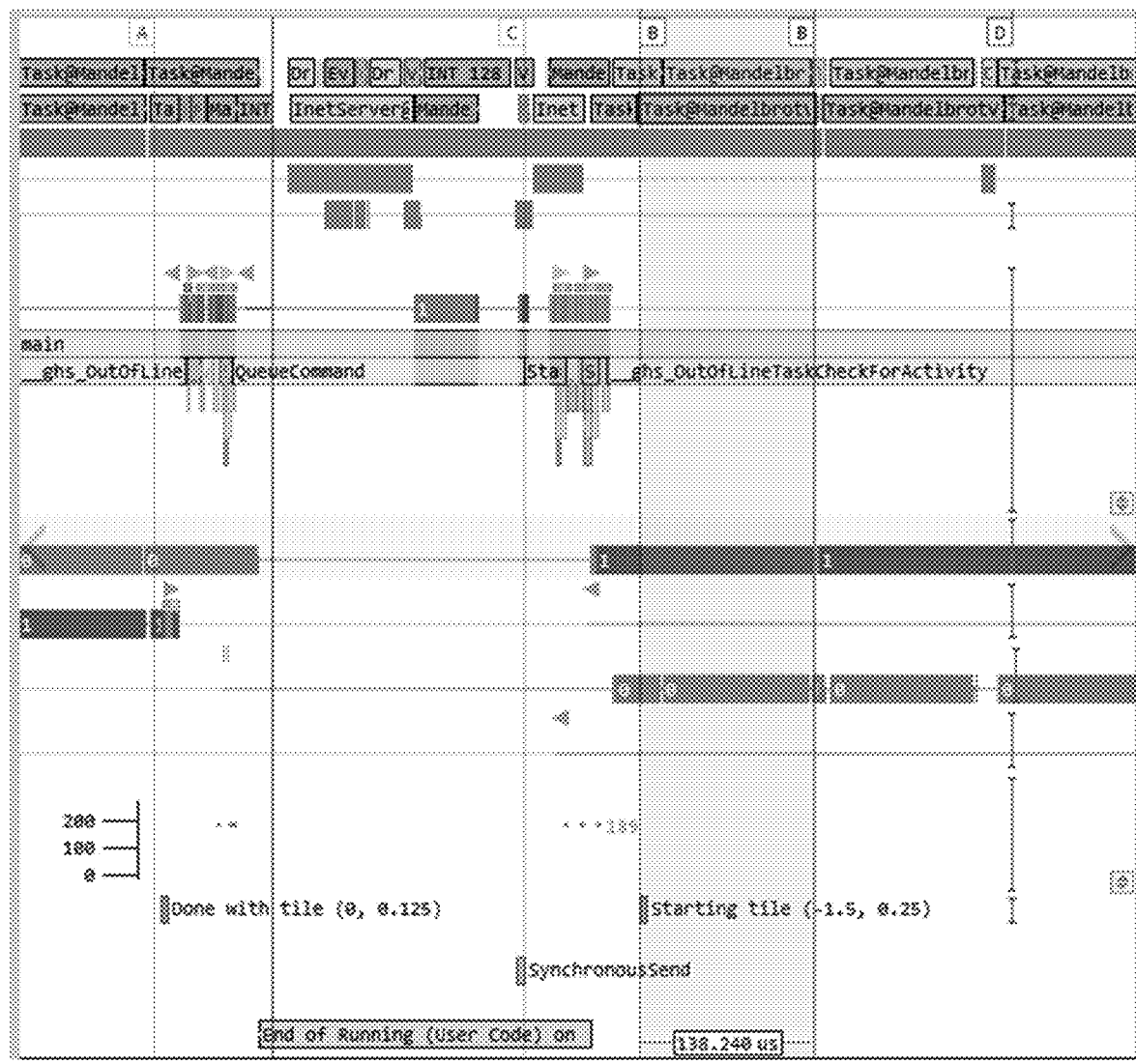
FIG. 28 depicts a user interface display relating to trace data visualization according to certain embodiments of the present invention, showing bookmark details.

In certain embodiments, bookmarks allow users to easily return to information of interest in the graph pane. In FIG. 28, bookmarks A, B, C, and D appear. A and C are indicated by shadow cursors, B bookmarks the selection, and D bookmarks the TIMEMACHINE® cursor. Bookmarks with blue lettering, like C and D, are associated with TIMEMACHINE® data. Bookmark IDs (A, B, C, and D) appear at the top of the graph pane. Bookmarks are particularly useful for allowing users to share concepts about the execution of a system. This is especially true when notes are attached to the bookmarks.

Figure 29:
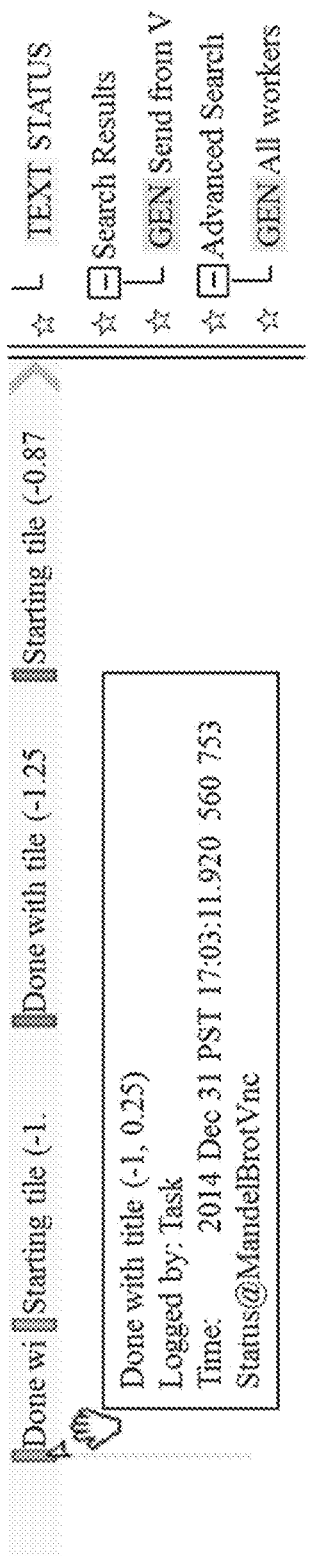
FIG. 29 depicts a user interface display relating to trace data visualization according to certain embodiments of the present invention, showing tooltip details.
Figure 30A:
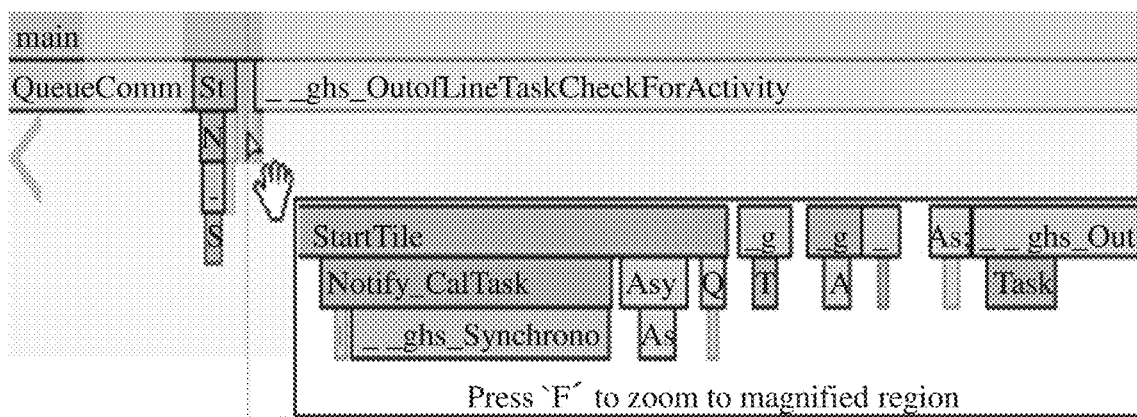
FIG. 30A depicts magnified tooltip features relating to trace data visualization according to certain embodiments of the present invention.

In certain embodiments, tooltips provide more information about items in the graph pane and legend (see FIG. 29). For example, hovering over a log point in a display signal for a string variable shows the logged string. Hovering over a function in the call stack graph area of a thread display signal shows the name and duration of the function, as well as the name of the thread and process that the function was running within. Hovering over display signal data that is summarized in the graph pane shows the same data magnified (see the exemplary embodiment depicted in FIG. 30A). These methods allow users to quickly see detailed information about specific events without requiring them to zoom in.

In certain embodiments, events whose descriptive text spans multiple lines are displayed in particular contexts as a single line, with a special marker, such as "\n," used to represent the line break(s). This ensures that the height of all events' descriptive text is uniform. Other embodiments may support showing the multi-line text. Alternatively, they may switch back and forth between single- and multi-line text based on the needs of the user. In certain embodiments, multi-line text is rendered as such when it is displayed in a tooltip; however, the content of the tooltip may be modified to limit its display size.

History Summarization Methods and Systems

One of the problems that aspects of the present invention solves involves how to quickly visualize data sets in which there are an arbitrary number of arbitrarily spaced events. Preferably, these events must be viewable at any zoom level, and preferably they must be rendered in fractions of a second; however, analyzed data must preferably not use substantially more storage space than input data.

At a high level, the summarization approach to solving these problems according to aspects of the present invention in certain embodiments involves pre-computing multiple levels of representations of sequences of trace events (known as "summary levels"). Each level contains records (known as "summary entries") which have a start and end time, and represent all trace events within their time span. The summary levels are different from each other in that the time span represented by the summary entries within them are larger or smaller by a scale factor. The summary entries are designed to be computationally inexpensive and/or easy to translate into pixel-unit of execution representations for display. Using this summarization approach with an appropriately designed rendering engine will result in an acceleration of the visualization of arbitrarily large numbers of trace events.

The rendering engine is responsible for turning these summary level representations into a graphical display on the display screen (rendering text, colors and the like). The rendering engine is also responsible for choosing which summary level(s) to use, and when those summary level(s) do not exactly match the summary level that the rendering engine is viewing, then the rendering engine uses some of the same summarization techniques to create a new summary level from the nearest existing one. This process is described elsewhere herein, and is referred to as "resummarization."

Stated again, an approach of aspects of this invention in certain embodiments is to:

(a) Optionally receive a set of trace events from an execution of one or more computer programs by one or more target processors for a time period.

(b) Pre-compute multiple levels of representations of sequences of trace events into summary levels.

(c) Store the summary levels in one or more computer-readable storage media (d) In response to a request to display a selected portion of one or more of said trace events, retrieve a subset of the pre-computed representations of sequences of trace events from a summary level and rendering it on a display device.

(i) Which summary level to read from is discussed elsewhere, but this is a key part of the approach, as the amount of data necessary to read from the summary levels is related to the by the number of trace events that are represented in the pre-computed representations.

In addition in certain embodiments each of the pre-computed multiple levels of representations comprises a fixed-size span of time which is different for each summary level.

And in certain embodiments the summary level used to retrieve the representations is determined by picking the summary level whose time span is less than or equal to the time span of a pixel-unit of execution on the display device.

Aspects of the present invention solve at least the following seven problems in certain embodiments:

(1) determining a way for a rendering engine to quickly render arbitrary amounts of data at arbitrary zoom levels;

(2) determining a way not to store information for regions of time where no events occur;

(3) determining a way to avoid creating summary levels that have very few events;

(4) determining a way to construct summary levels dynamically ("on the fly") so that summary levels covering arbitrarily small or large spans of time can be created if the data set needs them;

(5) determining how to do this without scanning through all the data first or making multiple passes through the data;

(6) determining how to display a subset of the trace data while continuing to process and display additional data; and (7) determining how to do all this while minimizing the number of seeks the rendering engine needs to perform to render any range of time.

Detailed Description of Exemplary Output File

The underlying data the rendering engine uses to display signals is stored in the HVS file and is referred to as a file signal. There may not be a one-to-one correspondence between display signals and file signals. For example, the single display signal that the rendering engine shows to represent the call stack graph for a thread may be composed of multiple file signals.

In this exemplary embodiment, all trace events collected from the target are organized into multiple file signals and stored in a single HVS file. The file uses multiple interleaved streams, each of which is a time-sorted series of data. There may be a many-to-one correspondence between streams and file signals. Several streams can be written to simultaneously on disk through the use of pre-allocated blocks for each stream, and each stream can be read as a separate entity with minimal overhead. In certain embodiments, each stream is implemented using a B+ tree, according to techniques known to skilled artisans and in view of the present disclosure. In this exemplary embodiment, the file includes a collection of multiple B+ trees, which, when taken together, represent multiple file signals.

In certain embodiments, a header stores pointers to all the streams within the file, as well as information about the type and size of each stream. An arbitrary number of file signals can be added to the file at any time during the conversion/summarization process by creating a new stream for each data set. Data can be added to the file by appending to the appropriate data stream. The header is written periodically to hold pointers to the new streams, as well as to update the size of any previously existing streams that contain additional data. The new header does not overwrite the previous header; instead, it is written to a new location in the file. Once the new header is written and all data for streams summarized up to that point has been written, the metadata pointer to the current header is updated to point to the new header.

Because the metadata pointer is the only part of the file that is modified after being written, and because it is small and can be updated atomically, there is no need for any locking mechanism between the summarization engine and the rendering engine.

Because streams in the file are stored in a sorted order, and each stream can be read separately, a data reader can query for data from a specific range of time and a specific stream. Binary searching through the sorted data in certain embodiments allows for the bounds of the range to be located quickly with minimal overhead. In addition, binary searching in certain embodiments may also be done at the level of the B+ tree nodes, since these nodes contain time ranges for their child nodes and the leaf nodes that they point to.

Components of an Exemplary Summarization System

Note that while the summarizer is described in the context of summarizing backwards in time (starting with the last event recorded) here and elsewhere in this document, the same approach also works for summarizing forwards (starting with the first event recorded). The backwards approach shows the most recent data first, so it tends to be more useful in situations like determining how a program reached a breakpoint; however, summarizing forwards can also be useful. For example, if a system is running live and is continuously sending new trace data to the summarization engine, summarizing forwards means that the user can display a summarized version of what is happening as it occurs. Someone skilled in the art will readily be able to convert to summarizing forwards once they understand the process of summarizing backwards.

For the advantages listed previously, it is desirable in certain embodiments to perform backwards summarization on trace event data that is normally processed or organized in forward chronological order. For example, the output of hardware trace systems is processed and organized in forward chronological order. In an exemplary implementation, backwards summarization on trace event data organized in forward chronological order may be performed piecewise by retrieving a small chunk of trace event data from a later time in the trace log, such as the end of the log, and processing that chunk forwards to generate a list of trace event data contained within that chunk in reverse chronological order.

The next chunk of trace event data that occurs in time before the previous chunk is retrieved and similarly processed. Further chunks earlier in time are similarly retrieved and processed. Chunk boundaries are commonly chosen such that a chunk contains enough information to be decoded forwards, and may vary depending on the specific trace event data system being used. This is useful for adapting systems, such as hardware trace systems, which emit trace event data which are normally processed forwards in time to embodiments of the present invention when summarizing backwards. More generally, trace event data which is normally processed forwards in time may be processed backwards in time using this piecewise backwards method.

Figure 31A:
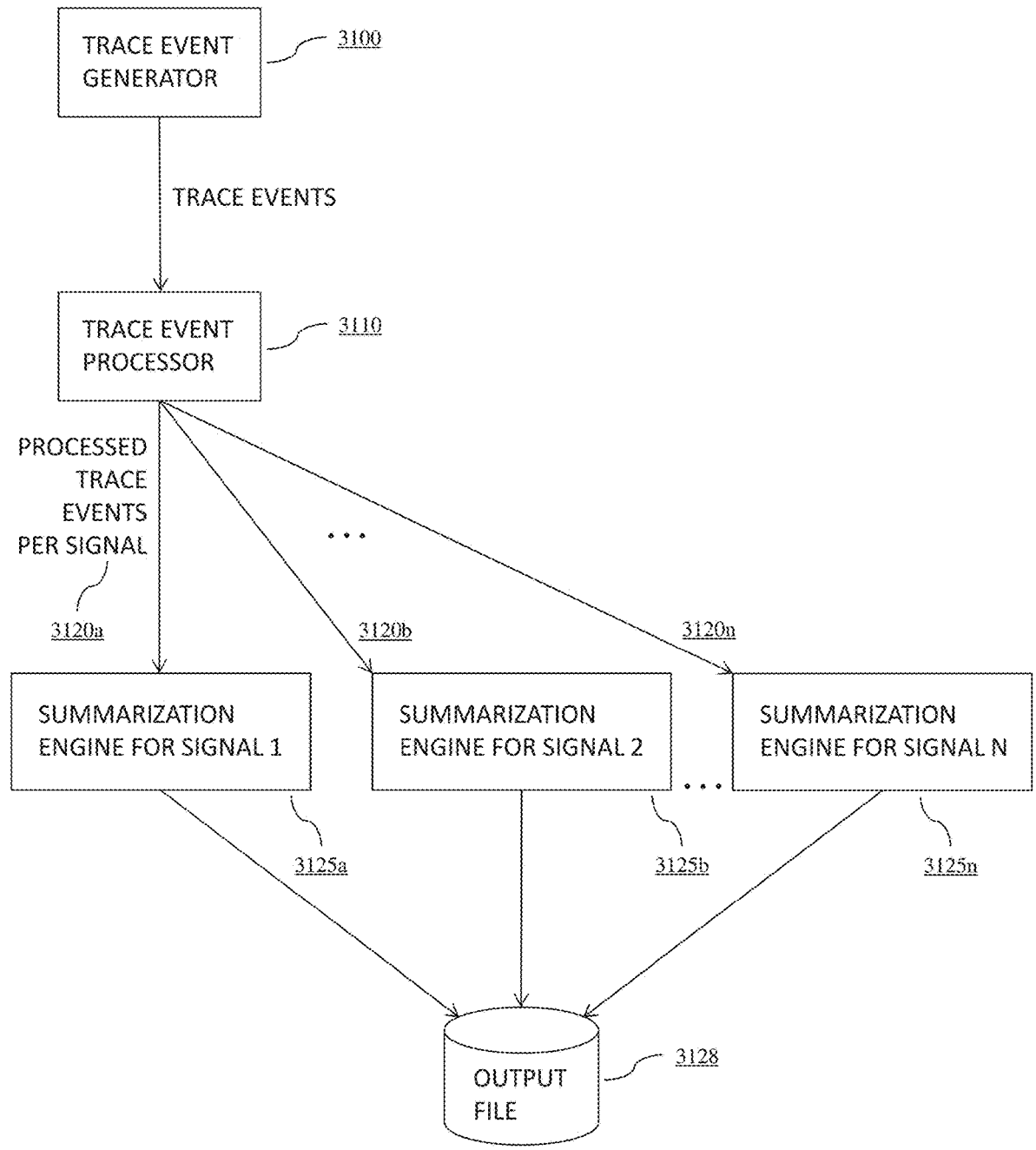
FIGS. 31A-31D are exemplary high-level diagrams depicting aspects of data processing and summarization according to certain embodiments of the present invention.

As shown in FIG. 31A, certain embodiments receive data from a trace event generator (3100) such as a target system. This data is then processed by trace event processor (3110), which may include sorting trace events by time, if necessary, and assigned into multiple substreams (3120a, 3120b, . . . 3120n) of processed trace events. Unless otherwise noted, "trace events" may refer to the output of a trace event generator (3100) or to the output of a trace event processor (3110), depending on the particular requirements of each implementation.

Each stream is dedicated to a single file signal. Note that "file signal" refers to a collection of related trace events that are eventually summarized and stored in a file. File signals may be created or filtered out as a result of the processing of the original data. For example, the trace event source might record the value of two variables. After processing (3110), an exemplary embodiment might output each variable as its own file signal, and additionally output a third file signal that is the sum of each. Note that uses of the term "trace events" refer to the post-processed trace events in these examples, and usually only refer to a single file signal of these post-processed trace events. However, the approaches described apply whether or not there is a processing step, and whether or not there are multiple file signals.

Figure 31B:
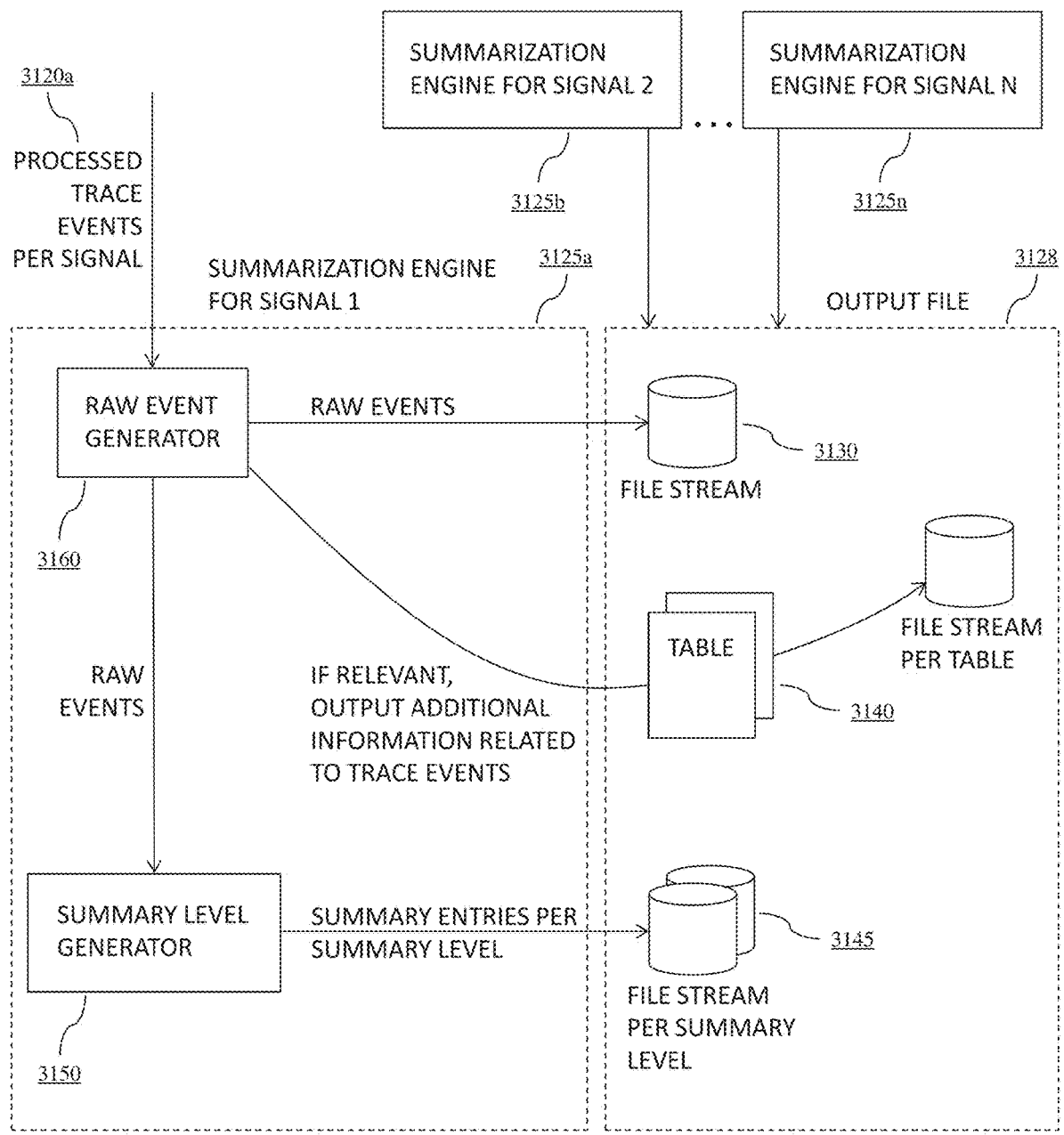

As is further shown in FIG. 31B, each trace event is then converted into a raw event (3160) that can be stored in a raw file stream (3130). Alternatively, in certain embodiments, trace events from the output of the trace event generator (3100, in FIG. 31A) may be used directly as the input to the summary level generator (3150, in FIG. 31B). The specific details vary based on the requirements of the implementation, but the goal is to translate the stream of events into a form that is easy to store in a file stream (3130). For example, in certain embodiments, numeric data is packaged with the time and value of the event. However, a string event may be turned into a string table index pointing at the full string representation; this keeps the raw event at a fixed size. This string table (3140) is itself output to its own file stream. In certain embodiments, displaying raw events requires that these events first be translated from the form in which they are stored in the raw file stream to a human-understandable representation. For example, a string event is translated from its string table index into the string stored at that index in the table.

Figure 31C:
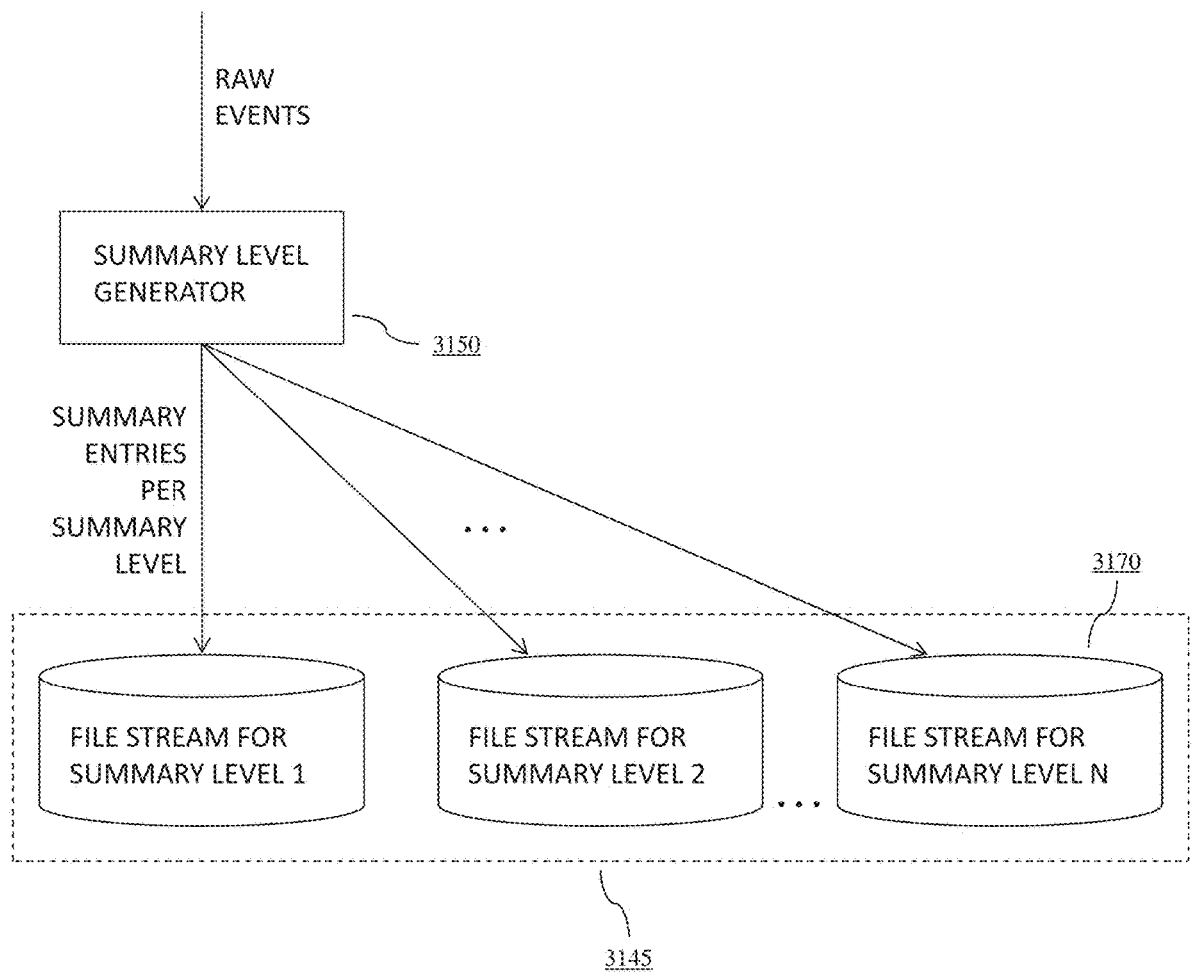
Figure 31D:
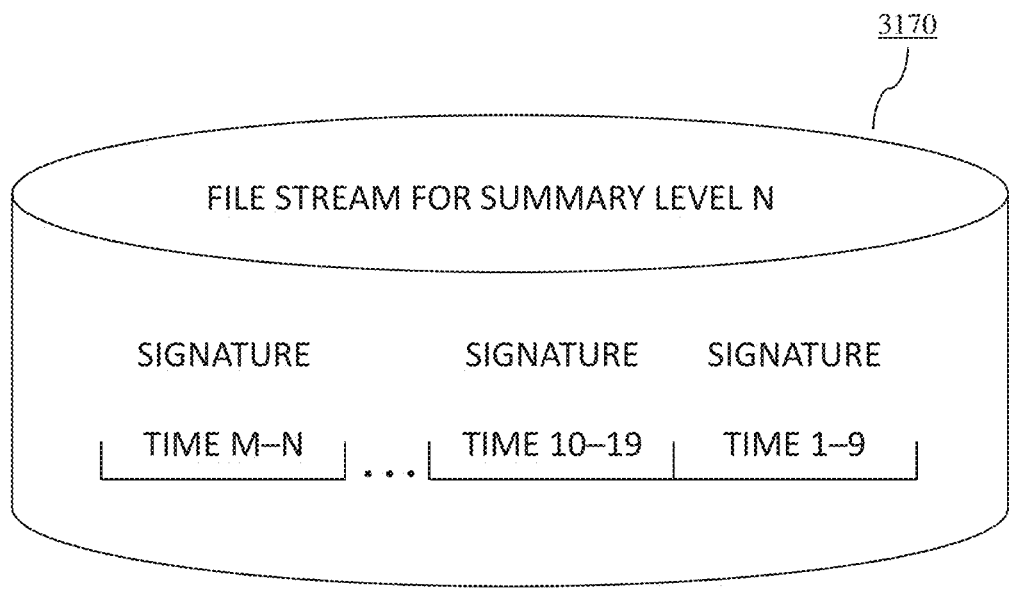

FIG. 31B also shows that the raw events are fed into the summary level generator (3150), which optionally outputs one or more summary entries to one or more summary levels (3145). A more detailed version of this process is shown in FIG. 31C, and FIG. 31D depicts the contents of a specific file stream for each summary level in an exemplary embodiment. Each summary level is a representation of trace events and is tailored for building a graphical representation of a specific range of time, at a specific zoom level. For example, a rendering engine may be tasked with showing all events contained within the time range from 1,000 seconds through 2,000 seconds, using 1,000 pixel-units of execution of screen real estate. This implies that each pixel-unit of execution will represent one second's worth of trace events, which happen to fall within that second's worth of time. To create this display, the rendering engine uses a specific summary level, which, along with others, was created by the summarization engine.

As is discussed elsewhere, summary streams may contain several types of data, including copies of raw data, instructions to the rendering engine to read additional data from the raw file stream (these are referred to elsewhere as "references to raw data"), and summarized entries representing many trace events.

Each summary level contains a sequence of summary entries stored in time order. Each summary entry within a given summary level covers, at most, a set span of time. In certain embodiments, multiple summary levels are used, each of which contains sequences of summary entries that span different ranges of time. In certain embodiments, the time span covered by any two summary levels differs by a constant factor, which is referred to as the "scale factor."

In certain embodiments, each summary level is stored in a separate stream so that the data streams can be queried independently of one another. The rendering engine can then decide which summary level is appropriate. Certain embodiments of the rendering engine use the summary level closest to, but less than or equal to, the size in time that each pixel-unit of execution on the screen represents, and they can query the summarized data at that level.

Certain embodiments generate one or more "trace event signature(s)" (also referred to as a "signature") for individual trace events based on the requirements of the implementation, such as the type of the data the trace event represents, or the value of the data. In certain embodiments these trace event signatures should be designed to exhibit the following characteristics to the maximum extent practical, depending on the requirements of each implementation: (1) the size of the trace event signature is the same for every trace event in a file signal (in particular, every trace event in a substream, which will usually be trace events of the same type, certain embodiments may generate multiple trace event signatures for each trace event); (2) the signature can be generated quickly without needing substantial computation or memory; (3) the trace event signature has a high probability of being different from the trace event signature of a different trace event with a different value. Certain embodiments have methods of translating the trace event signature into a graphical representation with a high probability of being distinguishable from a different trace event signature.

Each summary entry contains a representation of all the trace events that occurred within its time range. This representation is known as the "signature," or "summary entry signature" to differentiate from the trace event signature discussed above. The rendering engine uses the summary entry signature to draw the pixels included in the pixel-unit of execution that represents the range of time that the summary entry covers. Summary entry signatures should be designed so as to exhibit the following characteristics to the maximum extent practical, depending on the requirements of each implementation: (1) the size of the summary entry signature is not related to (i.e., is independent from) the number of summarized trace events it represents, and is fixed for a given summary level (where different summary levels for the same trace event substream, and file signals for different trace event substreams, may use different fixed sizes); (2) the summary entry signature can be computed quickly without needing substantial computation or keeping more than a set number of trace events in memory; (3) the summary entry signature can be translated into a graphical representation which has a high probability of being visually distinct from another signature representing a different set of trace events.

In addition, depending on the type, methods of merging multiple trace event signatures into a summary entry signature may be implemented (certain embodiments may also implement methods for merging multiple summary entry signatures into a summary entry signature). Certain embodiments also implement approaches for rendering summary entry signatures to a display.

Depending on the requirements of each particular implementation, many approaches to generating trace event signatures may be effected. Certain embodiments generate multiple different trace event summaries based on various factors such as type of event or value of data. Some specific examples include, but are not limited to:

(1) File signals containing information about function calls: The trace event signature takes the form of a fixed-width bit field. The value of the signature of an individual trace event is a bit field with a single bit set to 1. The bit that is set is determined by a hash of the function's name, address, or other identifying marker (such as which file, library or other grouping it is part of). This hashing process is also used for signatures in other file signal types and is henceforth referred to as a "single bit hash." The bit field's width is shared between all signatures of the same file signal type; however, in certain embodiments, the width of the bit field may differ depending on the file signal type. The fixed width means that different inputs may result in the same signature, but the chance will be based on the size of the fixed-width bit field. For a 64-bit field it would be 1 in 64. Depending on the requirements of the implementation, for said 64-bit example, display of the trace event signature can use the bit set to lookup into a 64-entry color table to determine which color to use when displaying the trace event. This meets all three goals of having the same signature size, quick signature generation, and increasing the likelihood that two different trace events will have a different trace event signature and color.

(2) File signals containing information about string events: The trace event signature is a single bit hash computed from the content of the string. Alternately, certain embodiments, depending on their requirements, may calculate the signature of a string according to its position within a string table, or some other property of the string such as where it is stored in target system memory. Depending on the requirements of each implementation, display of the trace event signature can use the bit set to lookup into a 64-entry color table to determine which color to use when displaying the trace event. This meets all three trace event signature goals of having the same signature size, quick signature generation, and increasing the likelihood that two different trace events will have a different trace event signature.

(3) File signals containing information about which processor a thread executed on: The signature is a single bit hash of the identifier of the processor that the thread ran on. Depending on the requirements of the implementation display of the trace event signature can use the bit set to lookup into a 64-entry color table to determine which color to use when displaying the trace event. This meets all three trace event signature goals of having the same signature size, quick signature generation, and increasing the likelihood that two different trace events will have a different trace event signature.

(4) File signals containing information about which thread a processor executed: The signature is a single bit hash of the identifier of the thread that the processor executed. Depending on the requirements of the implementation display of the trace event signature can use the bit set to lookup into a 64-entry color table to determine which color to use when displaying the trace event. This meets all three trace event signature goals of having the same signature size, quick signature generation, and increasing the likelihood that two different trace events will have a different trace event signature.

(5) File signals made up of numeric values: In certain embodiments, the signature takes the form of the value itself. This meets all three trace event signature goals of having the same signature size, quick signature generation, and increasing the likelihood that two different trace events will have a different trace event signature.

(6) File signals containing events pertaining to the duration of execution state of a thread (such as running on a processor, blocked on a semaphore, etc.): In certain embodiments, the signature takes the form of a counter of the number of clock ticks (or some another unit of execution) that elapsed while the thread was executing. In certain embodiments the duration of the event can be determined by subtracting the end time when from the start time. The same approach can be applied to the execution state of a processor, where the signature tracks the number of cycles that elapsed while the processor executed code. This meets all three trace event signature goals of having the same signature size (an embodiment could store the time in a 64-bit integer), quick signature generation, and increasing the likelihood that two different trace events will have a different trace event signature.

(7) File signals containing events pertaining to the execution state of a thread (such as running on a processor, blocked on a semaphore, etc.): In certain embodiments, the signature takes the form of a value representing that execution state (such as an enumeration value, or a string name for the state). The same approach can be applied to the execution state of a processor. This meets all three trace event signature goals of having the same signature size (an embodiment could store the state in a 32-bit integer), quick signature generation (certain embodiments would store the value of the trace event representing the execution state), and increasing the likelihood that two different trace events will have a different trace event signature.

Depending on the requirements of each particular implementation, all types of file signals may also take the form of a color which is defined with rules depending on the file signal. For instance: (a) File signals for function calls could define a color for each function; (b) file signals for string events representing warnings and errors could define colors based on the severity of the notification (such as red for a severe error, yellow for a warning, and blue for a generic notification). Certain embodiments may define the color representation (such as through a configuration file) based on the requirements of the user. For instance, the configuration file could define a mapping from trace event values to a user specified color. This meets all three trace event signature goals of having the same trace event signature size (an embodiment could store the color in a 24-bit integer), quick signature generation (at least for embodiments where the trace event value to color function is simple, such as a configuration file mapping), and increasing the likelihood that two different trace events will have a different trace event signature. For the latter two, it depends on the specific rules used. As an example, a user configuration file mapping from value to color is fast to compute, and will generate a trace event signature which is different from others based on the requirements of the user. So for instance if the user is most concerned with distinguishing errors from warnings, and errors are defined as red and warnings as yellow, then while two different errors may be the same color (red), the user would be able to easily distinguish between errors and warnings, which is what may be important to them.

Depending on the requirements of each particular implementation, the trace event signature may be the value of the trace event. This may or may not achieve the goal of fixed size trace event signatures, depending on whether the trace events in question are themselves fixed size (such as 32-bit integers, as opposed to variable-sized strings). It achieves the goal of being easily computable. By definition, the trace event signature will be different for different trace event values.

In certain embodiments, certain types of file signals use a combination of the above approaches to generate a trace event signature. For example, for a thread, lower bits may be used to track execution time, and upper bits may be used to represent which processor the thread executed on. Depending on the requirements of the implementation embodiments may represent multiple trace event signature types in one signature. For instance, the signature of executed time with which processor the thread executed on may be combined to form a signature which is the size of the sum of the sizes of the trace event signatures which it is made up of.

In addition, in certain embodiments, certain types of trace events may generate multiple file signals, one per type of trace event signature which is generated for them. This is effectively the same as turning a stream of trace events into multiple substreams which contain all trace events (or all trace events in the substream in question), each of which generates a different type of trace event signature and is summarized in its own trace event stream.

To create the signature for a summary entry (i.e., to create summary entry signature), a method is needed to combine the trace event signatures for the events that are represented by that summary entry. In certain embodiments, methods of merging trace event signatures (i.e., methods of creating a summary entry signature based on a plurality of trace event signatures) include, without limitation:

(1) Taking the minimum and maximum of all trace event signatures of numeric data and outputting this minimum/maximum pair as a summary entry signature. For instance, for a sequence of trace events represented by a summary entry whose values are 50, 0, 25, 15, 75, the trace event signatures would be the values themselves, and the summary entry signature would be 0-75. This achieves the first two goals of summary entry signatures by being twice the size of the trace event signature (one for minimum, one for maximum). This can be generated quickly without keeping all trace events in memory by inspecting each in turn, and only keeping the current smallest and biggest in memory. The third goal of being visually distinct is met when the trace events have different min/max values. In many types of data sets seeing the min/max at a high level is very useful for determining areas to focus on, which achieves the purpose of the summarization approach. For other data sets seeing the mean, median, mode, standard deviation or other numeric analysis approach can be useful. Certain embodiments include the min/max and average (or other numeric analysis) in the summary entry signature, and depending on the requirements of the implementation display said additional information overlaid on the same data plot.

(2) Ranking the signature values according to any suitable set of rules. For example, an exemplary implementation may identify the maximum and/or minimum rank values, and then the maximum and/or the minimum rank values may be used to determine the new signature. This is useful at least for signatures of data where some trace events are more important to show from a high level view than others. For example, in a particular implementation, error messages would be ranked higher than warning messages, which would be ranked higher than informational messages. In this example, merging two trace event signatures, where one represents an error message and the other represents a warning, would result in a new summary entry signature that represents an error message (and thus the summary entry signature does not contain information about the warning). In certain embodiments, this meets the three goals of summary entry signatures by: (a) having a fixed size by being the same size as the trace event signature (which is itself a fixed size); (b) being easy to compute, because as each trace event signature is processed only the current best match needs to be kept in memory; (c) display is distinguishable, at least from other summary entry signatures which are of different importance (for instance an error is easily distinguishable from a warning, though 2 different errors may not be distinguishable in certain embodiments).

(3) Blending the trace event signature values into a summary entry signature. This is useful at least for those signatures that are colors. The blending from trace event signature info a summary entry signature could use any of the blending approaches which someone skilled in the art would be familiar with. In certain embodiments the blending could transform into a different color space, color representation, or size of field used to represent a color, depending on the requirements of the implementation. In certain embodiments this meets the three goals of summary entry signatures by: (a) the size of the signature is not related to the number of events represented because the summary entry signature is simply a color, and for instance could be represented with a 24- or 32-bit value; (b) certain embodiments will solve the problem of blending colors using approaches known in the art. For instance, the color can be represented by a 24-bit value composed of three 8-bit parts representing red, blue, and green. Summarizing the trace event signatures is done by summing each 8-bit component of each of the trace event signatures separately into three 64-bit accumulation values (one each for the red, blue and green components). Then the 64-bit accumulation values can be divided by the number of trace events represented by the summary entry, and each 8-bit blended/averaged color component is stored back into the appropriate subset of the 24-bit color summary entry signature. In practice except for exceptionally large numbers of events this will not overflow the 64-bit accumulator. This is because each color can have a value of at most 255. So a 64-bit value can store at least $(2^{64})/256$ trace events before overflowing, or $2^{56}$, which is 65536 trillion trace events. If an embodiment needed to represent more events then it could chain the accumulator into a second 64-bit integer, and so on. Eventually it would be able to represent more trace events than there are atoms in the universe, which means in practice there is no limit, without needing to keep all or even some small fraction of the trace events in memory; (c) the graphical representation will be distinguishable when the colors in trace events tend to be different between 2 sets of trace events represents by 2 summary entries. So for example if most events in one summary are red, and most in a different summary entry are blue, then the averaged color in each summary will be red and blue, which will be distinguishable from each other. Note that there are other approaches to blending beyond just averaging the colors. For instance, certain embodiments determine which colors are used in the underlying trace event signatures and then blend only those colors. This results in a blend of colors that does not depend on how many times a given color is present in the trace event signatures covered by a summary entry.

(4) Blending the trace event signature values according to the relative frequency of the occurrence of trace events within each signature. This is particularly useful for those signatures that are colors representing trace events which do not have a duration, though it applies to other situations as well. For instance, if a summary entry represents 110 trace events, of which 100 have a blue signature, and 10 have a red signature the resulting summary entry signature color value would have 10 parts blue and 1 part red. How this achieves the goals of summary entry signatures and an example embodiment of this approach is outlined above.

(5) Blending the signature values according to the relative duration of the occurrence of trace events within each signature. This is particularly useful for those signatures that are colors representing trace events which have a duration, though it applies to other situations as well. For instance, if there are two trace event signatures, one of which is green and has trace events which were active for 5 seconds, and one of which is yellow and has trace events which were active for 1 second, when the signatures are merged the resulting color would have 5 parts green and 1 part yellow.

(6) Performing the bitwise OR of all trace event signatures. This is particularly useful for those trace event signatures that are single bit hashes, though it applies to other situations as well. An example embodiment for string trace events would hash the string into a one bit hash used as the trace event signature as has been discussed elsewhere. The trace event signatures represented by the summary entry would then be OR'ed together, resulting in a summary entry signature. Then that summary entry signature would be rendered to the screen. Certain embodiments display the summary entry signature as a color, determined by mapping each bit in the signature to a color, and then blending all of the colors of the bits which were set in the signature to generate a final color for use in the display. In certain embodiments this meets the three goals of summary entry signatures by: (a) having a fixed size by being the same size as the trace event signature (which is itself a fixed size); (b) being easy to compute, because as each trace event signature is processed only the accumulated bitwise OR result needs to be kept in memory; (c) display is distinguishable, at least from other summary entry signatures which contain trace events which have different bitwise OR results, when the signature is rendered in such a way as to show the which bits are set or not set. See below for rendering approaches.

(7) Summing the underlying signature values. This is particularly useful for those signatures that store total execution cycles (or other units of execution) and other accumulation values, though it applies to other situations as well. Certain embodiments may only sum a subset of the trace event signatures. For example, when merging trace events representing execution state of a thread in cycles only the trace events which represent execution of code could be summed. This would result in a summary entry signature which represented how long a thread was executing during the time period of the summary entry. Times where the thread did not execute (for instance, it was interrupted, blocked on a semaphore, waiting for a system call to complete, etc.) would not be included. If the thread did not execute during the time period of the summary entry then the summary entry signature would be zero. In certain embodiments this meets the three goals of summary entry signatures by: (a) having a fixed size by storing the summed signature values (which may be stored in a summary entry signature which is larger than the trace event signatures it is summed from, to prevent the result from overflowing); (b) being easy to compute, because as each trace event signature is processed only the current sum needs to be kept in memory; (c) display is distinguishable, at least for those cases where the sum of the different sets of trace event signatures is different.

(8) A combination of the above approaches. For example, if a thread signature is made by hashing the processor it executed on in the upper bits, and the lower bits recorded the execution time, the upper bits could be bitwise ORed, and the lower bits could be summed. Alternately, certain embodiments are able to store multiple approaches for generating summary entry signatures into a new summary entry signature that represents all of those approaches in a single signature value. For example, the first 64 bits of a summary entry signature could be the sum of the underlying signature values, and the second 64 bits could be a bitwise OR of the one bit hash. Other approaches would be apparent to those skilled in the art.

Certain embodiments are able to merge multiple summary entry signatures into a new summary entry signature. For example, for summary entry signatures which represent a minimum to maximum, and a first summary entry signature is 0-75, and a second is 50-100, then merging these two would result in a new summary entry signature which is 0-100. Many approaches for merging multiple trace event signatures into a summary entry signature can be applied to merging multiple summary event signatures into a summary entry signature as skilled artisans may readily appreciate.

To display a summary signature, a method is needed to turn summary entries into images (i.e. to be displayed on a screen). In certain embodiments, methods of rendering signatures include:

(1) Plotting signatures that track minimum/maximum data, where the high point in the data plot is the maximum, and the low point is the minimum. The space between the minimum and maximum can be filled in to indicate that other data values may exist between the two points. If additional values such as the mean have been included in the summary entry signature, they can be plotted as well.

(2) Rendering signatures that track execution time (or other units of execution) within a summary region (such as for threads or processors) as a thick bar. The bar is filled in, in proportion to the amount of time (or other units of execution) that elapsed during execution vs. the total number that elapsed during the time span of the summary entry. When many signatures in a row are rendered side by side, this displays as a graph showing time spent executing, sometimes known as a load graph.

(3) Rendering the colors of signatures that track which processor a thread was executing on by blending the colors used to represent the different processors. In this approach, each bit set represents a color, and when multiple bits are set, the output color is the blending of those colors. In addition, certain embodiments assign the colors to specific bits to maximize the visual distance between colors based on the possible number of processors. So on a system with four processors, for example, the different colors are easily distinguishable. For signatures that track which thread a processor is executing, a similar approach can be taken.

(4) Rendering the colors of signatures that track function calls with a 1-bit hash by blending the colors used to represent the different functions executed. In this approach, each bit set represents a color, and when multiple bits are set, the output color is the blending of those colors.

(5) Rendering the colors of signatures that track strings with a 1-bit hash by blending the colors assigned to the string values present in the summary entry. In this approach, each bit set represents a color, and when multiple bits are set, the output color is the blending of those colors.

(6) A combination of the above approaches. For example, if a signature records which processor is executing in the upper bits, and the number of cycles executed in the lower bits, the top bits determine the overall color, and the lower bits determine the thickness of the bar.

Certain embodiments render call stack graphs as a series of file signals stacked on top of each other. Certain embodiments render shallower levels of the call stack graph before rendering deeper levels. For instance, in a typical C/C++ program, the shallowest call stack level is the "main" function. This approach allows the rendering engine to stop searching for file signal data for deeper call stack levels when it has reached a point where there is no call information. This optimizes away the need to do work for empty call stack levels given a particular zoom level and position in the event log.

Furthermore, as analysis of trace events progresses, call stack levels can be discovered and added. Deeper call stack levels result in more file signals being added below existing file signals. However, shallower levels can also be added above existing file signals. This can occur while the summarization engine is summarizing forwards or backwards. For example, an embodiment which summarizes C/C++ functions backwards, with trace data which does not contain the main function exiting, may not include main in the call stack graph until the function entry trace event is reached. As a result, the summarization engine does not know that it needs to create a call stack level (and associated file signals) for main. However, as the summarization engine continues to summarize backwards, it may encounter the trace event that indicates that main was entered. At this point, the summarization engine can create a file signal representing the stack level for main. Depending on their requirements, certain embodiments may store the call stack state for the end (or start) of the trace log. This can be used to initialize the call stack graph file signals with the ending (or starting, if summarizing forwards) state of the call stack. In this way, the call stack graph can display the entire ending (or starting if going forwards) call stack even if some of the functions on the call stack do not have associated entry or exit trace events.

Figure 32:
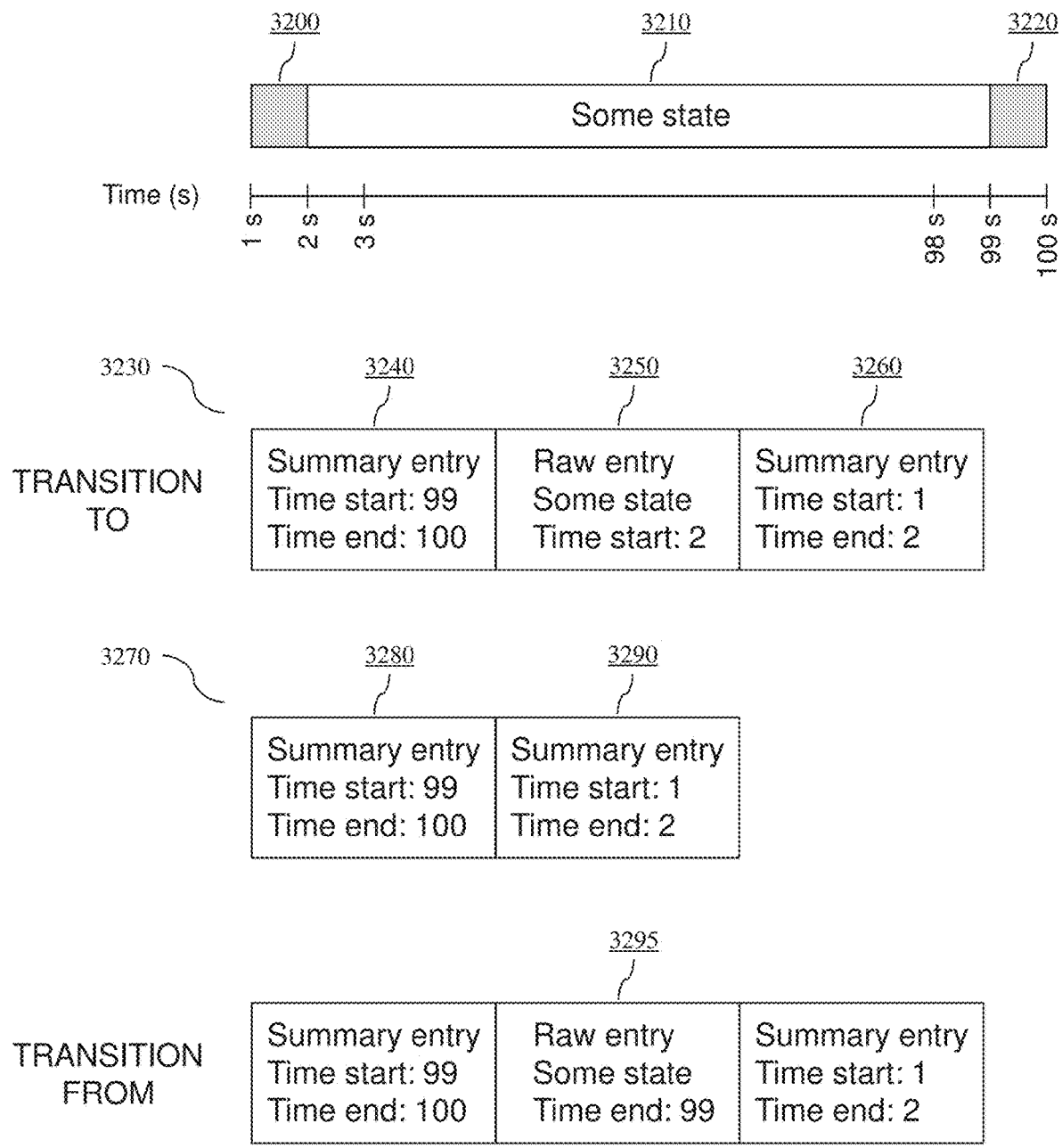
FIG. 32 depicts a feature of exemplary summary streams that enables rendering engine optimizations in certain embodiments of the present invention.

For file signals for which the rendering engine wants to show entries that represent more than an instant in time (for example, entries that represent a state or a function call, both of which have a duration), certain embodiments include raw events between summary entries when adjacent summary entries in the file stream do not represent a contiguous range of time. This allows the rendering engine to determine what to display between non-contiguous summary entries without reading data from the raw file stream. For example, in FIG. 32, the final rendered display shows one pixel-unit of execution representing summarized events (3200), followed by many pixel-units of execution representing a period of time when a state is true (3210), followed by one pixel-unit of execution again representing summarized events (3220). The contents of the summary stream (3230) are made up of a summary entry (3240), a raw event (3250) that represents the time span between summary entries, and another summary entry (3260). This is all the information that is required to render the display. If the summary stream did not contain the raw entry, as is shown in 3270, the rendering engine would have to find and read the raw event from the file signal's raw stream to determine what (if any) event to display between the two non-contiguous summarized entries (3280, 3290). This would require at least one additional file seek and read. Note that this optimization (including raw events between summary entries) is different than the optimization, discussed elsewhere, that includes unsummarized raw events inline in the summary stream when there are few events in a summarized time period. With the optimization discussed here, the raw event is the last (or first) event that starts (or ends) the summary entry. The rendering engine distinguishes between the two optimizations by determining whether the event start (or end) time is contained within the time span represented by the summary entry.

In certain embodiments, events that have a duration also need to specify whether they represent a "transition to" a state, a "transition from" a state, or the start or end of a state. For example, in FIG. 32, the raw event 3250 is a transition to event. It represents the last event in time contained in summary entry 3260. The next summary entry in time—3240—has a start time of 99, so the transition to raw event 3250 indicates that from time 2 until time 99, the state was "Some state." If the raw event were instead a transition from event, and it recorded the same state information, it would have an end time of 99, as is shown in 3295. Whether transition to or transition from events are used depends on the form of trace events input to the summarizer.

Figure 33:
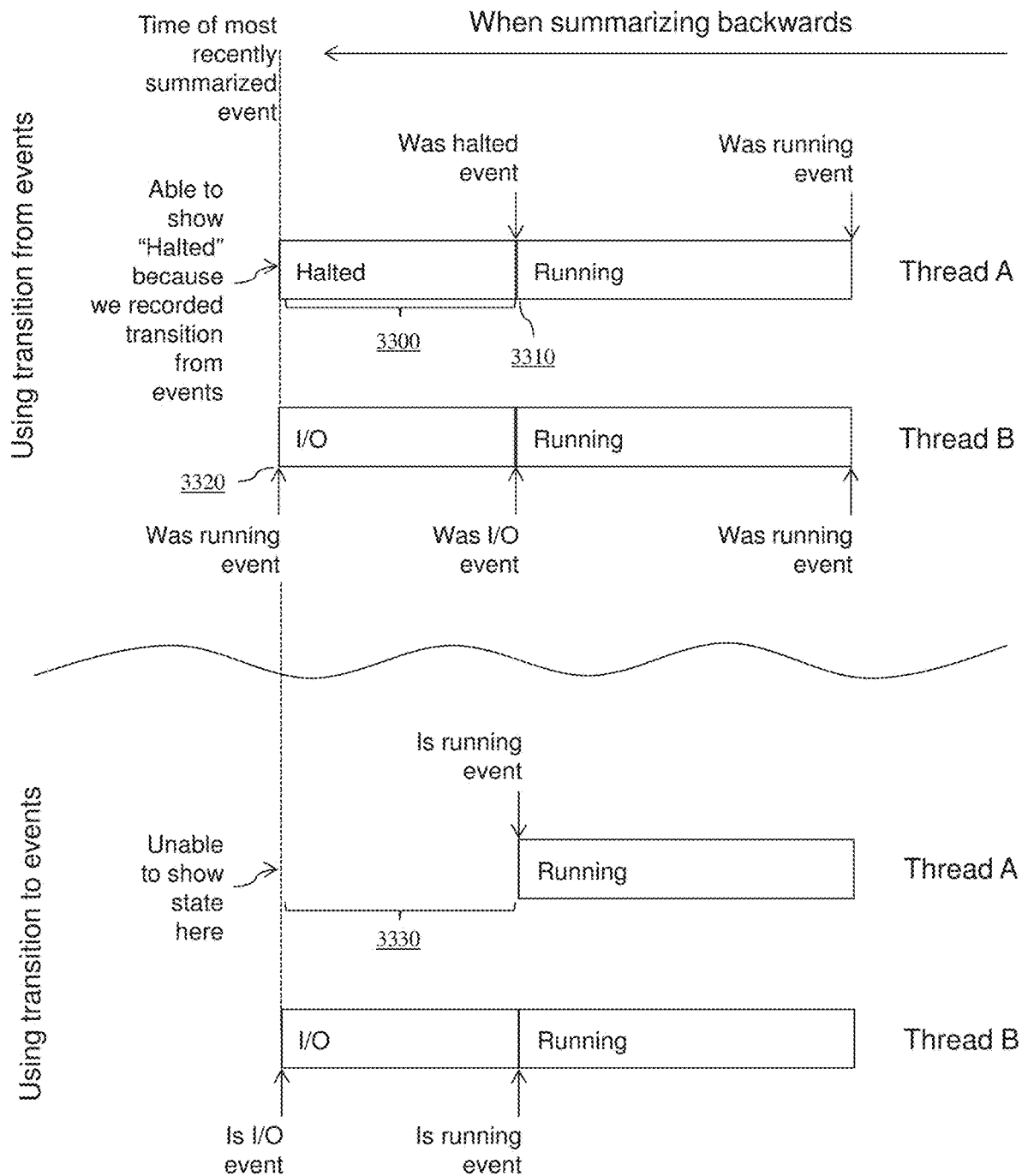
FIG. 33 depicts a partially summarized exemplary log and corresponding representations of a display signal according to certain embodiments of the present invention.

When summarizing backwards, it is preferable if trace events record the transition from state. For certain embodiments, this allows the rendering engine to display a state that spans the period of time between the most recently summarized event for a given display signal and the most recently summarized event for any display signal. For example, in the top half of FIG. 33, where transition from events are being used, 3320 is the most recently summarized trace event for any display signal, and 3310 is the most recently summarized trace event for the display signal associated with thread A. Because the event at 3310 was a transition from event, recording that the state was halted before the event occurred, the rendering engine is able to deduce that thread A was in the halted state from 3310 until at least the time when 3320 occurred. This range of time is indicated by 3300. If transition to events were being used in a similar situation, as is shown in the bottom half of the figure, the rendering engine would not be able to determine the state of thread A during the range of time indicated by 3330.

For reasons similar to those given above, "transition to" is preferred when summarizing forwards.

Figure 34:
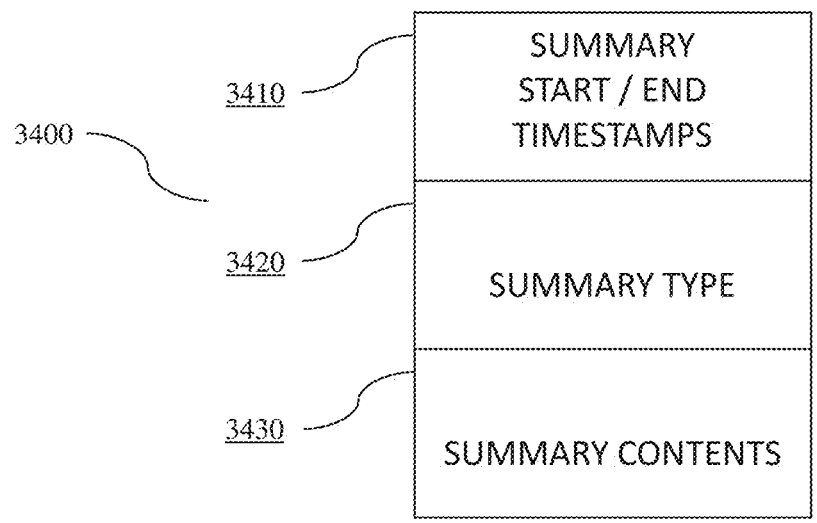
FIG. 34 is an exemplary diagram depicting aspects of summary entries that can be written to files in certain embodiments of the present invention.

FIG. 34 is an exemplary diagram depicting aspects of data elements stored in summary streams that may be implemented in certain embodiments of the present invention. Each data entry (3400) comprises explicit or implicit information that specifies (1) the starting and ending timestamp associated with the entry (3410), (2) an entry type (3420), and (3) the actual contents of the summary entry (3430).

In certain embodiments, the summary type values (3420) are either "Raw," "Summary," or "Reference to Raw." In such embodiments, if the summary type value (3420) is "Summary," the timestamp values (3410) indicate the start and end timestamps of the first and last data points within the entry, and the summary contents (3430) contain an encoded summarization of the data points comprising the entry, as described elsewhere in this document. If the summary type value (3420) is "Reference to Raw," the timestamp values (3410) also indicate the start and end timestamps of the first and last data points within the entry, but the summary contents (3430) are blank (certain embodiments may encode a pointer for the location on disk for the referenced raw data). However, if the summary type value (3420) is "Raw," the timestamp value (3410) is simply the timestamp of the raw data point, and the summary contents (3430) comprise the raw data point.

Figure 35:
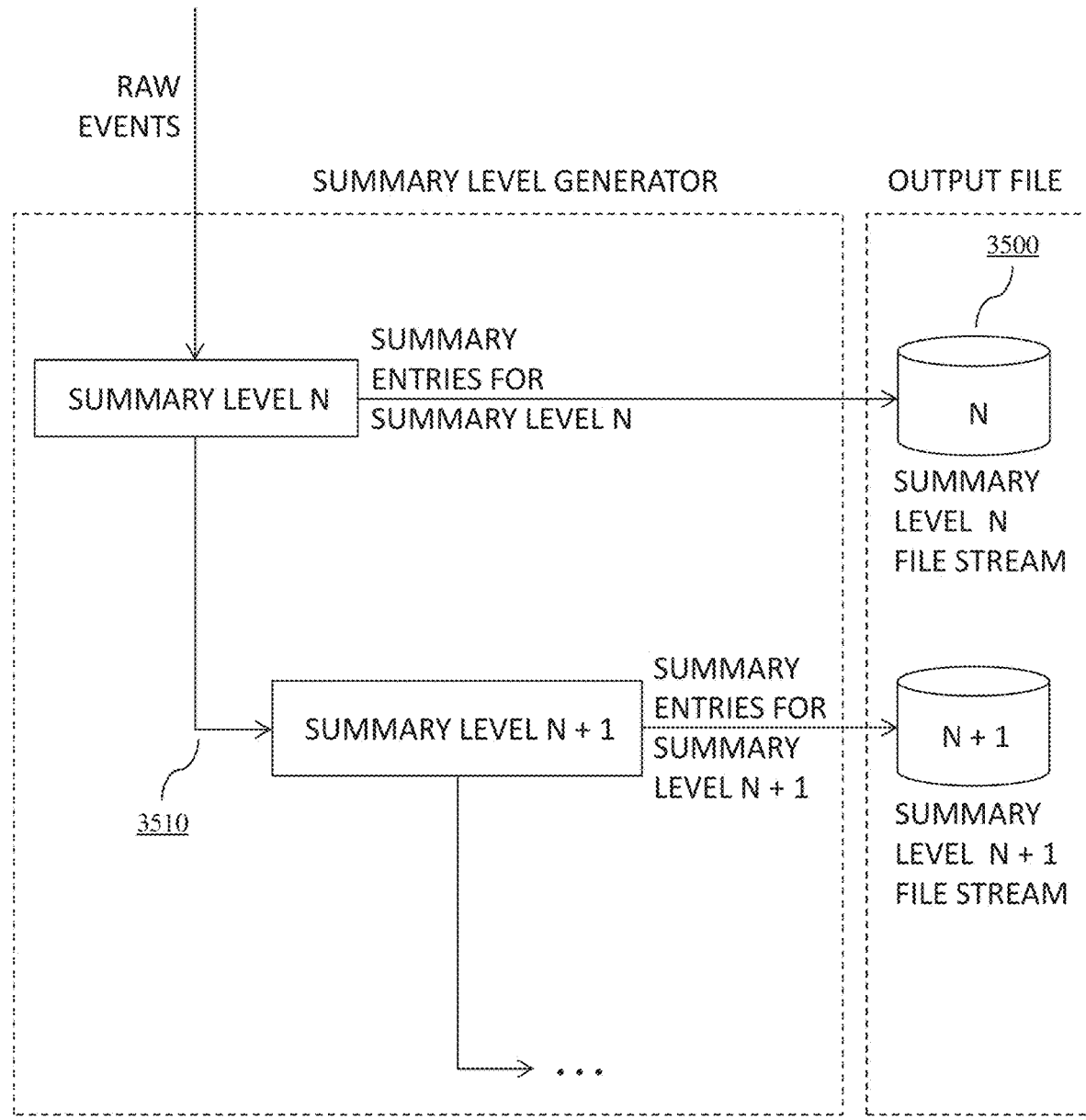
FIG. 35 is an exemplary high-level diagram depicting aspects of the creation of summary levels according to certain embodiments of the present invention.

As is shown in FIG. 35, the summary level generator takes in a stream of raw events to create a series of summary levels. The summary entries from one level cover an amount of time equal to that of the summary entries from the previous (i.e., finer) summary level, times the scale factor. The output from each summary level is optionally written to a file stream (3500) and sent to the next summary level (3510).

Figure 36:
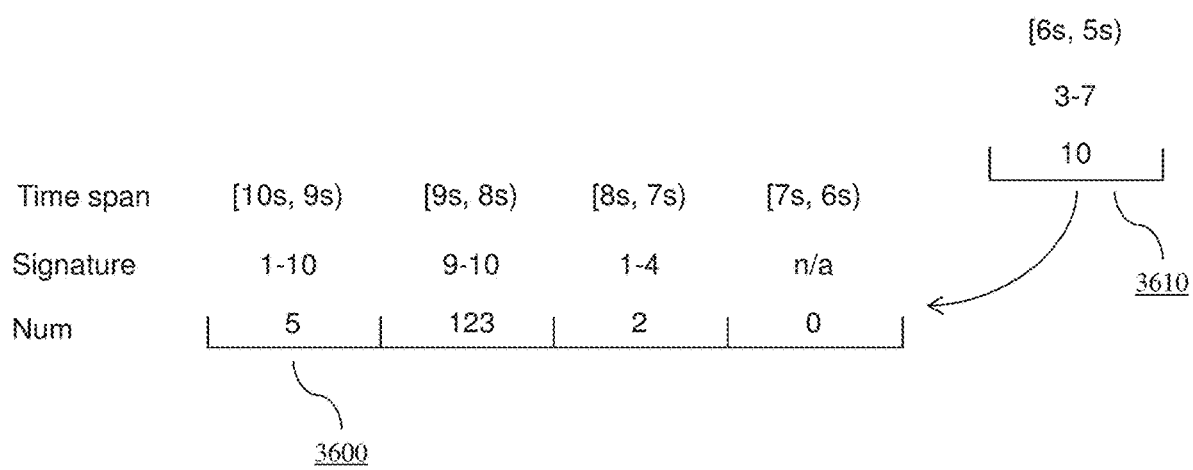
FIG. 36 depicts aspects of exemplary summary buckets according to certain embodiments of the present invention.

In certain embodiments, each summary level contains a series of summary "buckets," as is shown in FIG. 36. Each bucket has a constant size within that summary level, and each is the scale factor times larger in every increasing summary level. Each summary bucket stores a representation of all the trace events that are contained within its time span, as well as the number of events contained within it, the signature of all those events, and other information depending on the requirements of the implementation. The time span is inclusive on one edge and exclusive on the other so that no two buckets overlap and so that all time covered by the input trace events is represented by the buckets. For example, the bucket 3600 includes all events that occurred immediately after 9 seconds, up to and including 10 seconds. (Note the mathematical notation for the time range, which uses "[" to indicate inclusive and ")" to indicate exclusive.) In this case, there were five of those events, and their values ranged from 1 to 10. In certain embodiments, and for purposes detailed elsewhere, buckets also contain the first and last time of the events that are stored within them, as well as the first and last raw event. Other information, such as whether the bucket is marked as a reference to raw, may also be stored.

As is shown in FIG. 36, certain embodiments have a "sliding window" (illustrated in the figure and elsewhere as the "window size") that specifies how many buckets are to be kept in memory before they are output to a file. For example, in FIG. 36, adding the new bucket 3610 causes the bucket 3600 to "drop out of the sliding window," and thus be evaluated for output to the summary file stream.

The summarization engine must compute the time span that each bucket in a given summary level covers. Certain embodiments compute this time span by multiplying the smallest unit of time possible between two events on the same processor (for example, the time elapsed between one clock tick and the next) by the scale factor raised to the power of the current summary level. For example, if the requirements of a particular implementation use a scale factor of 8, with a target running at 1,000,000,000 cycles per second (1 GHz), the bucket size of summary level 10 would be: (1 second/1,000,000,000 cycles)*(8^10)=1.073741824 seconds per bucket.

In certain embodiments, depending on the input data, the summarization engine avoids outputting all summary levels. Certain embodiments employ a variety of techniques to accomplish this:

(a) If a summary level has only had raw or reference to raw entries (meaning no summary entries were generated), there is no need to generate the level because it would be more efficient to read the data from the raw stream. However, since certain embodiments generate summary data at the same time that the rendering engine reads the data, there can be cases in which part of the data is summarized, and a particular summary level is not needed. Later, however, denser data may cause the summarization engine to create summary entries for the level, such that the level does need to be created in the file. At this point, the summary level can be created dynamically, such that the first record written is a reference to raw data, since all of that data has already been determined to be sparse enough not to need summary entries.

(b) Certain embodiments delay writing data to the file for summary levels that have not yet pushed summary buckets out of the window. This allows the summarization engine to delay determining whether to output the summary level until at least the number of summary buckets in the sliding window has been seen.

(c) A variety of optimizations allow the summarization engine to avoid outputting summary levels that it determines are unnecessary for the efficient rendering of the display. For example, if a summary level has few entries within it, it can be discarded because the rendering engine can read the summary entries from the next summary level down. Suppose the highest summary level contains 100 summary entries, and the scale factor is 8; the next summary level would have 800 summary entries at most. Those 800 summary entries were used to create the 100 summary entries of the higher level. Because the rendering engine can read 800 summary entries quickly, there is no need to keep the higher level that has only 100 entries.

The summarization engine is able to generate higher and lower summary levels on the fly at the same time that the rendering engine is displaying the data that has already been published to the file.

Example Operation of a Simplified Summarization Engine

An embodiment of the summarization engine will now be described. To simplify the description for the purposes of focusing on the sliding window and multiple summary levels, this embodiment only supports summarizing values and does not include a number of other capabilities described in detail elsewhere. See FIGS. 37A-37D for an embodiment of the summarization engine written in the Python language. This description refers to the figures by the line numbers located on the left side of the figures. Note that the term "resolution" in FIGS. 37A-37D corresponds to "summary levels" as that term is used throughout this document. The following description is designed as a guide to help readers understand the example embodiment set forth in those figures.

Trace events are processed in a loop, one at a time, in reverse order. See lines 169-173, which generate and then summarize trace events. For each event:

1. Write the event to the file signal raw stream (line 20).

2. Start by adding a signature of the event to the lowest summary level (line 23). Each summary level has a number (line 14) of buckets in sequence. Each summary level has a bucket size that is the scale factor (line 12) larger than the summary level below it. The bucket contains a representation of all trace events input so far that are contained within the time range the bucket spans. See line 52 for an example definition of a bucket.

3. If the new point falls within the time range of the current summary level's latest bucket, merge the point into that bucket (line 81).

4. If the new point falls outside the time range of the current summary level's latest bucket (line 140), run this algorithm on the next summary level up, passing in the last bucket at this summary level (line 87). Once that is completed, see if the addition of a bucket containing the new point will cause the number of buckets allowed in the sliding window to be exceeded (lines 91 and 112). If so, output all buckets that fell out of the sliding window with data to the file stream. Contiguous buckets marked as references are output as a single reference to a raw data event (line 125), and buckets marked as a summary are output as a summary entry (line 129). Create a bucket to hold the new event (line 94). If the total number of events in the window is less than the summary threshold, mark all buckets in the window as references by specifying a bucket beyond which every bucket is a reference (line 100).

5. Once there is no more input for the summarization engine (line 176), the data still within the sliding window of each summary level is output. For each summary level, from the lowest to the highest, the current bucket signature is merged into the level above (line 32). (Without this step, the summary level above would be missing data on the most recently added points.) Then all buckets within the summary level are shifted out (lines 33 and 111) using the same rules for whether to generate summary or reference entries that were discussed earlier.

Example Summarization of Trace Events

To simplify the explanation of the summarization process, many of the examples discussed summarize a single file signal of value type data. Using the information provided elsewhere in this document, skilled artisans would be able to implement variations of the summarization algorithm to handle multiple file signals of a variety of types.

Figure 38A:
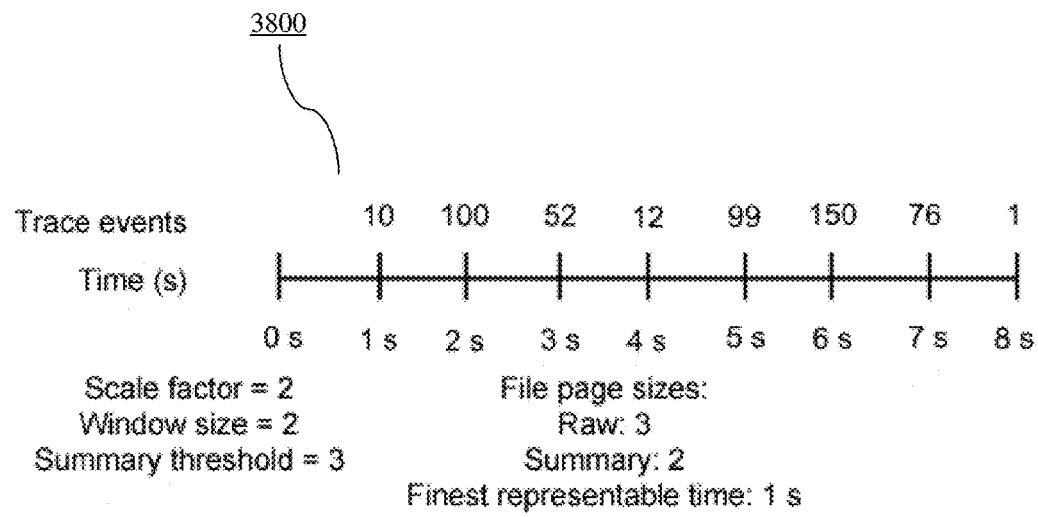
Figure 38B:
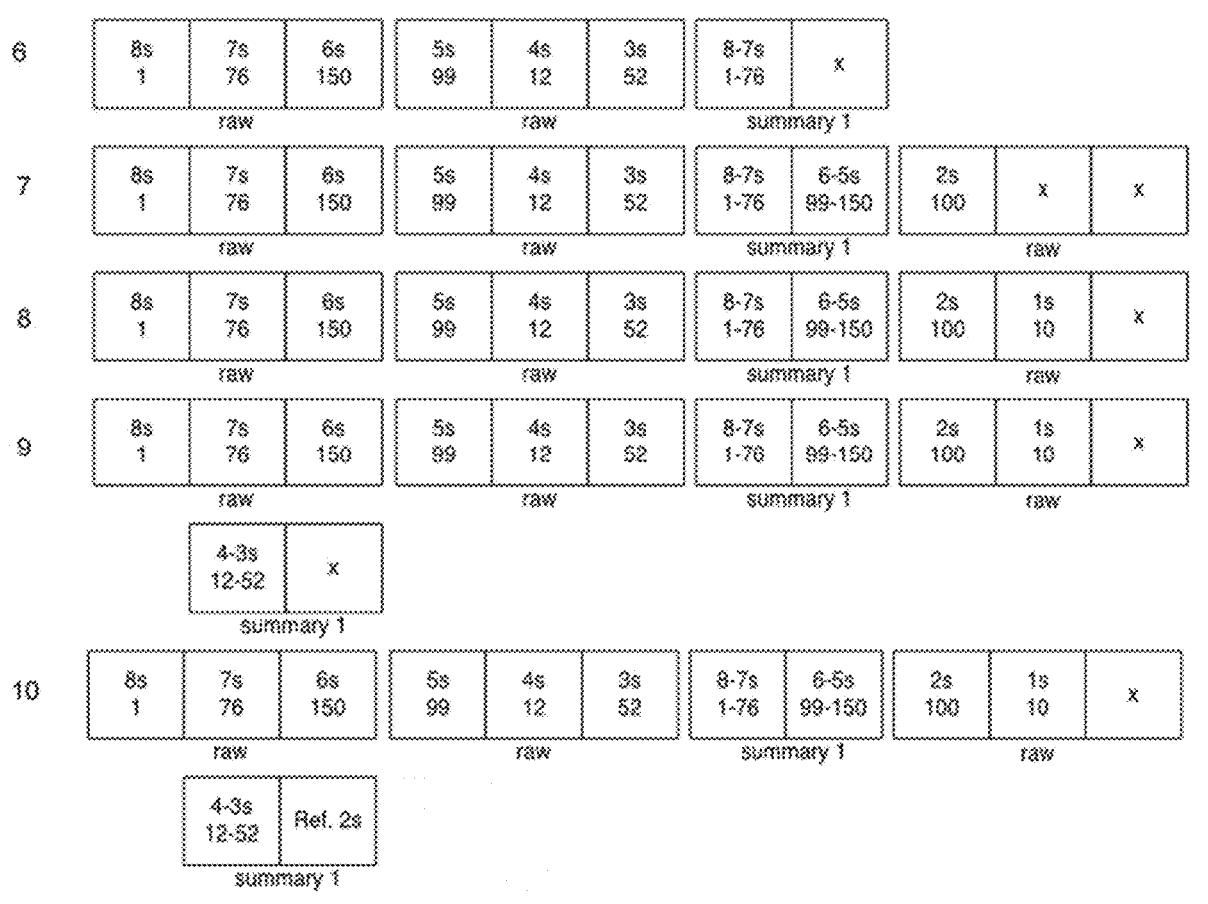
Figure 38C:
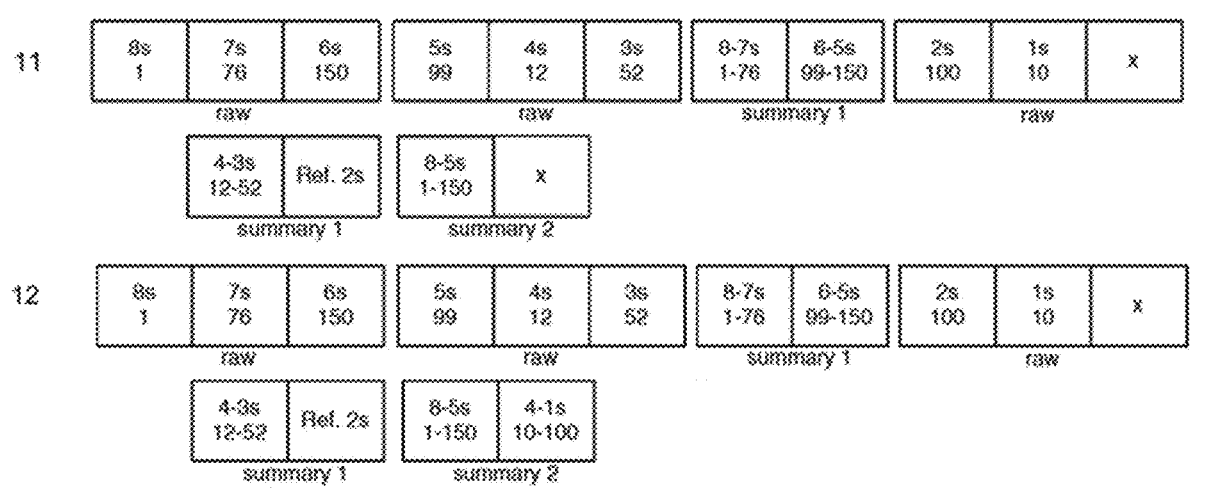

FIGS. 38A-38C depict an exemplary raw input data stream and the corresponding file output of data summarization as it would occur over time as each input event was processed according to embodiments of the present invention. Note that the internal representation of the sliding window is not covered in this example, only the inputs and outputs of running an embodiment of the summarization engine. FIG. 38A depicts the exemplary raw input data stream with an input every 1 second, for 8 seconds. For example, there is an event with a timestamp at 1 second and a value of 10 (3800).

FIG. 38A also sets forth the algorithmic parameters for this example. The parameter values were chosen so that the example does not get overly complicated for the purposes of the present discussion, but still demonstrates interesting behavior:

a. Scale factor—The time scaling factor between summary levels (equal to 2 in this example).

b. Window size—The number of summary buckets contained in the sliding window (equal to 2 in this example).

c. Summary threshold—The number of events required in a window before a summary will be output.

d. File page sizes—The number of storage units in the output file that are pre-allocated for raw and summary output streams. As is the case here, certain embodiments have different pre-allocation sizes assigned to raw event streams and summary streams.

e. Finest representable time—The smallest unit of time this data set can represent.

This example demonstrates processing the input in reverse time order, so the first event considered is at 8 seconds with a value of 1 (8 s, 1).

1. There is no pre-allocated space left for this event in a raw event stream, so 3 file units are pre-allocated in a raw stream, and the first event is written into the first file unit (1).

2. The next event (7 s, 76) is added to the file. Since there are still 2 empty file units in the raw stream, the event is simply added to the next empty file unit space in the raw stream (2).

3. A third event (6 s, 150) is added to the raw stream of the file (3).

4. A fourth event (5 s, 99) is added; however, there is no more space left in the existing raw event stream, so a raw file page is pre-allocated at the end of the file for the raw event stream, and the event is stored in the first of the 3 file units in that page (4).

5. A fifth event (4 s, 12) is added to the raw stream of the file. This event causes the summarization engine to generate a third summary bucket for summary level 1. Since the window size is 2, this causes the oldest level 1 summary to fall out of the sliding window. There are 4 events in the sliding window region when this happens, so a summary entry is generated. There is no space for storing the summary entry, so 2 file units are pre-allocated at the end of the file for the summary level 1 event stream, and the summary of the points from 7 seconds to 8 seconds, with a signature of 1 to 76, is stored into the first entry of that new stream (5).

6. A sixth event (3 s, 52) is added to the raw stream of the file. Note that it is not added to the end of the file because there is a pre-allocated space for the entry at the end of the raw file stream, which comes before the summary level 1 stream (6).

7. A seventh event (2 s, 100) is added; however, there is no more space in the existing raw event stream, so 3 file units are pre-allocated at the end of the file for the raw event stream, and the event is stored in the first of those units. In addition, adding this event causes the summarization engine to generate a third summary bucket for summary level 1. Since the window size is 2, this causes the oldest level 1 summary to fall out of the sliding window. There are 4 events in the sliding window region when this happens, so a summary entry is generated and stored to the end of the summary level 1 stream (7).

8. The eighth and last event (1 s, 10) is added to the raw event stream (8). There are no more trace events to consider, so the remaining events and summaries in the summary levels are output according to the summary threshold rules:

9. Summary level 1 has 2 buckets left: 3 seconds to 4 seconds with a signature of 12 to 52, and 1 second to 2 seconds with a signature of 10 to 100. The first is output to the summary level 1 stream because there are 4 events within the remaining summary buckets, which is more than the summary threshold of 3. However, to output the event, 2 file units are pre-allocated to the end of the file for summary level 1, and then the summary entry is written to the first file unit (9).

10. The second summary bucket for level 1 is not output because there are only 2 events within the remaining sliding window, which is lower than the summary threshold of 3. Instead, a reference to raw data, whose first referenced event time is 2 seconds, is output, and the remaining summary buckets are not considered, though in this case, none are left (10).

11. Summary level 2 has 2 buckets left: 5 seconds to 8 seconds with a signature of 1 to 150, and 1 second to 4 seconds with a signature of 10 to 100. The first is output to the summary level 2 stream because there are 8 events within the remaining summary buckets, which is more than the summary threshold of 3. However, to output the event, 2 file units are pre-allocated to the end of the file for summary level 2, and then the summary entry is written to the first file unit (11).

12. The second summary bucket for level 2 is output because there are 4 events within the remaining summary buckets, which is more than the summary threshold of 3 (12).

Figure 39:
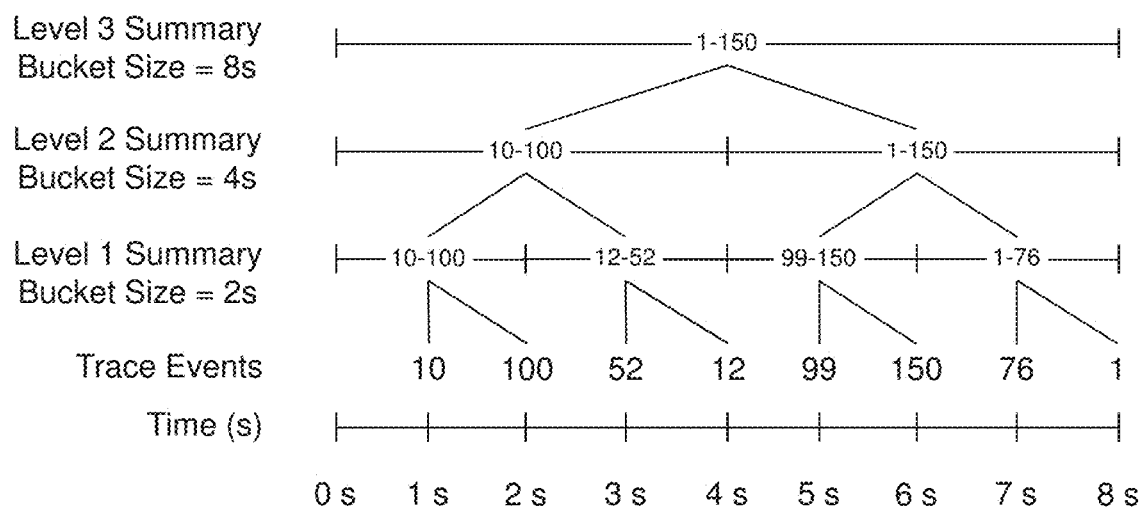
FIG. 39 depicts exemplary details of data summarization according to aspects of the present invention.

FIG. 39 depicts exemplary details of summarizing a sequence of trace events in reverse time order according to aspects of the present invention. This example demonstrates summarization by representing the tree-like structure that is generated in the different summary levels, as well as the output of the summarization process. The output is not a literal representation of the contents or structure of the output file. The format of the file and an example of its layout is described elsewhere. The step-by-step process of building up the summary levels in such a way that all of the trace events do not need to be maintained in memory at the same time is also explained elsewhere.

FIG. 39 sets forth the algorithmic parameters for this example. The parameter values were chosen so that the example does not get overly complicated for the purposes of the present discussion, but still demonstrates interesting behavior:

a. Scale factor—The time scaling factor between summary levels (equal to 2 in this example).

b. Window size—The number of summary buckets contained in the sliding window (equal to 2 in this example).

c. Summary threshold—The number of events required in a window before a summary will be output (equal to 3 in this example).

d. Finest representable time—The smallest unit of time this data set can represent (equal to 1 second in this example).

FIG. 39 depicts a visualization of 3 levels of summarization generated for the example trace events—a level 1 summary (with bucket size=2 seconds), a level 2 summary (with bucket size=4 seconds), and a level 3 summary (with bucket size=8 seconds).

To generate the level 1 summary in FIG. 39, the summarization engine starts with the most recent data. The trace event 1 at 8 seconds and the event 76 at 7 seconds fall within the level 1 summary bucket, which spans time from 6 seconds, exclusive, to 8 seconds, inclusive. These trace events are stored into the summary level 1 bucket with a signature (1-76) that records the minimum (1) and maximum (76) values within the bucket.

The same process is used to generate the next 3 buckets in summary level 1, with each bucket summarizing 2 trace events, and with no overlap between time ranges.

The level 2 summary in FIG. 39 is generated from the contents of the level 1 buckets, where each pair of buckets (because the scale factor is 2) from level 1 is merged into a single bucket in the level 2 summary. For example, the bucket containing the trace events from 6 seconds, exclusive, to 8 seconds, inclusive, with the signature of 1-76 and the bucket containing the trace events from 4 seconds, exclusive, to 6 seconds, inclusive, with the signature of 99-150 are merged into a new bucket from 4 seconds, exclusive, to 8 seconds, inclusive, with a value of 1-150. The same process is applied to the remaining 2 summary entries in level 1 to generate the 10-100 level 2 summary bucket.

Finally, the next level of summarization (i.e., the level 3 summary) is generated from the previous level (i.e., the level 2 summary) in the same way that the level 2 summary was generated from the level 1 summary. Specifically, the summary bucket from 4 seconds, exclusive, to 8 seconds, inclusive, with the value of 1-150 is merged with the summary bucket from 0 seconds, exclusive, to 4 seconds, inclusive, with the value of 10-100 to form a new level 3 summary bucket from 0 seconds, exclusive, to 8 seconds, inclusive, with a value of 1-150.

FIG. 40 shows the file signal streams output for these summary levels. A raw events stream containing all the input trace events (4040) is output, as well as a level 1 summary stream (4030), a level 2 summary stream (4010), and a level 3 summary stream (4000). The last record output in the level 1 summary stream is a reference to raw (4020) because there are only 2 trace events contained within the last summary entry output, and the summary threshold was set to 3 for this example. The level 2 summary stream does not have a reference to raw because the last entry contains 4 points, which is larger than the summary threshold.

Certain embodiments may store references to raw as a pointer to a location in the raw file stream, a time representing the raw event referenced, or an implied time based on the time of the nearest non-reference event in the same summary level. The example in FIG. 39 specifies the time of the raw trace event that is being referenced.

Figure 41:
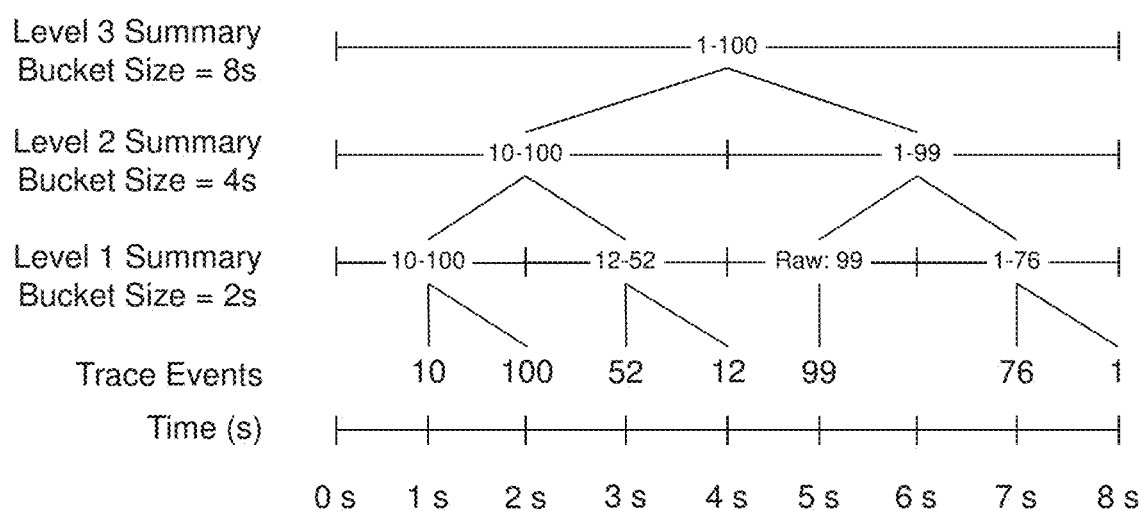
FIG. 41 depicts another set of exemplary details of data summarization according to aspects of the present invention.

FIG. 41 depicts another set of exemplary details of data summarization according to aspects of the present invention. The trace events and summarization parameters depicted in FIG. 41 are the same as those in FIG. 39, with one exception: in FIG. 41, there is no data point at the 6-second timestamp. This example demonstrates how the summarization engine retains raw trace events within summary levels.

The level 1 summary bucket contents are identical to those of FIG. 39, with the exception of the bucket from 4 seconds, exclusive, to 6 seconds, inclusive, which contains a single raw trace event with a value of 99. This is because the span of time that this bucket represents includes only a single trace event at 5 seconds with a value of 99. Certain embodiments support recording raw trace events in the bucket when there are a small number of them (in this example, 1).

The process for creating summary level 2 is the same as that which was used for the example in FIG. 39, except that instead of combining the signatures 1-76 and 99-150, the signature 1-76 is combined with the raw event value 99. The resulting signature is 1-99. When this is merged into the bucket for summary level 3, it results in a signature of 1-100.

Figure 42:
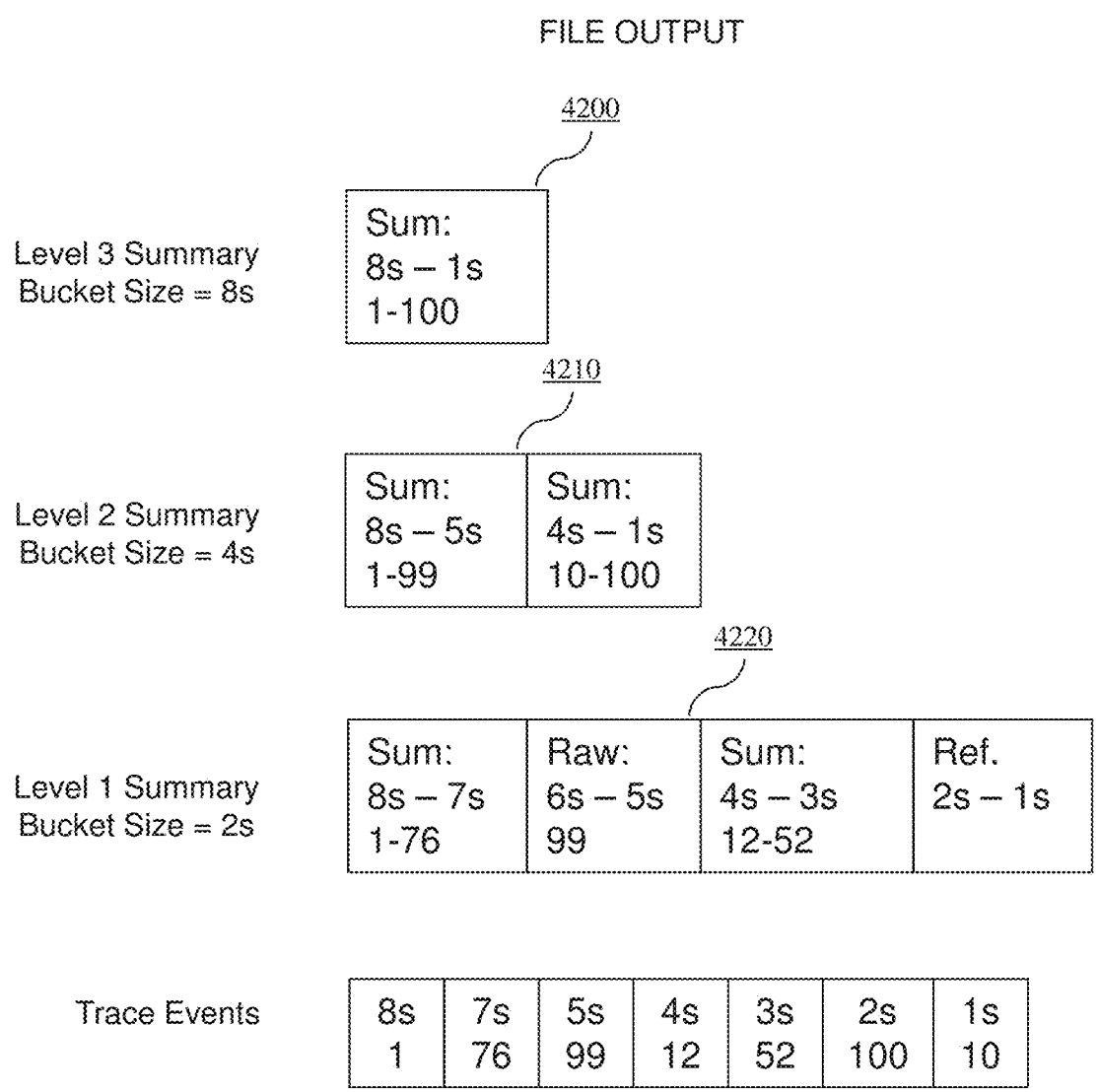
FIG. 42 depicts exemplary file output according to certain embodiments of the present invention, corresponding to the output of the summarization process on the received raw data stream depicted in FIG. 41.

The raw events file stream in FIG. 42 is similar to that of FIG. 40; however, in FIG. 42, it does not include a raw event at 6 seconds. Additionally, the level 1 summary in FIG. 42 includes a raw event as its second entry (4220), the level 2 summary has a first entry signature of 1-99 (4210), and the level 3 summary has a first entry signature of 1-100 (4200).

Examples of Failure Modes without Full Summarization Engine

The summarization approach that this patent describes allows encoding trace events such that, in certain embodiments: (1) they can be rendered quickly, (2) there is no need to inspect all events, (3) some information is presented about all events within every pixel-unit of execution, and (4) resultant files are not substantially larger than the input data. The following examples, which show what would happen without various parts of the summarization system, help to demonstrate why this is the case.

The first example demonstrates why it is important to have summaries according to aspects of the present invention in certain embodiments. Summaries allow the viewer to efficiently render a display at any zoom level.

Without summarization, it is possible to quickly render a zoomed-in screen (one in which only a few points will be displayed) by reading the raw data directly and converting that data into a displayed view. However, as the user zooms out, the rendering engine must look at a larger and larger number of points to display a new image on the screen. Eventually, this begins to impact the rendering speed. When a large enough number of points must be inspected, rendering the image can take seconds, minutes, or even hours.

Figure 43:
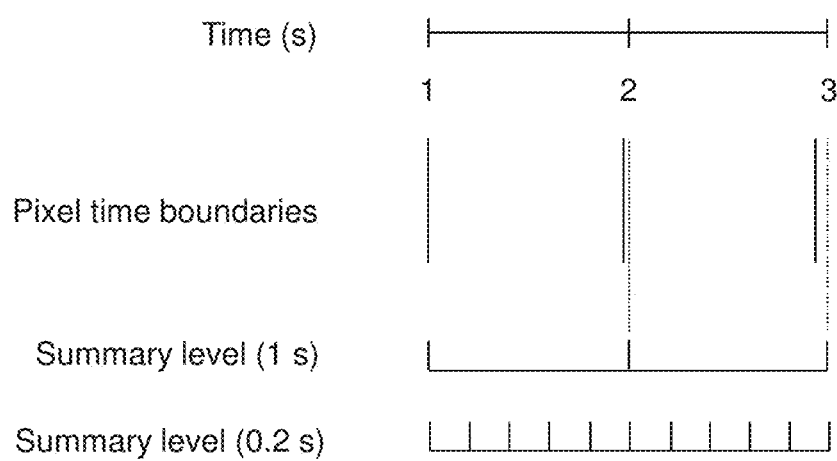
FIG. 43 depicts aspects of data summarization that make efficient rendering at any zoom level possible in certain embodiments of the present invention.

With summaries, the information required to render the display is pre-computed and placed in the file in a form that is efficient to read for any zoom level required. In the worst case, the rendering engine must read the number of pixel-units of execution times the scale factor number of summary entries. This is because the time span represented by a pixel-unit of execution is not quite equal to a summary level in the worst case; as a result, the next summary level down must be read. For example, see FIG. 43. In it, two summary levels have been constructed—one that spans 1 second and one that spans 0.2 seconds (so the scale factor is 5 for this example). At the zoom level that the rendering engine has been requested by the user to display, each pixel-unit of execution represents 0.99 seconds. The rendering engine cannot use the summary level at 1 second, even though each pixel-unit of execution is almost that size, so it uses the finer summary level. This means that for each pixel-unit of execution, 5 summary entries are read.

Using the information that the rendering engine read from the summary level, the rendering engine can then dynamically create a new summary level that applies to the current display requirements. This is known as resummarization. During resummarization, each collection of summary entries which are within the bounds of the pixel-unit of execution being displayed have their signatures merged in the same way that the summary entries were originally created during summarization. For instance, by using a bitwise or of the signatures, or taking the minimum and maximum of all of the entries.

Without summaries, dealing with a data set containing a trillion trace events necessitates a linear scan of all trillion trace events. However, given that monitors have a resolution that is usually measured in thousands of pixels in width, using summaries means that only a few thousand summary entries (or fewer) need to be read to retrieve the data necessary to render a file signal. This is true regardless of the number of trace events contained within the time span to be rendered.

Figure 44:
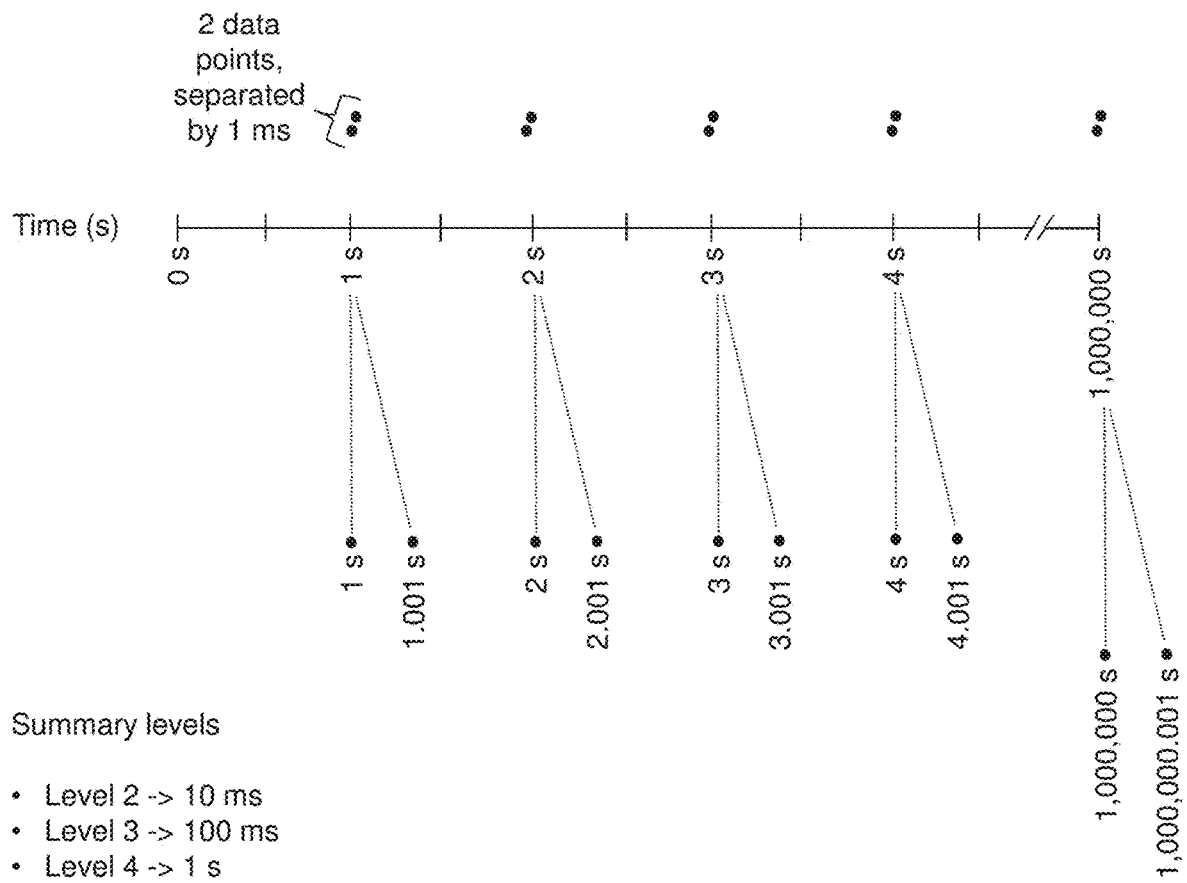
FIG. 44 depicts aspects of data summarization according to certain embodiments, in which two data points, separated by one millisecond, are output every second for one million seconds.

The second example demonstrates why it is important to be able to output a reference to raw instead of a summary entry. (References to raw direct the rendering engine to read data from the file signal raw event stream.) In FIG. 44, 2 data points, separated by 1 millisecond, are output every second for 1 million seconds. The scale factor is 10, and the finest representable time is 1 millisecond. Without any other optimizations, such as discarding summary levels with a small number of entries, summary levels for 10 milliseconds; 100 milliseconds; 1 second; 10 seconds; 100 seconds; 1,000 seconds; 10,000 seconds; 100,000 seconds; and 1,000,000 seconds would be constructed and output. Of these, the 10-millisecond summary level would be 50% the size of the raw input data because summary entries are output for buckets that contain points, and every second, there is a bucket of size 10 milliseconds that contains 2 points. The same logic holds for the summary level above; every second there is a bucket of 100 milliseconds that contains 2 points, which would be 50% the size of raw input data. The same is true of summary entries at the 1-second level (level 4). Those 3 summary levels would have 150% as many entries as there are trace events. Level 5 (10 seconds) would have 20 events summarized within each entry, and so would contain 5% as many entries as there are trace events. Level 6 would contain $\frac{1}{10}^{th}$ that many, and so on through level 9. Thus, level 5 through level 9 would contain 5.5555% as many entries as trace events, and so would be a small fraction of the overall output file size.

Without the sliding window, the number of summary entries output would be 155.5555% the number of trace events input. This is not ideal when dealing with very large numbers of events, as data storage requirements can become unreasonable. For this example, with a sliding window set to 1,000 buckets and points per window set to 10,000, summary levels would only be output starting at summary level 5 (the 10-second level). So in this example, the output file would contain only 5.5555% more events than the number of trace events input.

Figure 45:
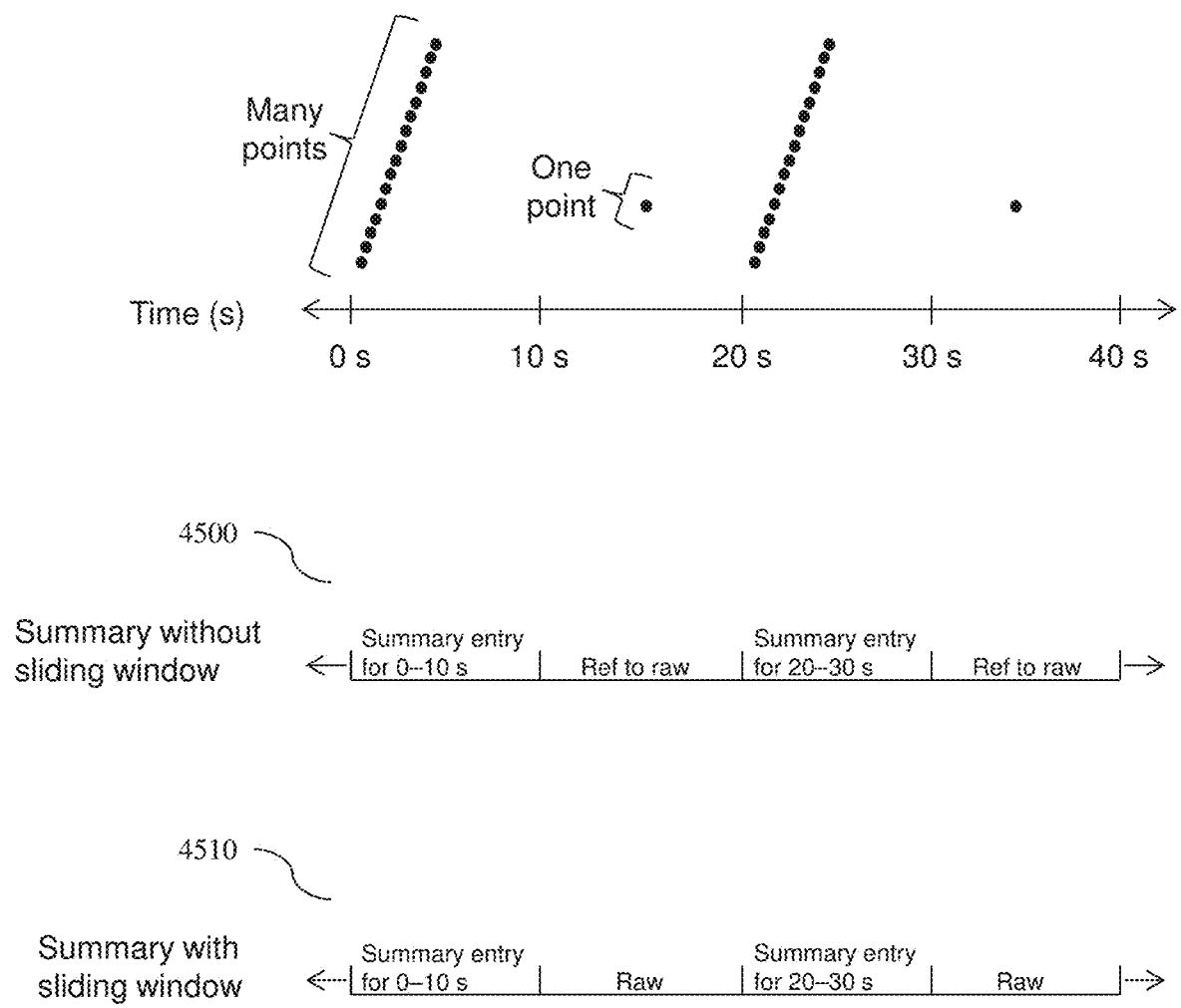
FIG. 45 depicts aspects of data summarization according to certain embodiments, in which trace events alternate between many points and a single point.

The third example demonstrates why, depending on the requirements of the implementation, it is important to incorporate a sliding window to limit when reference-to-raw entries are generated in a file signal's summary stream. In a worst case, every other summary entry could be a reference to raw. For example, FIG. 45 shows an example in which trace events alternate between many points and a single point, such that a summary level would have entries that contain one or the other alternating pattern. With the reference-to-raw capability, this could be represented in a summary level (as is shown by 4500) where every other entry is a reference to raw. With the sliding window, however, the summarization engine would instead output the raw events directly into the summary level (4510), so that the rendering engine would not have to frequently seek to different places in the raw event stream.

Without the sliding window (4500), the rendering engine would need to perform many stream read operations, each requiring at least one file seek and read. At worst, the number of stream read operations required by the rendering engine to render a file signal would be the number of pixel-units of execution to render, times the scale factor, divided by 2. The reasons for this calculation are as follows: (1) The number of pixel-units of execution indicates how many data points the rendering engine needs to render. In a worst case, every pixel-unit of execution requires the rendering engine to read at least one entry because there is at least one trace event contained within the time span covered by each pixel-unit of execution. (2) As detailed in an example above, in a worst case, the number of entries that must be read equals the scale factor times the number of pixel-units of execution because the time span that a pixel-unit of execution represents is very slightly smaller than the size of the nearest summary level. (3) In a worst case (and in this example), every other entry is a reference to raw, so half of the entries read from the summary level require a stream read to render the pixels included in the pixel-unit of execution they represent.

Given this example, if a hard disk drive were used for storage, the performance would be very poor, as 100 disk seeks typically take around 1 second. Thus, in a worst case, rendering a single display signal that maps to a single file signal, on a display 2,000 pixels wide, with a scale factor of 8 would require 8,000 stream reads, which would take around 80 seconds if each stream read required 1 disk seek. This wouldn't satisfy the objective of rendering each display signal many times per second, with many different display signals on the screen at the same time. Even for a solid-state disk or another file storage medium with fast seeks, performing a large number of seeks is moderately expensive. Caching of the raw data helps somewhat, but when the data set becomes larger than the available memory for caching, rendering performance will still suffer.

The fourth example illustrates another case in which references to raw data are important for keeping the size of the output file—in particular the amount of data used by the summaries—small relative to the raw input data.

Figure 46:
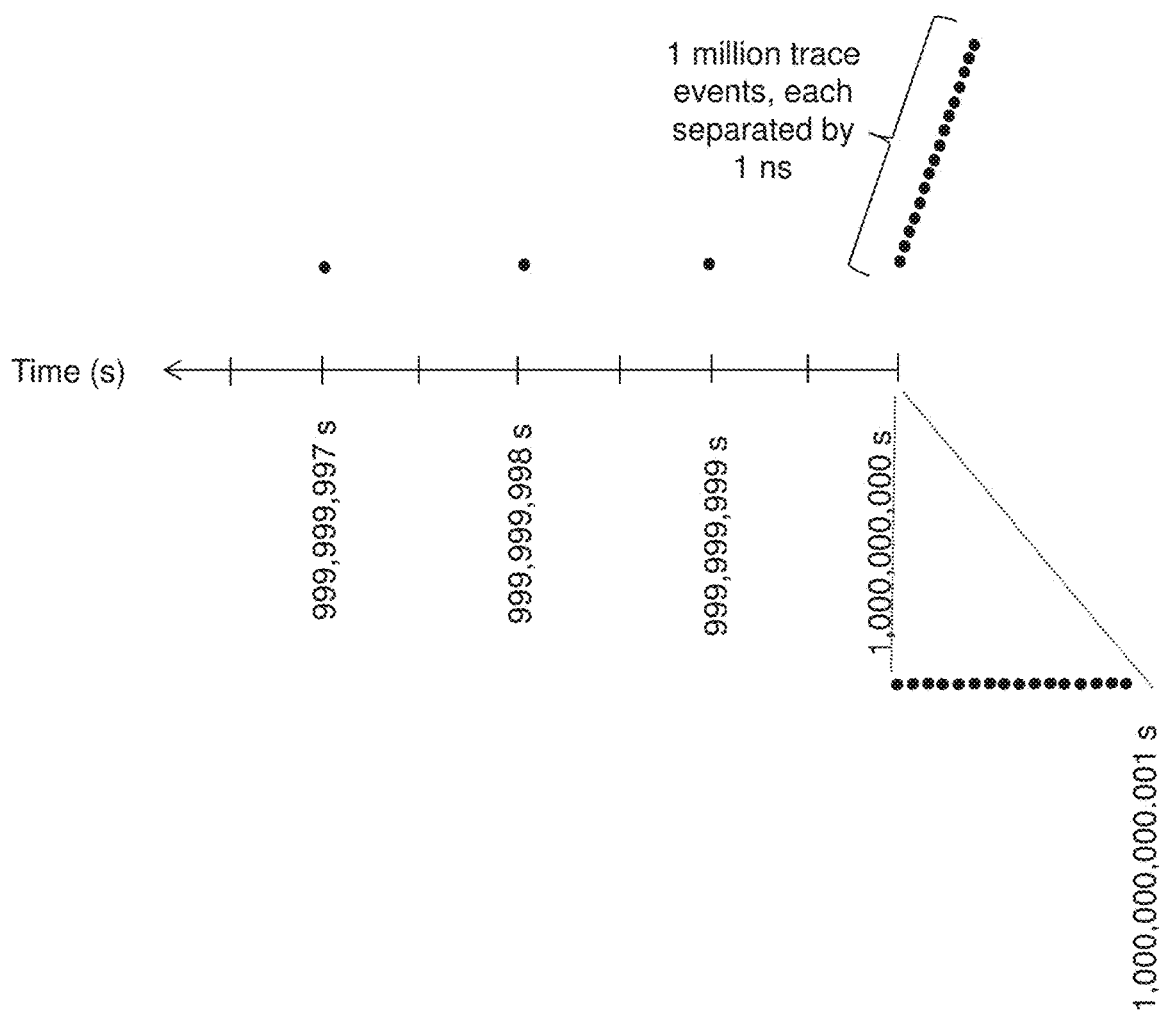
FIG. 46 depicts aspects of data summarization according to certain embodiments, in which one billion points are separated by one second each, and at the very end of the data, one million points are separated by one nanosecond each.

In FIG. 46, 1 billion trace events are separated by 1 second each. At the end of the data, 1 million trace events are separated by 1 nanosecond each. The scale factor is 10, the window size is 1,000 buckets, and the number of trace events required in the widow to write out a summary is 10,000. The finest representable time is 1 nanosecond.

The last 1 million trace events separated by 1 nanosecond each result in the creation of summary levels from 10 nanoseconds through 10 seconds. Other summary levels beyond this are created to summarize 1 trace event per second. However, without references in summary data, the 1 billion trace events separated by 1 second each would also be summarized every 10 nanoseconds, 100 nanoseconds, and so on. This would grow the amount of data output by a factor of 10, meaning that approximately 9 billion summary entries would be created for 1 billion input trace events.

With references to raw data, however, the 10-nanosecond through 10-second summary levels would each result in a reference to raw data after creating summary entries for the first 1 million trace events. No additional data would be written for those summary levels.

Summarization Engine Guarantees in Certain Embodiments

Thus, the conversion algorithm in certain embodiments provides at least the following three important guarantees:
1. The number of summary entries in the output is bounded by a fraction of the number of trace data events input.
2. For any given time span the rendering engine wishes to render, the number of entries in the file that need to be read is bounded by a small multiple of the number of pixel-units of execution to display, where the number of pixels to display is proportional to the window size.
3. For any given time span the rendering engine wishes to render, the number of stream reads and the number of seeks required is bounded by a fraction of the number of pixel-units of execution to display.

Searching Through Large Volumes of Data

Searching through trace data is an important capability of the visualization tool in certain embodiments. To complete these searches quickly when dealing with terabytes of information, for example, the tool uses a number of approaches to reduce the amount of data that must be scanned to complete the search request.

Figure 47:
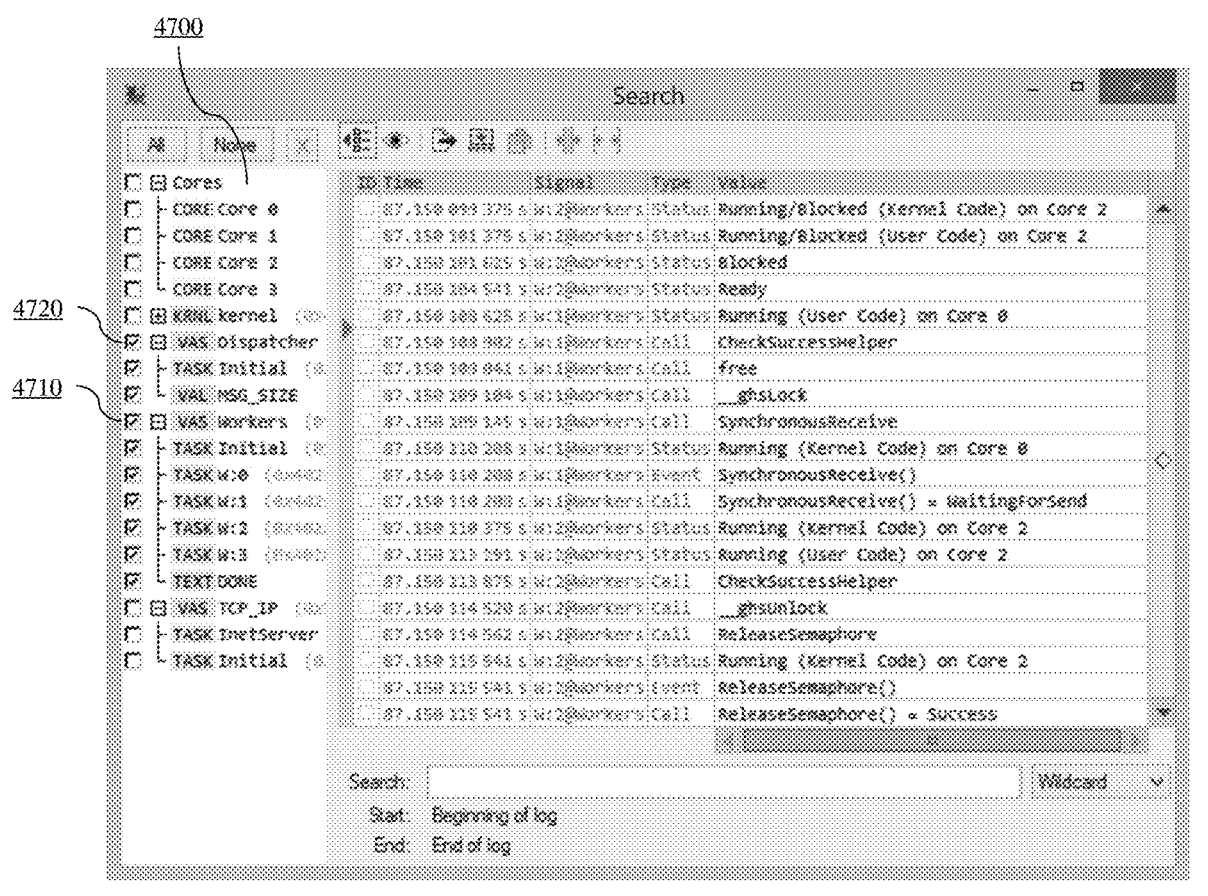

Certain embodiments can reduce the search space by providing the user with methods of searching a subset of display signals, called the "search scope." For example, in FIG. 47, the search scope (4700) only includes information about the Dispatcher (4720) and Workers (4710) processes. By searching only those display signals that are of specific interest to the user, certain embodiments are able to ignore the data associated with excluded display signals. This improves cache performance and minimizes the seeks required to read data.

Figure 48:
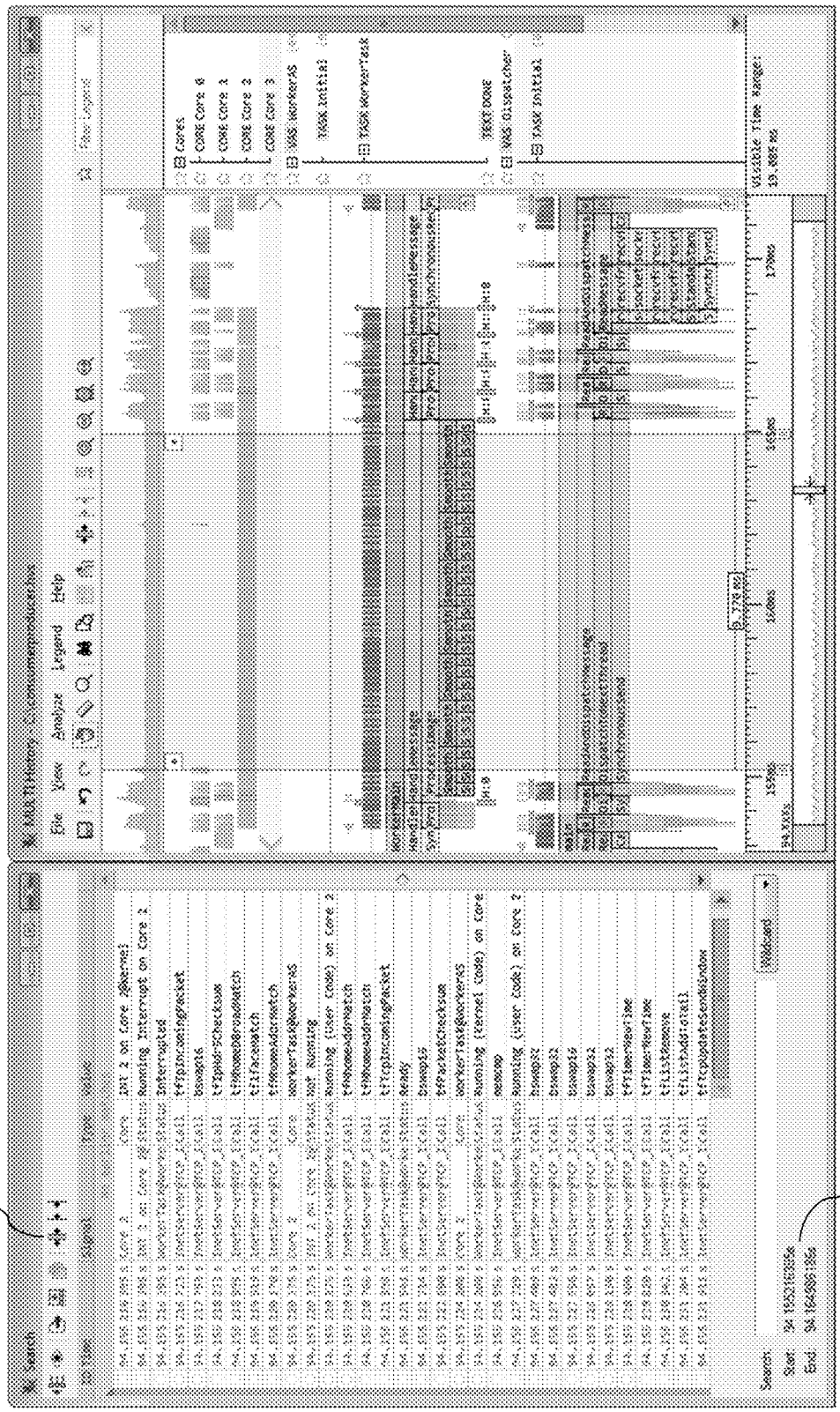

Certain embodiments can reduce the search space by providing the user with methods of searching a subset of the total time represented in the file. For example, in FIG. 48, the user has made a selection of time (4810) that they are interested in searching within. By clicking the button 4800, they are able to limit the search results to just those contained within that time range (4820). In certain embodiments, each file signal is stored sorted by time, which allows the search engine to easily ignore all data outside the selected range, without having to process it in any way.

Figure 49:
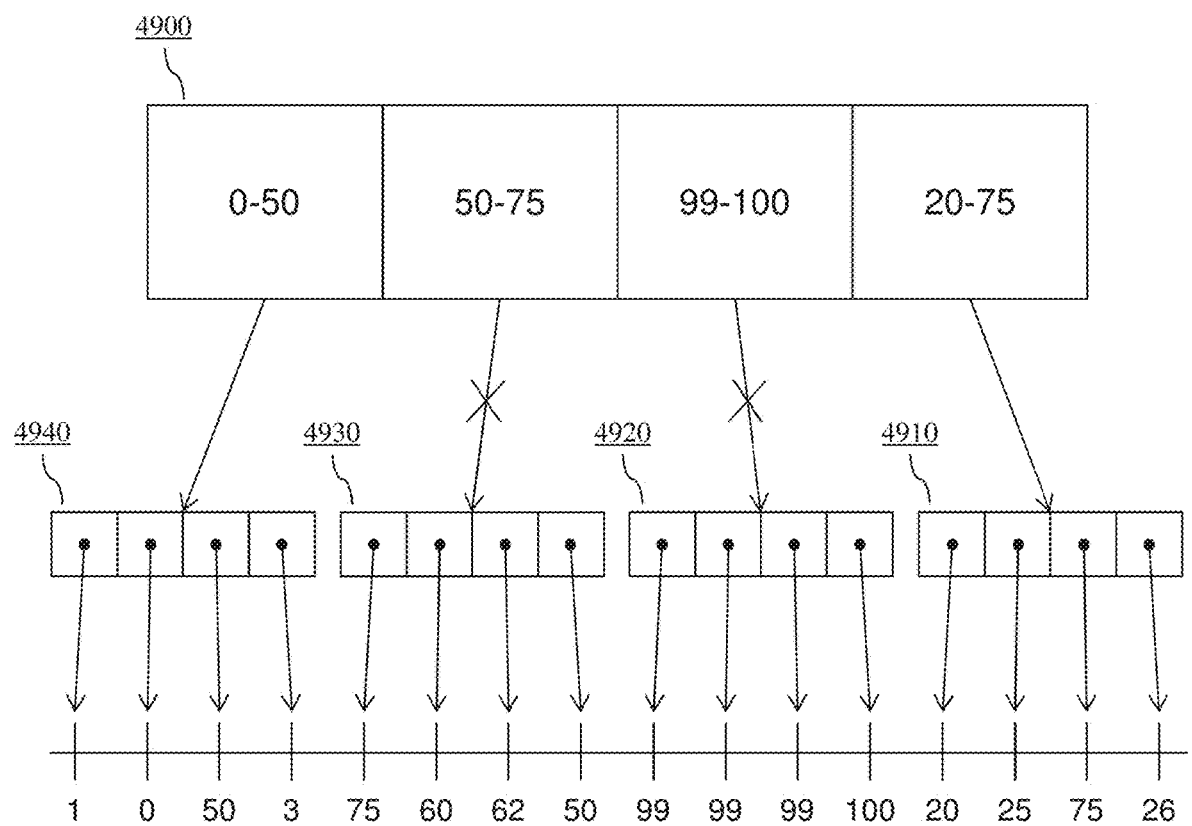
FIGS. 49 and 50 are exemplary high-level diagrams depicting techniques for reducing the number of events searched in certain embodiments of the present invention.

Certain embodiments reduce the number of events searched by pruning portions of the B+ trees that are used to store trace events. As is discussed elsewhere, certain embodiments store summarized data in B+ trees, and they give summarized groups of events signatures, which encode basic information about the types of events contained in the summarized region. Each non-leaf node in a B+ tree stores a list of pointers to sub-nodes. For each pointer to a node, certain embodiments also store a representation of the summary signature for all the data within that node. For example, the signature for a file signal representing integer values is a range of the minimum and maximum values of all the events in that file signal. By storing the signature of all events in each B+ tree node, the search engine can determine whether the value it is searching for is outside the bounds of the signature for a node. If it is outside the bounds, the search engine can ignore (or prune) the node and all its children. For example, in FIG. 49, the root node (4900) has pointers to 4 sub-nodes. Those nodes have signatures of 0-50 (4940), 50-75 (4930), 99-100 (4920), and 20-75 (4910). If the user searches for the value 25, the search engine ignores nodes 4930 and 4920, and all the data they point to, because it knows from their signatures that the data contained in those parts of the tree cannot contain the value the user is looking for. The same concept can be applied to signatures of other types, such as strings. As is documented elsewhere, for certain embodiments raw string events are stored as a pointer into a string table. The actual string is stored in the string table. A signature is generated from a single bit hash of the string itself, or the index of the string in the string table, depending on the requirements of the embodiment. When searching for a string, the single bit hash of the string to be searched is generated. The B+ tree nodes contain the summarized signatures of all entries within their nodes, which allows for the pruning of the B+ tree nodes and, therefore, the raw events that are to be scanned.

In certain embodiments, the signatures generated for pruning the search space are a different size than those stored in the summary file streams. This is because summary entries typically have a relatively small signature size. For example, certain embodiments use 64 bits. However, 64 bits is not enough to significantly reduce the search space through pruning. Instead, a much larger B+ tree node signature can be used. For example, certain embodiments use 1024 bits. This reduces the chance that a value being searched will have the same signature hash as other values that are not being searched. These larger signatures for B+ tree node entries do not significantly increase the size of the output file because there are relatively few B+ tree nodes compared to raw or summary entries in the file.

Figure 50:
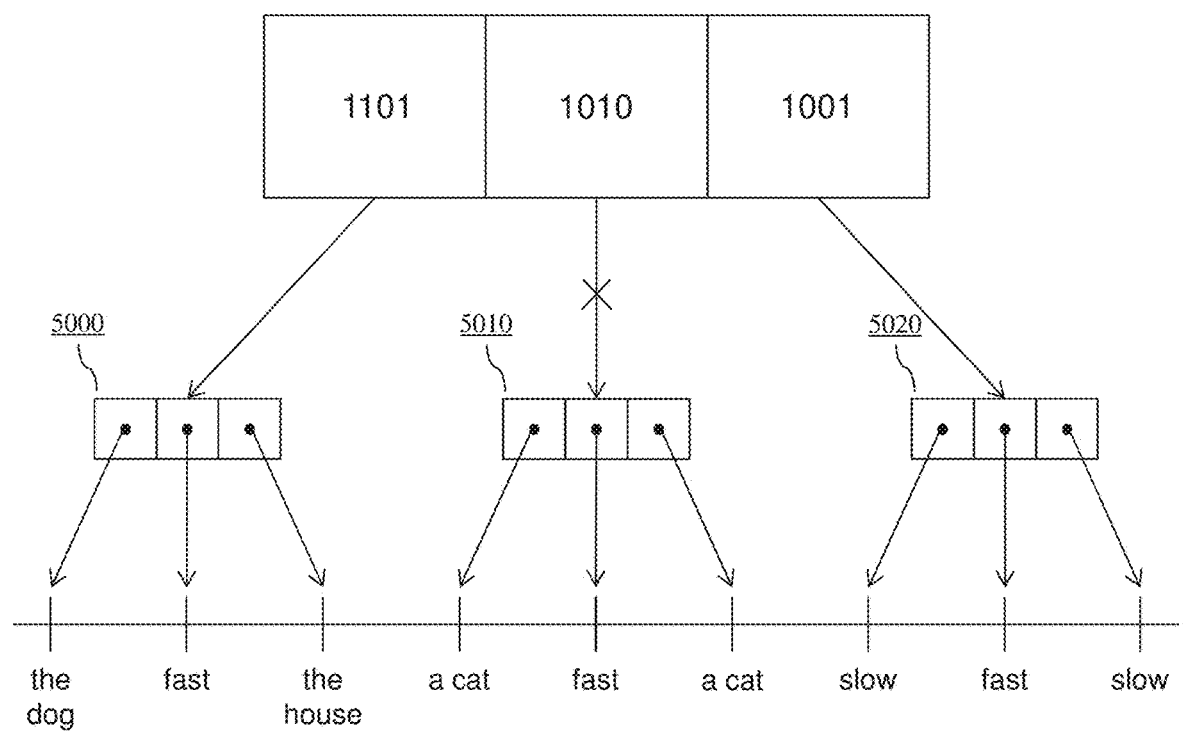

This search pruning approach can also be applied when looking for all matches to a specific search. For example, in FIG. 50, the user is searching for all strings containing the string "the." The string table that was generated during the summarization of the file contains 5 different strings: "the house," "a cat," "the dog," "fast," and "slow." Each string is given a power-of-2 hash, such that the binary representation of each hash has a single bit set. The summary signature is a bitwise OR of the hashes for each string contained within that summary node. This signature can act as a bitmask to determine in constant time whether a given string is not contained within the summary. For example, in FIG. 50, the search terms that match the query are "the house" and "the dog," meaning that any summary node that contains a matching result must have the 1 bit or the 4 bit set. Because the middle summary node (5010) only has the 2 bit and the 8 bit set, the search can ignore all the events in this branch. Branches that do have one or more of the searched-for bits set may or may not contain matching search results. The left summary node (5000) contains several search matches, while the right summary node (5020) contains none. This may occur if a string that matches the search term shares a hash with a string that does not, as with "slow" and "the house."

Figure 52:
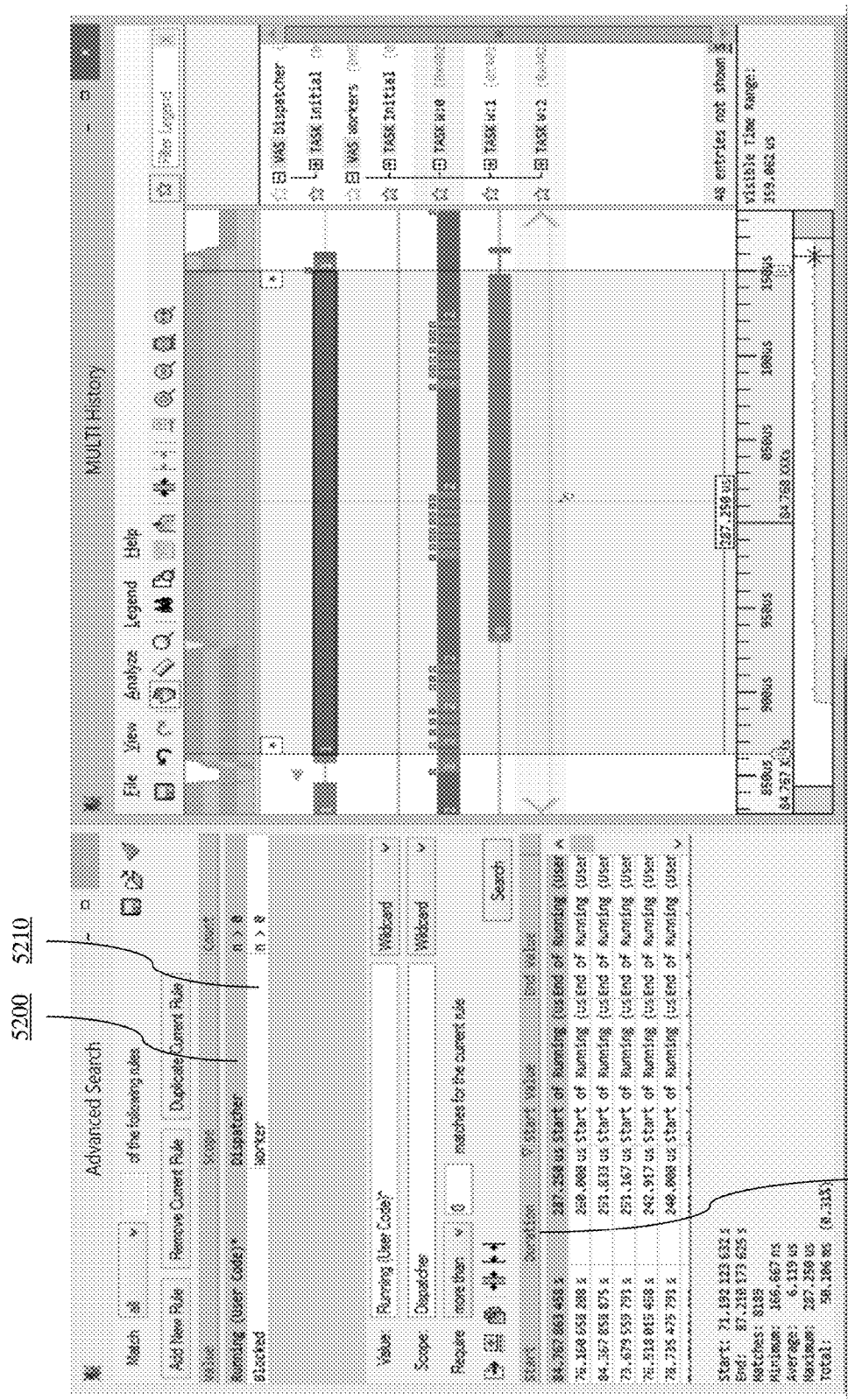
Figure 53:
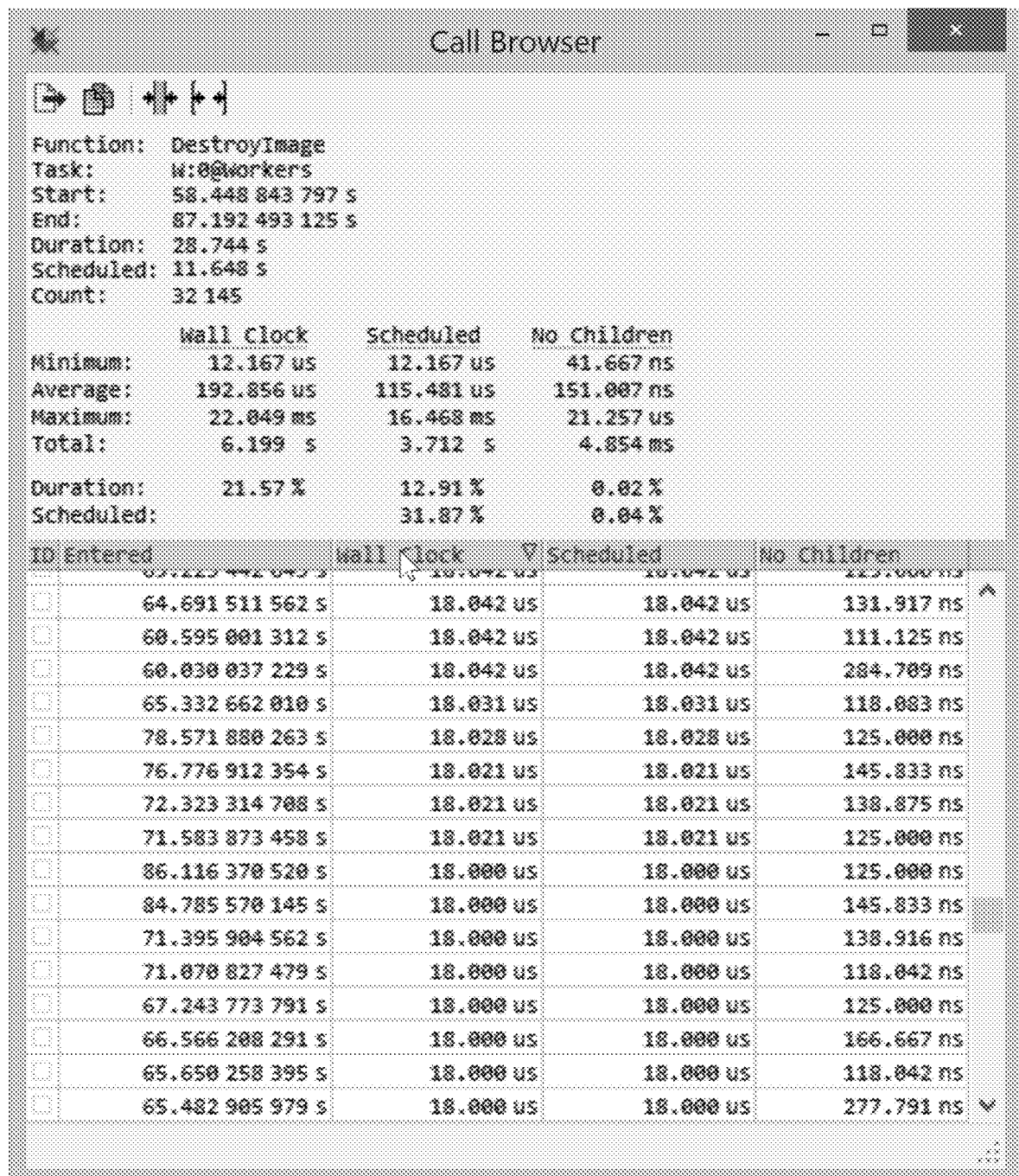
FIG. 53 depicts a function call display relating to trace data visualization according to certain embodiments of the present invention.

In certain embodiments, multiple types of searching may be provided. For example:

1. Simple text searches that look for matches to text strings, as displayed in FIG. 51, which shows a string (5100) in the "Search" text field.
2. Advanced searches where multiple text searches can be used to find ranges in time where specific states are true, as in FIG. 52. This figure shows all the time ranges where any thread in the Dispatcher process is running user code (5200) while any of the threads in the Worker process are blocked (5210), sorted by duration (5220).
3. Browsing of specific functions, as displayed in FIG. 53. This allows searching for every instance of a specific function, and it makes it easy to see which calls were the longest, which calls were the shortest, how many calls there were, how long they took, and other information, such as which functions were actually executing for the longest periods of time.

It is useful to show the results of a search as a list of entries that match the search. Showing statistics about the search results, such as the total number of matches, is also useful. In addition, for events that occurred over a period of time, statistics such as the total time during which the matches occurred, and the minimum, maximum, and average time, can also be generated.

Figure 54:
FIGS. 54 and 55 depict search result display signal user interfaces relating to trace data visualization according to certain embodiments of the present invention.
Figure 55:

However, some information that a user may want to glean from the data is not easily seen from a listing of search results. For example, the search results do not readily show whether there are points in time when there are many search results, and other points in time when there are none. To visualize this information in certain embodiments, these different types of searches support displaying their results as a new display signal in the graph pane. FIG. 54 shows an example in which calls to SynchronousSend are displayed as a new display signal. Search results are represented in the graph pane by fixed-width rectangles. The value of the search result is shown to the right of the rectangle if there is space for it. Search results from the Advanced Search window may be represented by fixed-width rectangles (indicating results associated with points in time) or rectangles whose width changes as the display is zoomed in (indicating results associated with ranges of time), as shown in FIG. 55.

Additional Applications for Visualization, Including Units Beyond Time

The summarization and visualization approaches above have primarily discussed looking at trace events which are time-stamped, and viewed on a time axis. The same visualization approaches also apply when the trace events are associated with other units, such as: CPU cycles, cache hits or misses, network packets sent/received, system calls made, number of device transactions, memory usage, or any other unit of measure describing an aspect of a program which is of interest in the development of a software program. Depending on the requirements of the implementation, this can be particularly interesting when associated with a call stack graph. This is particularly useful because the call stack graph is a very powerful tool at showing a software developer context that they can easily understand (the names of the functions in their program), and how the unit of execution relates to that context. For instance, there are a number of debugging approaches known in the art related to cache analysis. Generally these approaches are able to identify certain "hot spots" in the code where there are large numbers of cache misses. This is useful to help optimize certain types of cache performance by carefully structuring the code around those hot spots. However, information about specific areas of functions which have lots of cache misses does not reveal the context in which those functions are called. Sometimes this not necessary, but there are times where that additional context is very useful. For instance, in one application which was analyzed memcpy was seen to be a hot spot of cache miss activity. Initially the developers of the application believed that this implied that memcpy was not implemented well, and the company which developed the memcpy library function needed to improve it. However, by viewing the call stack graph around the points at which memcpy was generating a lot of cache misses it was trivial to tell that the application could be easily modified such that it did not need to call memcpy at all.

As an example, certain embodiments use the summarization and visualization approaches discussed elsewhere to show the number of cache misses associated with the call stack at the time of each cache miss. By tracking the number of cache misses in every function, and displaying the call stack graph with an axis of cache misses (such that one cache miss is equivalent to one unit in the axis of the display where previously it was discussed as being an axis of time), functions (and groups of functions) that appear larger in the display have a corresponding larger number of cache misses. This helps to quickly identify the regions of code which contain the largest number of cache misses, and the surrounding context which helps show why those regions of code were executing.

Depending on the requirements of each particular implementation, the underlying data necessary to generate this information could be a log of function entries and exits, along with a log of the changes in the unit of measure during each function. Alternatively, an implementation may comprise capturing the call stack at each change of the unit of measure. Yet another implementation may, for each unique function call chain which the program executes, maintain a data structure for tracking the changes in the unit of measure. The approach can also work when sampling data. For instance, certain embodiments sample cache misses every context switch, and/or output a trace event every time a some number of cache misses have been detected (an alternate implementation might sample cache misses on a timer). Such an embodiment could then display a call stack graph with an axis of cache misses by assuming that each function executed attributed roughly the same number of cache misses for a given sample. The end result of this would be to show an approximation of cache misses per function, to help a programmer narrow down the areas which cause the most misses. Certain embodiments could further improve this approach in a number of ways. For instance, the target could generate the trace events about numbers of cache misses as detailed above. Information about all instructions executed could be captured by a hardware trace device such as the Green Hills SuperTrace Probe. This instruction information could then be used to modify the cache miss attribution approach such that only instructions which could cause a cache miss (such as cacheable read and write instructions) are counted. Thus areas of the code which only modified program flow or read/wrote registers would not be included. This would result in a much more accurate approximation of the areas of the program which were triggering cache misses. A further optimization could be done where the instruction data from the hardware trace device (potentially including data trace information if the target supported that) was put into a simulation of the cache model of the target CPU architecture to determine which reads/writes likely did not trigger a cache miss, and thus the exact (or much closer approximation) instruction to attribute the cache misses to could be determined. Skilled artisans will readily be able to implement additional embodiments, depending on the particular requirements of each implementation.

Depending on the requirements of each particular implementation, certain embodiments may perform further processing on the data to generate additional visualizations or other useful information. For instance, certain embodiments may visualize the memory state of a program at some point in its execution to show function call stack graphs whose unit of execution axis is the amount of memory allocated at each function in the graph which is still allocated at the time the trace events were collected.

In certain embodiments, users may visualize data in terms of the memory allocations that occurred in each unique path function call path. Such embodiments may facilitate depiction of possible memory waste from earlier in the program run.

Depending on the requirements of each particular implementation, additional processing may involve combining the units of each of the equivalent function call stacks. In an embodiment that tracks memory allocation within each function call, this would result in a call stack graph where the total number of bytes allocated within all of the equivalent function call sequences is added together.

By combining these approaches, certain embodiments may, for instance, visualize the amount of memory which is still allocated in the system, sized according to which function call sequence is responsible for the largest memory usage. This provides an application developer a quick visual indication of which function call sequences they should focus on if they are attempting to reduce the amount of memory allocated in the system.

Additional Applications for Visualization

Figure 30B:
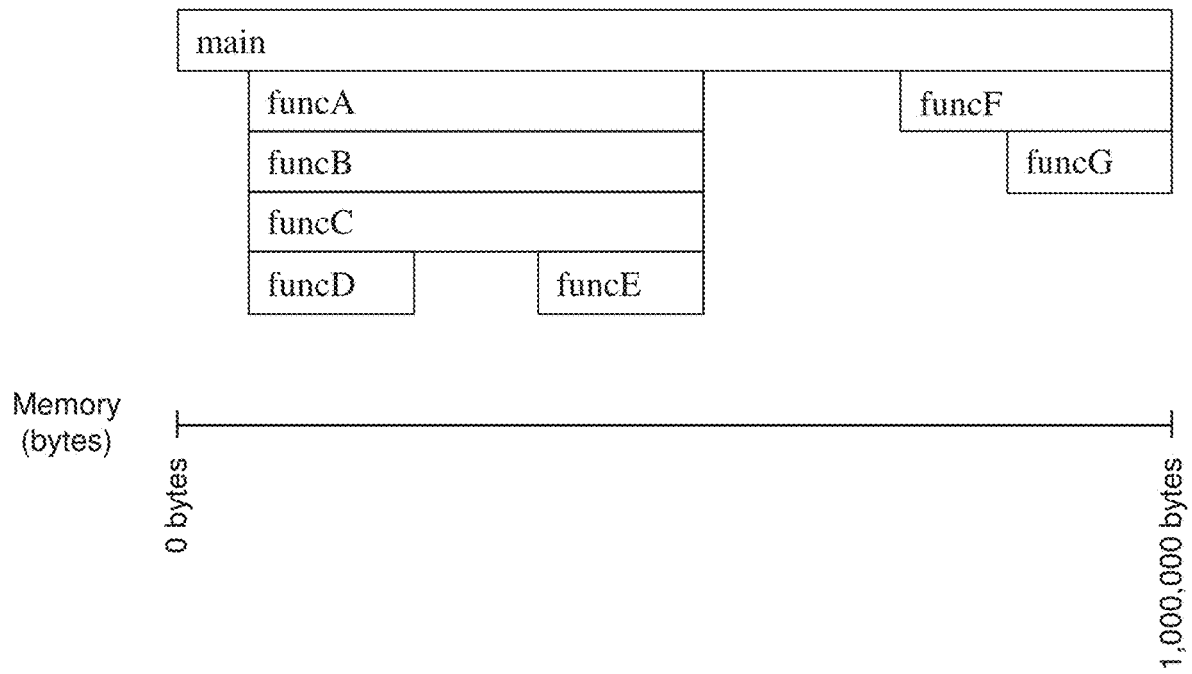
FIG. 30B is an exemplary diagram depicting aspects of data summarization according to certain embodiments of the present invention.

In certain embodiments discussed herein, summarization is described as being performed on time-based data. That is, summarization according to such embodiments is performed on data that varies as a function of time. In general, however, summarization may be performed on data whose domain is not time-based. For example, summarization may be applied to trace event data collected on memory allocations, whose domain is the size of the memory allocations. Further, for example, such data may include every instance of an execution of a function in a computer program along with the amount of memory used by that instance of execution of that function. Summarization would then process that data over a domain based on memory usage instead of time. The output of such summarization can then be used for a call stack graph whose unit of execution is memory usage, where the length of each instance of an execution of a function in the call stack is proportional to its memory usage. The call stack graph over memory usage would display each instance of an execution of a function in the order in which the memory allocation occurred. This helps a developer quickly find the source of excessive memory usage. For example, see FIG. 30B.

Similarly, any other suitable domain may be used for summarization in certain embodiments, depending on the requirements of each particular implementation. These may include, without limitation, CPU cycles, cache hits and misses, kernel resource usage, application resource usage, system calls made, device resource usage, I/O bandwidth (e.g., disk seeks, disk reads, disk writes), network usage (such as packets or bytes sent or received), stack usage, sensor data (e.g., temperature, power usage, current, voltage), battery usage, hardware system component usage (e.g., ALU/FPU/GPU usage, co-processor usage, bus access, etc., either in absolute terms or relative to other such components), hardware performance counters, and/or any other suitable unit of measure describing an aspect of a program which is of interest in the development of a software program.

As another example, certain embodiments may use the summarization and visualization approaches discussed elsewhere to show the number of cache misses associated with a call stack at the time of the cache miss. By tracking the number of cache misses in every function, and displaying the call stack graph such that one cache miss is equivalent to one unit in the axis of the display (which previously was discussed as showing time), functions (and groups of functions) that appear larger in the display have a corresponding larger number of cache misses. This helps to quickly identify the regions of code which contain the largest number of cache misses, which can degrade the performance of the computer program.

Depending on the requirements of each particular implementation, certain embodiments may perform further processing on the data. For instance, certain embodiments may visualize the memory state of a program at some point in its execution to show function call stack graphs whose size is determined by the amount of memory allocated by that function call stack which is still allocated. This display depicts possible memory waste from earlier in the program run.

Depending on the requirements of each particular implementation, additional processing may involve combining the units of each of the equivalent function call stacks. In an embodiment that tracks memory allocation within each function call, this results in a view of the total number of bytes allocated within all of the equivalent function call sequences.

Depending on the requirements of each particular implementation, the underlying data necessary to generate this trace event data may comprise, without limitation: (1) a log of function entries and exits, along with a list of the changes in the unit of measure (e.g., bytes, cache misses, etc.) during each function; (2) capturing the call stack at each change of the unit of measure; and/or (3) for each unique function call chain which the program executes, keeping a data structure tracking the changes in the unit of measure.

Saving and Loading Debug Session Information

Certain embodiments are able to save all, or part, of the information related to a debugging session—creating what will be called a debug snapshot—for loading back at a later time and/or place. The debugging session includes information about the execution environment of the program being debugged ("target") and the state of the debugger itself. A debug snapshot will always save at least part of the state of the target along with (if present) bookmarks and any notes associated with those bookmarks.

Bookmarks are points of interest marked by a software developer during a debugging session, and notes may be attached to those bookmarks. Bookmarks can be, without limitation, associated with a particular point, points, or ranges in time in the timeline of the program's execution, or a specific line, range of lines, or files that are part of the program. In general, bookmarks can be used to annotate any display of debugging information, or state of the target in the debugging session. For example, bookmarks may be attached to particular line of source code or a particular point in time in the displays of trace event data described in this document and a programmer may add notes to those bookmarks about the roles of those lines of source code in the failure being investigated for a particular debugging session. When a debug snapshot is loaded, these bookmarks and notes appear in the same positions as they did when the debug snapshot was saved. Bookmarks may also be associated with specific Other aspects of a debugging session may be saved and restored, including breakpoints, informational and interaction windows (e.g., variable view windows, register windows, memory view windows, search windows), command-line windows and their history, view position histories, selection states of items in a list (e.g., highlighted items in a list), and search results. When these items are restored, they will appear substantially the same as when they were saved. Certain aspects of the restored debugging session may change without substantial effect.

For example, window sizes, window positions, color, fonts, and other graphical elements may be different upon restoration due to limitations of or differences in the computer system receiving and restoring the debug snapshot.

The debug snapshot may be saved to a file, uploaded to a server, or any other computer-readable media that can be read at a later time or different location.

The information saved by a debug snapshot includes, depending on the requirements of each particular implementation and without limitation:

(1) Target memory, potentially including all RAM and ROM, with virtual-to-physical mappings if appropriate;

(2) Target thread register state;

(3) Programs executing on the target;

(4) Programs loaded on the target;

(5) Debug information which includes symbolic information and debugging metadata of programs loaded and/or executing on the target;

(6) Trace events;

(7) State of all open windows, including their positions and contents;

(8) Any console output, command history, and view position history;

(9) Currently selected threads;

(10) Breakpoints (hardware and software);
(11) Variables being viewed;
(12) Search results;
(13) Bookmarks and notes on those bookmarks;
(14) Source code; and/or
(15) Any additional information that may be needed to reconstruct the debug session state.

The state of a target saved by a debug snapshot generally includes any information necessary to recreate the instance of the debugging session saved by the debug snapshot. Not all target state can be saved or is useful to a debugger, so the state of the target is not meant to include every physical aspect and state of a target.

By restoring a debugging session from this information, the developer is able to see the same "view" of the debugger and the same state of their target as when the snapshot was taken. This is useful in situations including, without limitation:

(1) Time shift debugging: A developer wishes to temporarily suspend work on their current task, and resume it later, without needing to maintain access to their target.

(2) Location shift debugging: A developer wishes to stop using a hardware resource so that it can be used for a different purpose, and/or they wish to move to a different location or computer to continue analysis of their problem.

(3) Developer shift debugging: A developer either believes that another developer should take responsibility for looking at a problem, or they wish to have another developer's help with a problem.

(4) Validation failure debugging: A developer and/or organization wishes to allow a test system that has encountered a failure to continue running validations without losing information important to tracking down the failure. This allows optimal use of target hardware.

To ease the sharing of information, two developers who have the same debug snapshot can save and load small files that contain only a "view" of the debugging session information (window position, bookmark notes, etc.). While the complete debug snapshot may be large, the view information is small and can easily be shared via email or another file transfer mechanism.

Reverse Decompression

The amount of trace data many computer systems generate can often make it time consuming to analyze and display in a useful fashion to a software developer. For this reason, certain embodiments may combine two approaches described herein to allow the software developer to view the most relevant information in the trace quickly, in many cases without having to wait for the whole trace to be analyzed.

The two combinable approaches according to certain embodiments are:

(1) Analyze (including approaches that use summarizing) the trace data starting at the end of the trace, and progress backwards; and (2) View the partially analyzed (and/or summarized) trace data while the remaining trace data continues to be analyzed.

This combined technique has two benefits:

(1) The software developer can immediately start looking at his or her trace data. In many cases, a common pattern can be discerned which indicates the source of a problem regardless of which portion of trace data is inspected.

(2) Often, the cause of a problem occurs shortly before the problem itself. When the trace ends with the problem (or the problem is near to the end), then analyzing the trace backwards means that the cause of the problem will be visible to the software developer long before the entire trace is analyzed.

Call Stack Graph Resizing

Call stacks can often be very deep, sometimes including thousands of entries. When rendered into a display showing a call stack graph over some unit of execution (such as time, cycles, cache misses, etc. as discussed elsewhere herein—this may be referred to as the "axis" used to display summarized data), very deep call stacks are difficult to see because they take up so much space. For instance, certain embodiments print the name of the function at each level of the call stack, for each function instance. Because only a finite number of function names can fit on a screen at a time and still be readable, it is not possible to see the entire call stack graph at once. It is possible to scroll the display to see a part of the whole call stack graph, but that makes it difficult to see certain types of patterns that are of interest to the programmer in some instances. This is even more of a problem when attempting to view the call stack graphs of multiple threads at the same time. With a view that allows zooming and panning around the call stack graph, this problem becomes even worse, as at some points in the unit of execution the call stack will be very shallow, at other times very deep, and how long those depths continue varies based on the range of the unit of execution currently being viewed.

Some implementations will view call stacks graphs vertically, with each new level of call stack appearing below the previous level. However, implementations that view this flipped (call stack levels appear above the previous level), or horizontally such that deeper levels appear either to the left or right of the previous one, are also possible and advantageous in certain embodiments.

To solve the issue related to displaying very deep call stacks in a call stack graph, mechanisms can be put in place to resize the call stack graph to use less space on a display. There are four aspects to resizing a call stack graph in accordance with certain embodiments:

(1) Methods to control how much space is used to display a call stack graph;

(2) Methods to determine how to display a call stack graph when the space reserved for the call stack graph is not sufficient to fully display the entire call stack graph;

(3) Methods to determine which call stack graph entries to collapse in order to continue to view the most interesting call stack information; and (4) Methods to determine how to display a call stack graph which has been collapsed.

When this document refers to a portion of a call stack graph being "currently visible," it refers to the portion of call stack graph that occurred over the course of a given range of the unit of execution that is being displayed by the display engine. Importantly, the maximum depth of a call stack graph may differ based on the range of the unit of execution currently being viewed. Certain embodiments change the currently visible portion through means such as panning and zooming.

What is needed is an approach to control how much space is used to display a call stack graph, and a method to control how to display a call stack graph when a given implementation does not have enough space available to fully display the entire call stack graph.

When discussed below, "viewing device" entails any device for viewing information, whether a monitor, printed paper, tablet, phone, goggles or glasses with built-in displays, etcetera.

When discussed below, "call stack entry" refers to a specific function call instance shown in a call stack graph. For instance, in FIG. 30B "funcE" would be an example of a call stack entry. Another example in FIG. 22 is "StartTile," which is an entry in the portion of the call stack graph referred to by 2230.

Methods to control how much space is used to display a call stack graph may include, but are not limited to:

(a) The user manually setting the size. For example, they might click and drag a button which sets the size of the call stack graph display (for example, FIG. 3, button 330);

(b) Setting the size to allow for the deepest call stack which is currently visible (this means that the deepest call stack at any point in the currently visible range is used to determine the size);

(c) Setting the size to be relative to the amount of space available on the viewing device. For instance:
  (i) Setting the size to the entire space available on the viewing device, so the user does not have to scroll to see more of the call stack graph; and
  (ii) Setting the size to a fraction of the space available on the viewing device, where the fraction is one over the number of call stack graphs being viewed at the same time. Certain embodiments can use this technique to display the call stack graphs for a user-selected number of different threads on the same display, at the same time.

These approaches can be applied, independently or in combination, whenever the currently visible range changes, or upon user request.

Methods of determining how to display a call stack graph when the space reserved for the call stack graph is not sufficient to fully display the entire call stack graph include, but are not limited to:

(a) Collapsing the call stack levels that are determined to be least interesting until the call stack graph fits in the available space. With this approach, the methods for determining which call stack entries to collapse use the entire visible range. For instance, given a currently visible range where a single function call spans each of the shallowest five levels of the call stack, then those five levels could each be collapsed.

(b) For each portion of the call stack graph that does not fit within the available space, collapsing one or more of the call stack entries that are determined to be least interesting within said portion, until said portion fits in the available space. This will result in many call stack entries being collapsed where the call stack graph is very deep, while other portions of the call stack graph that are shallower and that fit on the screen are shown in their entirety. With this approach, the methods for determining which call stack entries to collapse use a subset of the visible range. In certain embodiments, the number of call stack entries collapsed is printed in place of the collapsed entries, to differentiate among portions of the visible range. Certain embodiments may also display other markers to indicate that adjacent call stack entries are not necessarily directly comparable as they represent different depths.

Note that "collapse a call stack entry" means to shrink the size of an entry in the call stack graph in some way. So for instance, in FIG. 30B, it would be possible to collapse main, or funcD and funcE, or funcB (or any other combination, but these are representative of some specific examples that may be relevant to certain embodiments).

Note that when the term "axis-pixel" is used here it is not a pixel-unit of execution, but the pixels along (in some embodiments a subset of) the axis of the depth of the call stack graph. For instance, in a call stack graph where deeper levels of the call stack are placed below shallower levels (the vertical axis is depth of the call stack graph), collapsing a shallower level down to a single pixel would cut all but one pixel from the vertical size of the shallower level, and move all deeper levels up by the vertical size of that call stack minus one pixel.

Methods of determining which call stack entries to collapse in order to continue to view the most interesting call stack graph information include, but are not limited to:

(a) Collapsing a call stack entry when there is a single function call that spans the relevant visible range;

(b) Collapsing a group of call stack entries if all function calls in those entries have a duration of less than one pixel-unit of execution in the relevant visible range;

(c) Collapsing call stack entries if all function calls they represent have no source code associated with them;

(d) Collapsing call stack entries if all function calls they represent are not of interest to the developer (for instance, because they are system or third-party libraries, or are not code owned by the developer viewing the source code).

Methods of determining how to display a call stack graph which has been collapsed include, but are not limited to:

(a) Shrinking a call stack entry to be contained within a single axis-pixel;

(b) Shrinking multiple adjacent call stack entries into a single axis-pixel;

(c) Shrinking a call stack entry to be a small number of axis-pixels in height so the call stack entry is still visually present even when there is not enough room to display information (other than what can be gleaned by color) about what the call stack entry represents; and (d) Shrinking a call stack entry by using a small font so that it is still possible to see what function it represents, but so that it uses less space than an uncollapsed call stack level.

Data Analysis Based on Summarization

Summarization is a process during which large amounts of trace data are analyzed and converted into a form that can be quickly displayed on a screen for visual analysis. Certain embodiments also use the summarized data for other types of analysis. These other types of analysis may include, but are not limited to, searching for patterns or for specific events, and generating statistics on properties of the events.

There are several key aspects to summarization in certain embodiments:

(a) Generating a plurality of summary entries from a received stream of time-stamped trace events.
  (i) As is shown in for instance FIG. 31C, FIG. 31D, and FIG. 35, trace events are received (as discussed elsewhere in this document, potentially after processing which in certain embodiments may do operations such as generating raw events, constructing trace event signatures), and summarized into sets of summary entries.
  (ii) As is discussed in detail elsewhere in this document, certain embodiments comprise a rendering engine to use these summary entries to quickly determine what to display on a display device without first needing to read information about all trace events which are contained within the region being displayed.

(b) Each of said summary entries is associated with one or more of a plurality of summary levels.
  (i) As is shown for instance in FIG. 31C, FIG. 35, summary entries which are constructed are assigned to a specific summary level.
  (ii) As is discussed in detail elsewhere in this document, certain embodiments comprise a rendering engine to determine the span of time (or other applicable unit of execution) which is covered by a pixel-unit of execution, and then read from the summary level which contains summary entries which have a span of less than or equal to said span of time.

(c) Each of said summary entries represents a plurality of said time-stamped trace events.
   (i) The summary entries are representations of a subset of all of the trace events.

Beyond these key parts to summarization in certain embodiments as described above, depending on the requirements of each implementation, certain embodiments may implement summarization with one or more of the following additional aspects:

(a) Summary entries are associated with a time range (or other unit of execution).
   (i) As is shown in FIG. 34 and FIG. 31D, summary entries may contain information about the unit of execution they are associated with. In certain embodiments a rendering engine uses this information to determine where on a screen to display a graphical representation of the summary entry, and to binary search by the unit of execution through a summary level for summary entries which should be displayed on a display device.

(b) Summary entries comprises a summary entry signature having a size, wherein each of said summary entry signatures is created by merging a set of trace event signatures for a set of said time-stamped trace events that are represented by each said summary entry.
   (i) As is shown in FIG. 34 and FIG. 31D, summary entries contain a summary entry signature which represents trace events. The construction of this summary event signature from trace event signatures is detailed elsewhere.

(c) Each trace event signature is generated from a corresponding time-stamped trace event using a single-bit hash.
   (i) Trace event signatures can be generated using many methods, depending on the requirements of the implementation. As an example, a single-bit hash can be created from the value of the trace event. This is particularly useful for trace events that represent data such as strings and function calls.

(d) The summary entry signature comprises a representation of trace events that occurred within the time range of the summary entry.
   (i) Depending on the requirements of each particular implementation, summary entry signatures are constructed from the trace event signatures of all trace events within the time range (or other unit of execution) which the summary entry is representing. Note that, as discussed elsewhere in this document, some trace events may be excluded because of a processing step which happens before summarization, see FIG. 31A, 3110.
   (ii) Depending on the requirements of their implementation, certain embodiments use a variety of representation approaches. These may include, but are not limited to, the number of events represented or the sum, multiple, average or other mathematical representations of the values or of the signatures of the underlying trace events. Additional examples of representation approaches are detailed elsewhere in this document.

(e) The summary entry signature comprises a representation of fewer than all of said time-stamped trace events that occurred within the time range (or other unit of execution) associated with said summary entry.
   (i) Depending on the requirements of the implementation summary entry signatures may not include certain trace events within the time range of the summary entry. For instance in certain embodiments a summary entry signature representing the minimum to maximum values of the trace events within its time range may exclude special values such as infinity or not a number. These special values may be considered abnormal and not interesting to display. Other embodiments may wish to only show abnormal values, and exclude all values from an acceptable normal range.

(f) The summary entry signature comprises a representation of trace events that occurred within the time range associated with said summary entry and one or more time-stamped trace events that did not occur within the time range (or other unit of execution) associated with said summary entry.
   (i) Depending on the requirements of the implementation summary entry signatures may include certain trace events outside of the time range associated with the summary entry. For instance in certain embodiments it may be desirable to make certain values stand out more than they otherwise would by including them into bordering summary entries. Other embodiments may wish to have certain trace events appear to "linger" in the signatures of ranges of summary entries, perhaps to indicate that a particularly noteworthy state is currently active.

(g) The size of a summary entry signature is independent from the number of trace events the summary entry represents.
   (i) Depending on the requirements of each implementation, certain embodiments will use a summary entry signature whose size is not determined by the number of trace events it represents. Depending on the requirements of their implementation, certain embodiments may also use different sizes for each summary entry.

(h) The size of each summary entry signature is fixed for each summary level.
   (i) Depending on the requirements of each implementation, certain embodiments will use a fixed-size summary entry signature for all summary entries in a given summary level. This fixed-size signature means that no matter how many trace events are represented by the summary entry, the summary entry will always be the same size. This allows certain embodiments to represent arbitrary numbers of trace events, potentially with multiple levels of summary entries, in a constrained amount of space that is at worst linear in size with the number of trace events, and at best is a logarithmic function.
   (ii) Note that depending on the requirements of each implementation, certain embodiments may use a different fixed size for different summarization streams and/or different summary levels for the same trace event stream. For instance, this allows a summary stream for textual data to use a different summary signature size than for numeric data. This also allows different summary levels to have summary entries which covers a larger range of time to have a larger summary signature, which allows it to represent more detailed information about what is likely to be a larger number of underlying trace events.

(i) The span of time span of each of the time ranges of the summary entries within a summary level is the same.
   (i) Depending on the requirements of each implementation, certain embodiments will use a fixed-size time span that each summary entry will represent. The summary entries may represent different ranges of time, but the time span of each range will be the same for all entries.

(ii) Note that depending on the requirements of each implementation, certain embodiments may use a different fixed-size time span for different summary streams and/or different summary levels for the same trace event stream.

(j) The ranges of time represented by each summary entry in a given summary level are non-overlapping.
  (i) Depending on the requirements of each implementation, certain embodiments will have summary entries represent non-overlapping ranges of time. Certain implementations have no requirement that summary entries are contiguous. This allows the implementation to store no data when there are ranges of time which contain no trace events.

(k) The span of time represented by summary entries in a given summary level is a multiple of an adjacent summary level.
  (i) Depending on the requirements of each implementation, certain embodiments will have a stream of trace events summarized into multiple summary levels. Each summary level will have summary entries which represent a specific span of time, and adjacent summary levels will have summary entries which represent spans of time which are a multiple of each other. For instance, summary level 1 could represent 1 second for each summary entry, summary level 2 (adjacent to summary levels 1 and 3) could represent 10 seconds for each summary entry, and summary level 3 (adjacent to summary level 2) could represent 100 seconds for each summary entry.
  (ii) Depending on the requirements of each implementation, certain embodiments may use different multiples for different summarized trace streams. For instance, the multiple for a trace stream containing strings could be 5, but the multiple for a trace stream containing integer values could be 10.

(l) The span of time represented by summary entries in a given summary level is a factor of 8 smaller than the next summary level.
  (i) Depending on the requirements of each implementation, certain embodiments will use a scale factor of 8 for the difference between each adjacent summary level.
  (ii) A scale factor of 8 has been experimentally determined to be a good trade-off given the following areas to be optimized for:
    (A) The number of summary levels generated: A larger scale factor will result in fewer summary levels, and thus use less storage space for summary levels.
    (B) The "distance" between summary levels: When the rendering engine switches from using one summary level to a finer summary level because the time span covered by each pixel-unit of execution decreases (say because of a very slight increase in zoom level when the previous display was using at or slightly above the summary entry time span for each pixel-unit of execution), then the number of summary entries which need to be read and resummarized (as discussed elsewhere) will be large for a large factor, or small for a small factor.
    (C) The computation required is easy as it is a power of 2: Computers tend to be able to do multiplication and division related to powers of 2 easily, such as with simple bit shifting. Many of the operations described elsewhere in this document require multiplication or division based on the scale factor chosen.

(m) Each summary entry signature is associated with a visually distinct graphical representation.
  (i) Depending on the requirements of their implementation, certain embodiments display a graphical visualization on a display device by translating a summary entry signature into something displayed on a screen. Approaches for translating signatures into visual representations are covered elsewhere in this document, but an important property is that any two signatures which represent different events are at least unlikely to look the same.
  (ii) For instance, depending on the requirements of their implementation, in certain embodiments if one summary entry represents trace events whose values range from 1 to 50, and another summary entry represents trace events whose values range from 25 to 75, then one signature representation would be the minimum and maximum value of trace events within its time range, and the graphical representation would be a data plot from the minimum to the maximum. Thus, these two representations would be visually distinct from each other for these example values.

(n) A first summary entry signature is distinct from a second summary entry signature.
  (i) It is ideal for two summary entry signature to be different from each other. This depends on the signature generation and merging algorithm chosen, which will depend on the requirements of the implementation.

(o) A first summary entry signature is distinct from a second summary entry signature if a first one or more time stamped trace events associated with the first summary entry signature is different from the second one or more time-stamped trace events associated with the second summary entry signature.
  (i) Ideally when two summary events represent trace events with different values then their summary event signatures are also different. This allows the graphical rendering of those summary event signatures to also be different. Constructing signature generating and merging algorithms to achieve this goal is discussed elsewhere in this document.

(p) The time-stamped trace events each first have a signature generated, and those signatures are merged to create the signature for the summary entry.
  (i) Depending on the requirements of each implementation, certain embodiments may merge the signatures of the trace events to generate the summary signature for the summary entry. Methods of merging signatures are covered elsewhere in this document.

The discussion of summarization herein is primarily in the context of displaying information according to a unit of time (often referred to as the "time axis"). This simplifies the explanation. However, units of execution other than time can be used, resulting in an axis with a unit other than time.

For instance, FIG. 2 shows an embodiment of a rendering engine for summarized data. Element 265 shows a "time axis," which shows the time correlation for each event shown in element 285, the "graph area." In this embodiment, each pixel-unit of execution across the time axis represents a range of time, and each pixel in the graph area represents a rendering of the trace events associated with a given signal vertically, and with a range of time as indicated by the time axis horizontally. Thus, when inspecting a particular point in the signal, the time when that point occurred can be determined by looking down at the same pixel horizontally on the time axis. Events to the left of that will be before that point in time, and events to the right will be after it.

This approach of displaying summarized trace data also applies to other units beyond time. Specifically, the stream of time-stamped trace events can instead be a received stream of trace events each associated with a unit of execution. Depending on the requirements of each implementation, certain embodiments may extract these other units of execution from time-stamped trace events. Other embodiments use trace events which do not have a timestamp. For instance, instead of a timestamp, trace events may have a cycle count or an instruction count. Certain embodiments can determine the unit of execution implicitly. For instance, if a trace event is generated with every instruction, then the instruction count can be determined without requiring the trace event itself to contain the instruction number.

The concepts of summarization can be applied to any unit which can be associated with execution. For instance:

(a) Time;
(b) Cycles, or other units related to the number of CPU clocks executed;
(c) Instructions executed;
(d) Cache misses, hits or other cache-related statistics;
(e) Memory allocated (malloc'ed in C/C++ terminology), freed, currently reserved, or currently free, or a change in memory allocated for a given call stack level;
(f) Graphics frames;
(g) Network packets;
(h) Distance traveled;
(i) Interrupts;
(j) Power consumed; or
(k) Voltage.

As an example, a call stack graph can be rendered with the unit of execution being time. This looks like FIG. 3, element 320, where the function entry and exit events are correlated with the point in time where they occurred. Alternatively, the call stack graph could be rendered with the unit of execution being power, where the function entry and exit events would be correlated with the amount of power consumed. Viewed in this way, it would be easy to determine the points in the program's execution when the most power was consumed. Some other examples of units of execution and their impact on a call stack graph:

(a) Unit of execution is memory allocated: This would display functions as taking up the size of the allocations performed within them.

(b) Unit of execution is change in memory: This would display functions as taking up the difference in memory allocated when they are exited as opposed to when they are entered. So, for instance, if a function is entered with 1024 bytes allocated, and the function allocates another 512 bytes, but frees 256 bytes before exiting, then the function would be shown as having a "duration" of 1280.

Representations such as the above unit of execution as a change in memory for a given call stack level are different from others such as time or power consumed because it is possible for them to be negative. Depending on the requirements of each implementation, this can be handled in a number of ways, not limited to:

(a) Showing negatives as 0 units of execution having passed;

(b) Showing negatives as the absolute value of the elapsed units of execution (so positive 100 units and negative 100 units would display in the same way). Depending on the requirements of each particular implementation, portions of the display can be altered. For example, these entries can be displayed in red.

(c) Subtracting the unit of execution from earlier entries. For instance, if the unit of execution were the change in memory for a given call stack level, and function A allocated 1024 bytes, and function B, which was called by A, allocated 256 bytes, but freed 1024 bytes, then function B would not be displayed, and function A would have a "size" of 256 bytes allocated.

(d) Subtracting the unit of execution from later entries;

(e) Subtracting the unit of execution from the location where it originated. For units of execution that can be attributed to other units of execution, the negative execution can be subtracted from the point where it was added. As an example, when using an execution unit of change in memory allocated, an allocation will be a positive change in memory usage, and a free will be a negative change in memory. The free is negative, and where it originated is the allocation point for the free. The end result of this approach when used to display a call stack graph with this unit of execution is to show the use of memory on the heap by where it was allocated on the stack. If this data is collected when a program exits, this shows the memory leaks in a program. If collected earlier, this shows which sections of the program are responsible for memory usage, and it shows the percentage of total memory usage (or the portion of memory usage captured by the event trace if it is not the entire duration of the program). For example, function A has 2 allocations in its function instance: one of 1024 bytes, and one of 512 bytes. Later, function B could free the 1024-byte allocation and not allocate any memory, and the 512-byte allocation from function A could never be freed. The result would be to display function A as having a size of 512 bytes, and not show function B at all. This approach works even when not all allocations are known because not all trace events are recorded. The "free's" which do not have a corresponding allocation in the trace stream can be ignored.

(i) To actually tie the free with the corresponding allocation point, certain embodiments search backwards through the trace events. When a "free" is encountered, the address of the freed memory is stored. When an allocation is encountered whose address is in the set of freed addresses, the allocation is removed from the freed addresses set, but is otherwise ignored. When an allocation is encountered whose address is not in the set of freed addresses, the allocation is used as the unit of execution.

These different units of execution are used as the "axis," which all data in the graph area are rendered relative to. Thus it is possible to have a "time axis," or a "power consumed axis," "graphics frames axis," etcetera.

The term "pixel-unit of execution" refers to the size in units of execution which a pixel along the axis of execution represents. For instance, see FIG. 2, where the axis is 265, in the unit of time, and the pixel column represented by the cursor at 275 covers a specific range of time. Note that there are often multiple pixels in the display which are included in a pixel-unit of execution, such as all of the vertical pixels making up the cursor 275. Depending on the requirements of the implementation the axis of the pixel-unit of execution could be horizontal (such as FIG. 2), or vertical. Elsewhere in this document, unless the specific example makes it explicit that it is not referring to a pixel-unit of execution, references to a single pixel of time (such as "more than one call or return per pixel") refer to a pixel-unit of execution. Depending on the requirements of each particular implementation, although what is described here refers to one pixel-unit of execution, skilled artisans could readily implement embodiments which are multiple pixels in size. This approach will also be considered as "one pixel-unit of execution."

Depending on the requirements of each implementation, it can be advantageous to assign trace events into one or more substreams, each of which is separately summarized, such as in FIG. 31A. In this case, summarization would entail:

(a) assigning the trace events in a received stream of trace events associated with a unit of execution into substreams; and for each substream:
  (i) creating a plurality of sets of summarized trace events from said substream;
  (ii) wherein each set of summarized trace events is associated with one of a plurality of summary levels and represents a plurality of summary entries; and
  (iii) wherein each summary entry is associated with a time range and comprises a signature which merges the trace event signatures for the events that are represented by that summary entry.

What this means is that each substream may be summarized separately, and the resulting summarized data can be used to display only a single substream, or a subset of the substreams.

Certain embodiments process each trace event in turn, where "processing" means assigning the trace event to one or more substreams and then summarizing the trace event in the relevant substream(s). In certain embodiments, before summarization, each trace event in a stream of time-stamped trace events is assigned to one or more substreams, and then each such substream is summarized. Certain other embodiments process groups of trace events in turn, where "processing" means assigning the group of trace events to one or more substreams and then summarizing the group of trace events in the relevant substream(s).

Distinctions used to assign trace event streams into substreams may include, but are not limited to:
(a) Type;
(b) Call stack level;
(c) Thread;
(d) Address space; or
(e) Core.

In addition, processing can occur before, during, or after assigning streams into substreams, or summarization. Depending on the requirements of each implementation, this processing can include, but is not limited to, converting from one unit of execution to another. As an example, some time-stamped trace events may contain information about function calls and returns, and different time-stamped trace events may contain information about memory allocations. A processing step can turn this data into function call and return information in the unit of execution of memory allocated.

Call Stack Summarization and Rendering

Certain embodiments summarize and render call stack and/or function entry/exit information by:

(a) Taking the trace event stream representing the call stacks that occur during a thread's execution (which in certain embodiments is a stream of function calls and returns) and splitting (and/or assigning) each level of the call stack into its own stream of trace events. Certain embodiments split (and/or assign) the call stack into levels by taking the first trace event as beginning at an arbitrary call stack level, and each call or return results, respectively, in incrementing or decrementing the call stack depth to which future call stack trace events will be attributed. Note that when doing this process backwards, the direction is the reverse of forwards, so a function call trace event should decrement the call stack level counter, and a function return trace event should increment the call stack level counter.

(b) Each per-call-stack-level trace event stream is then summarized.

(c) To render the call stack, the rendering engine takes each summarized call stack level and renders it to a screen, in the relative position of that call stack depth on the screen. For instance, if rendering a call stack with the shallowest level at the top, and deeper levels lower down on the screen, then certain embodiments render the shallowest level first, then the next deeper level immediately below that on the screen, and so on.

Note that when doing call stack graph resizing, the position that the call stack level will be rendered to may be adjusted, and even within a call stack level, different portions of the represented call stack may be rendered to different positions on the screen. See the section on call stack resizing, above, for more details.

Sometimes the trace events used to generate the call stack can have a discontinuity. This means that there is not enough information to determine how trace events representing call stack information relate to each other at the point of discontinuity. The discontinuity is somewhere between two given trace events, and depending on the requirements of the implementation may be an instant in time, or a range of time. There are many ways that this can happen, which include, but are not limited to:

(a) A longjmp, exception (for example, a C++ exception), or other change of control flow that eliminates arbitrary numbers of call stack depths which traditionally do not execute return code through each of the intervening call stack depths. The discontinuity is that an unknown number of call stack depths has been eliminated on the target, so when processing backwards it is not clear which call stack level the next trace event should be attributed to, other than that it is likely to be a deeper level. When processing forwards the same problem exists, but the next call stack level is likely to be shallower.

(b) Taking or returning from an interrupt, exception handler, OS scheduler, or other method of code execution which abandons the current thread context, and does not directly return back to that point (that same code, at potentially that same call stack depth, may be executed again, but it will need to execute the code before it to reach that point).

(c) The trace stream itself does not contain all function call/return information. For instance, this can happen if the trace event stream is missing some data (such as when a FIFO overflow caused by too much data being generated in a hardware trace system results in some data being dropped/lost).

These discontinuities make it difficult to determine which call stack level the trace stream should be attributed to: when summarizing forwards, it is not always possible to know how many levels of the call stack have been removed, and thus how many call stack levels shallower the next trace event should be attributed to. When summarizing backwards, it is not always possible to know how many levels of the call stack have been added, and thus how many call stack levels deeper the next trace event should be attributed to. Depending on the requirements of each implementation, certain embodiments may reconstruct the call stack at the point of the discontinuity (potentially before and/or after the discontinuity). This may mean determining the entire call stack at the point of the discontinuity, or it may mean reconstructing a portion of the call stack at the point of the discontinuity.

Certain embodiments employ one or some combination of the following approaches to solving this problem:

(a) The generation of the trace stream by execution of the computer system is modified to include the information necessary to reconstruct how many levels are added and/or removed at the discontinuity. For instance, at a discontinuity caused by a longjmp certain embodiments that process trace events backwards will modify the target to output trace events describing the call stack at the point immediately before the longjmp occurs. Other embodiments that process trace events forwards modify the target to output trace events describing the call stack at the point immediately after the longjmp occurs. Certain embodiments track the call stack depth by incrementing or decrementing a per-thread counter on function entry or exit. Another approach to solving this is to output the number of levels of call stack which the longjmp removed. Yet another approach is to add the call stack depth at various points during the execution of the thread.

(b) The number of call stack levels that are added and/or removed is determined statically for a given point in the code execution.
  (i) For instance, if an exception handler always removes all entries in the call stack, then when processing forwards and encountering this trace event, the call stack level can reset the level to the shallowest level.
  (ii) As another example, if a given exception handler is always called at a known depth, then when processing backwards and encountering this trace event, the call stack level can be set to this known depth.

(c) The trace events can be scanned from the point of the discontinuity until it is possible to unambiguously determine the call stack depth, and then the trace events can be allocated to the correct call stack level. For instance, when summarizing backwards and encountering a return from an exception handler, the depth at the time that the handler was exited may not be known. The trace events before that point in time can be scanned until the start of the exception handler is determined, and then the call stack depth at the point of return is known.

(d) The generation of the trace stream by execution of the computer system is modified to include periodic notations about the current call stack depth. For example, in certain embodiments, a timer is set up so that every time it fires, it outputs the current call stack depth into the trace event stream. Combined with the previous approach, this bounds the amount of trace data that must be scanned before the correct call stack level can be determined.

(e) The generation of the trace stream by execution of the computer system is modified to include periodic notations about the current call stack. For example, in certain embodiments, a timer is set up so that every time it fires, it outputs some or all of the information comprising the current call stack into the trace event stream. Combined with the previous approach, this bounds the amount of trace data that must be scanned before the correct call stack level can be determined.

(f) The summarization of the call stack is terminated at the point of the discontinuity, and a new call stack summarization stream is begun. To render this, the rendering engine needs to be modified to stitch together multiple different call stack summarizations into a single coherent view where they appear one after the other.

(g) The summarization of the call stack is paused, and temporary new summarization is begun at the discontinuity. When the depth at the discontinuity point is determined, then the newly summarized data is merged into the primary call stack, and the temporary summarized data is removed and the summarization of the call stack is unpaused (i.e., it resumes). Certain embodiments of the rendering engine may display this temporary summarized data stitched together with the original summarized data into a single coherent view. Certain embodiments may switch back to showing the original when the data is merged.

The end goal of the summarization system with regards to call stack graphs is:

(a) Displaying a visualization of the execution history of a thread in a call stack graph, wherein when a plurality of function calls occur within a given call stack level in a time range represented by one pixel-unit of execution on a display device, assigning a first color to said pixel-unit of execution, wherein said first color is associated with each of said plurality of function calls.
  (i) There are multiple approaches to doing this. For instance, as discussed elsewhere the color of the pixel-unit of execution could be a blend of the underlying colors of the functions. However, the color could also be an indication of the number of function calls occurring (an embodiment could use a scale such as green for less than or equal to 10, blue for less than or equal to 1000, and red for greater than 1000, or an embodiment could use a scale relative to the number of units of execution within a pixel-unit of execution, which would effectively show density of calls per pixel-unit of execution). Another approach would be to use multiple colors, using the axis other than the axis of the pixel-unit of execution to show different colors. An embodiment might have space to show up to 3 colors, and would show the colors of any 3 functions which are within that pixel.

(b) Each of the plurality of function calls is associated with a corresponding color, and wherein the first color is associated with each of said plurality of function calls in that said first color comprises a blend of the colors of the plurality of functions.
  (i) This is the approach which is discussed elsewhere in this document, which blends the colors assigned to specific functions which are within a pixel-unit of execution to determine what color to render. Blending can take many forms which those skilled in the art would readily consider.

Additional Notes

Certain figures in this specification are flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions that execute on the computer or other programmable apparatus create structures for implementing the functions specified in the flow chart block or blocks. These computer program instructions may also be stored in computer-readable memory that can direct a computer or other programmable apparatus to function in a particular manner, such that the instructions stored in computer-readable memory produce an article of manufacture including instruction structures that implement the function specified in the flow chart block or blocks. The computer program instructions may also be loaded onto a computer or other programmable apparatus to cause a series of operational steps to be performed on the computer or other programmable apparatus to produce a computer-implemented process such that the instructions that execute on the computer or other programmable apparatus provide steps for implementing the functions specified in the flow chart block or blocks.

Accordingly, blocks of the flow charts support combinations of structures for performing the specified functions and combinations of steps for performing the specified functions. It will also be understood that each block of the flow charts, and combinations of blocks in the flow charts, can be implemented by special purpose hardware-based computer systems that perform the specified functions or steps, or combinations of special purpose hardware and computer instructions.

For example, any number of computer programming languages, such as C, C++, C # (CSharp), Perl, Ada, Python, Pascal, SmallTalk, FORTRAN, assembly language, and the like, may be used to implement aspects of the present invention. Further, various programming approaches such as procedural, object-oriented or artificial intelligence techniques may be employed, depending on the requirements of each particular implementation. Compiler programs and/or virtual machine programs executed by computer systems generally translate higher level programming languages to generate sets of machine instructions that may be executed by one or more processors to perform a programmed function or set of functions.

In the foregoing descriptions, certain embodiments are described in terms of particular data structures, preferred and optional enforcements, preferred control flows, and examples. Other and further application of the described methods, as would be understood after review of this application by those with ordinary skill in the art, are within the scope of the invention.

The term "machine-readable medium" should be understood to include any structure that participates in providing data that may be read by an element of a computer system. Such a medium may take many forms, including but not limited to, non-volatile media, volatile media, and transmission media. Non-volatile media include, for example, optical or magnetic disks and other persistent memory such as devices based on flash memory (such as solid-state drives, or SSDs). Volatile media include dynamic random access memory (DRAM) and/or static random access memory (SRAM). Transmission media include cables, wires, and fibers, including the wires that comprise a system bus coupled to a processor. Common forms of machine-readable media include, for example and without limitation, a floppy disk, a flexible disk, a hard disk, a solid-state drive, a magnetic tape, any other magnetic medium, a CD-ROM, a DVD, or any other optical medium.

Figure 56:
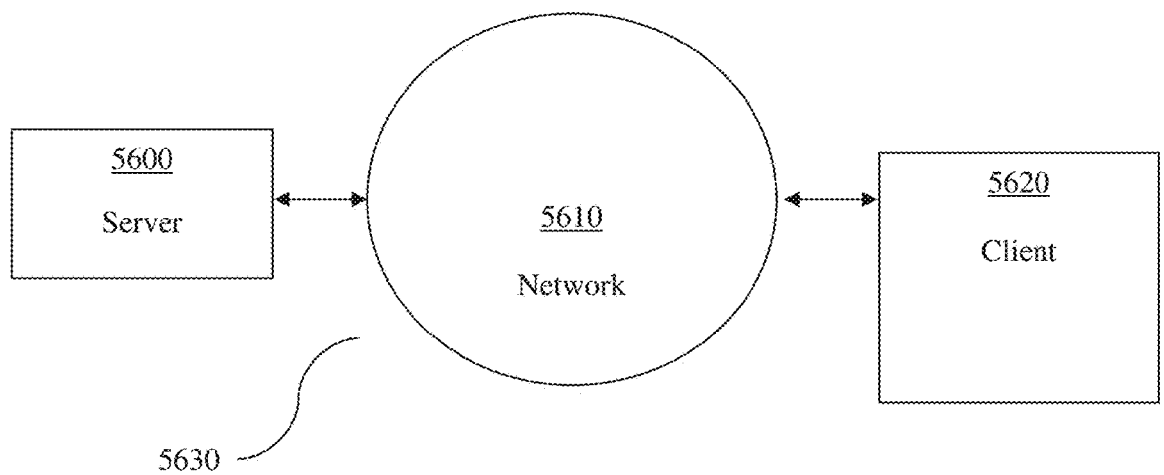
FIG. 56 illustrates an exemplary networked environment and its relevant components according to certain embodiments of the present invention.

FIG. 56 depicts an exemplary networked environment 5630 in which systems and methods, consistent with exemplary embodiments, may be implemented. As illustrated, networked environment 5630 may include, without limitation, a server (5600), a client (5620), and a network (5610). The exemplary simplified number of servers (5600), clients (5620), and networks (5610) illustrated in FIG. 56 can be modified as appropriate in a particular implementation. In practice, there may be additional servers (5600), clients (5620), and/or networks (5610).

In certain embodiments, a client 5620 may connect to network 5610 via wired and/or wireless connections, and thereby communicate or become coupled with server 5600, either directly or indirectly. Alternatively, client 5620 may be associated with server 5600 through any suitable tangible computer-readable media or data storage device (such as a disk drive, CD-ROM, DVD, or the like), data stream, file, or communication channel.

Network 5610 may include, without limitation, one or more networks of any type, including a Public Land Mobile Network (PLMN), a telephone network (e.g., a Public Switched Telephone Network (PSTN) and/or a wireless network), a local area network (LAN), a metropolitan area network (MAN), a wide area network (WAN), an Internet Protocol Multimedia Subsystem (IMS) network, a private network, the Internet, an intranet, a cellular network, and/or another type of suitable network, depending on the requirements of each particular implementation.

One or more components of networked environment 5630 may perform one or more of the tasks described as being performed by one or more other components of networked environment 5630.

Figure 57:
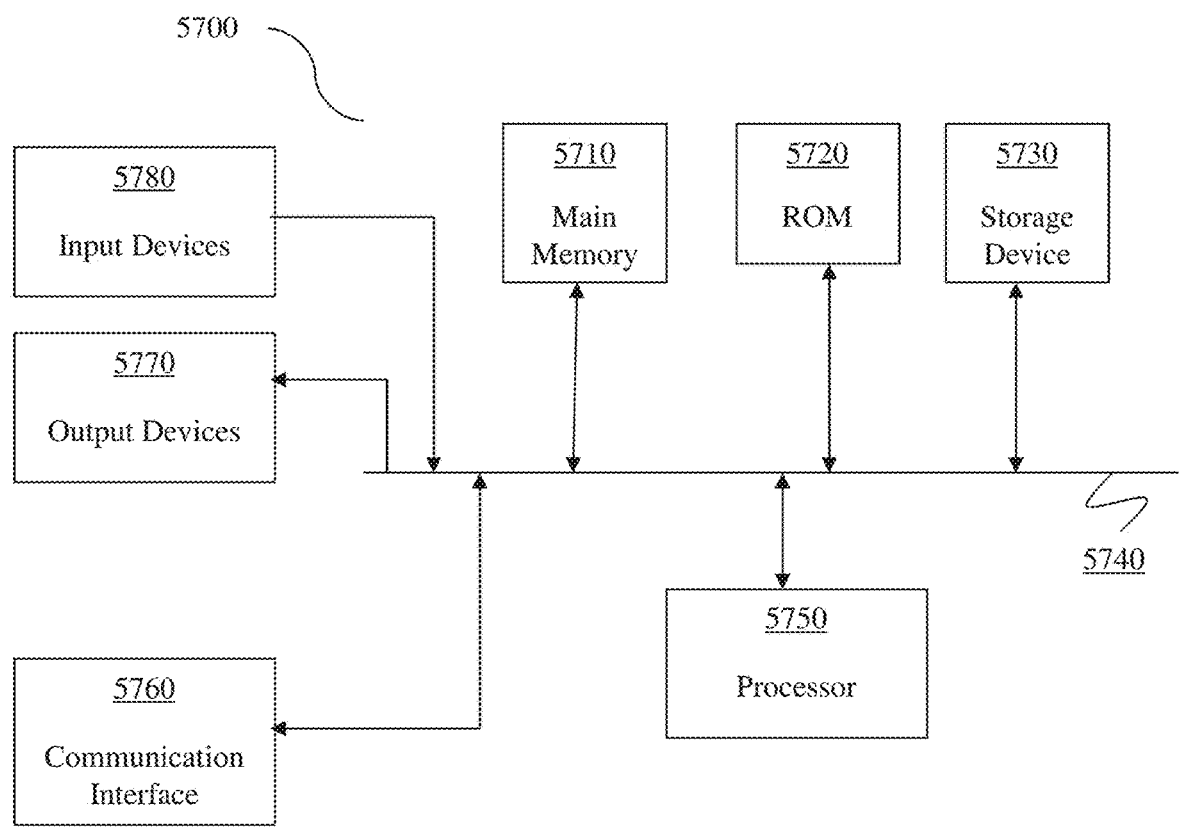
FIG. 57 is an exemplary block diagram of a computing device that may be used to implement aspects of certain embodiments of the present invention.

FIG. 57 is an exemplary diagram of a computing device 5700 that may be used to implement aspects of certain embodiments of the present invention, such as aspects of server 5600 or of client 5620. In certain embodiments, computing device 5700 may be, without limitation, a desktop or notebook computing device, or a mobile computing device that may include, without limitation, a smart phone or tablet device. Computing device 5700 may include, without limitation, a bus 5740, one or more processors 5750, a main memory 5710, a read-only memory (ROM) 5720, a storage device 5730, one or more input devices 5780, one or more output devices 5770, and a communication interface 5760. Bus 5740 may include, without limitation, one or more conductors that permit communication among the components of computing device 5700.

Processor 5750 may include, without limitation, any type of conventional processor, microprocessor, or processing logic that interprets and executes instructions. Main memory 5710 may include, without limitation, a random-access memory (RAM) or another type of dynamic storage device that stores information and instructions for execution by processor 5750. ROM 5720 may include, without limitation, a conventional ROM device or another type of static storage device that stores static information and instructions for use by processor 5750. Storage device 5730 may include, without limitation, a magnetic and/or optical recording medium and its corresponding drive.

Input device(s) 5780 may include, without limitation, one or more conventional mechanisms that permit a user to input information to computing device 5700, such as a keyboard, a mouse, a pen, a stylus, handwriting recognition, voice recognition, biometric mechanisms, touch screen, and the like. Output device(s) 5770 may include, without limitation, one or more conventional mechanisms that output information to the user, including a display, a projector, an A/V receiver, a printer, a speaker, and the like. Communication interface 5760 may include, without limitation, any transceiver-like mechanism that enables computing device 5700 to communicate with other devices and/or systems. For example, communication interface 5760 may include, without limitation, mechanisms for communicating with another device or system via a network, such as network 5610 shown in FIG. 56.

As described in detail herein, computing device 5700 may perform operations based on software instructions that may be read into memory 5710 from another computer-readable medium, such as data storage device 5730, or from another device via communication interface 5760. The software instructions contained in memory 5710 cause processor 5750 to perform processes that are described elsewhere. Alternatively, hardwired circuitry may be used in place of, or in combination with, software instructions to implement processes consistent with the present invention. Thus, various implementations are not limited to any specific combination of hardware circuitry and software.

Those skilled in the art will realize that embodiments of the present invention may use any suitable data communication network, including, without limitation, direct point-to-point data communication systems, dial-up networks, personal or corporate intranets, proprietary networks, or combinations of any of these with or without connections to the Internet.

Figure 58:
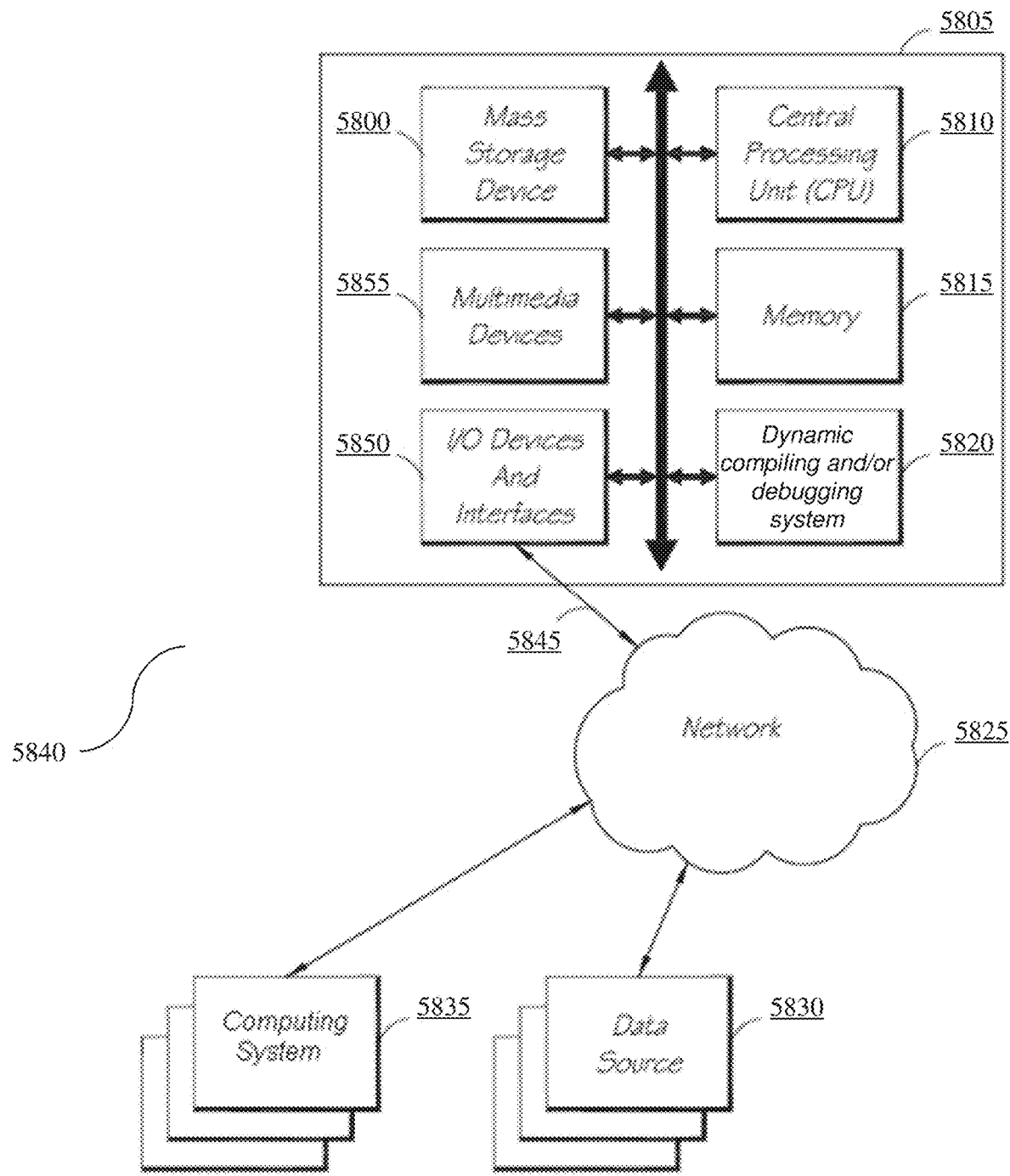
FIG. 58 is an exemplary block diagram of a networked computing system that may be used to implement aspects of certain embodiments of the present invention.

FIG. 58 is an exemplary block diagram of a networked computing system 5840 that may be used to implement aspects of certain embodiments of the present invention. The networked computing system 5840 shown in FIG. 58 includes network 5825 coupled to computing systems 5835, data sources 5830, and compiling/debugging computer 5805. Compiling/debugging computer 5805 includes a mass storage device 5800, multimedia devices 5855, I/O devices and interfaces 5850 (which are coupled to network 5825 via the bidirectional communication link 5845), one or more central processing units (e.g., 5810), memory 5815, and a dynamic compiling and/or debugging system 5820. Details regarding the foregoing components, which may be implemented in a single computing device or distributed among multiple computing devices, are described throughout this document.

While the above description contains many specifics and certain exemplary embodiments have been described and shown in the accompanying drawings, it is to be understood that such embodiments are merely illustrative of, and not restrictive on, the broad invention, and that this invention is not to be limited to the specific constructions and arrangements shown and described, since various other modifications may occur to those ordinarily skilled in the art, as mentioned above. The invention includes any combination or sub-combination of the elements from the different species and/or embodiments disclosed herein.

We claim:

1. A computer-implemented method to summarize trace data comprising a plurality of trace events to facilitate visual analysis of said trace data, comprising:
    assigning one or more of said trace events within a received stream of said trace events associated with a unit of execution into one or more substreams;
    for each said substream, creating a plurality of summary entries from said substream, wherein each of said summary entries is associated with one or more of a plurality of summary levels, and wherein each of said summary entries represents a plurality of said trace events,
    wherein each of said summary entries comprises a representation of said plurality of said trace events that occurred within a time range corresponding to said plurality of said trace events, wherein each of said representations comprises a trace event signature; and
    translating said summary entries into a graphical representation to facilitate said visual analysis of said trace data.

2. A computer-implemented method to facilitate and accelerate visual analysis of a computer system, comprising:
    receiving a set of trace events from an execution of one or more computer programs by one or more target processors for a time period;
    pre-computing multiple levels of representations of sequences of trace events into summary levels;
    storing said summary levels in one or more computer-readable storage media; and
    in response to a request to display a selected portion of one or more of said trace events, retrieving a subset of said pre-computed representations of sequences of trace events from one of a determined one of said summary levels and rendering it on a display device,
    wherein each of said pre-computed representations of sequences of trace events comprises a representation of a plurality of said trace events that occurred within a time range corresponding to said plurality of said trace events, wherein each of said representations comprises a trace event signature; and
    translating said trace event signatures into a graphical representation to facilitate said visual analysis of said trace data.

3. An apparatus for facilitating and accelerating visual analysis of a computer system, comprising:
    a summary level pre-computer, wherein said summary level pre-computer generates multiple levels of representations of sequences of trace events from an execution of one or more computer programs by one or more target processors for a time period into summary levels;
    one or more computer-readable storage media for storing said summary levels; and
    a rendering engine that, in response to a request to display a selected portion of one or more of said trace events, retrieves a subset of said pre-computed representations of sequences of trace events from a determined one of said summary levels and renders it on a display device,
    wherein each of said pre-computed representations of sequences of trace events comprises a representation of a plurality of said trace events that occurred within a time range corresponding to said plurality of said trace events, wherein each of said representations comprises a trace event signature; and
    translating said trace event signatures into a graphical representation to facilitate said visual analysis of said trace data.

* * * * *